United States Patent
Allen et al.

(10) Patent No.: US 11,709,397 B2
(45) Date of Patent: Jul. 25, 2023

(54) BACKLIGHT INCLUDING PATTERNED REFLECTORS, DIFFUSER PLATE, AND METHOD FOR FABRICATING THE BACKLIGHT

(71) Applicant: Corning Incorporated, Corning, NY (US)

(72) Inventors: Kirk Richard Allen, Elmira, NY (US); Fedor Dmitrievich Kiselev, Saint-Petersburg (RU); Dmitri Vladislavovich Kuksenkov, Elmira, NY (US); Christopher Michael Lynn, Liberty, PA (US); Pamela Arlene Maurey, Savona, NY (US); Xiang-Dong Mi, Pittsford, NY (US); Scott Christopher Pollard, Big Flats, NY (US); Nikolay Timofeyevich Timofeev, St. Petersburg (RU); Andrii Varanytsia, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/292,790

(22) PCT Filed: Nov. 5, 2019

(86) PCT No.: PCT/US2019/059820
§ 371 (c)(1),
(2) Date: May 11, 2021

(87) PCT Pub. No.: WO2020/101946
PCT Pub. Date: May 22, 2020

(65) Prior Publication Data
US 2021/0397049 A1    Dec. 23, 2021

(51) Int. Cl.
*G02F 1/13357* (2006.01)
*G02F 1/1335* (2006.01)

(52) U.S. Cl.
CPC .. *G02F 1/133606* (2013.01); *G02F 1/133524* (2013.01); *G02F 1/133605* (2013.01)

(58) Field of Classification Search
CPC ......... G02F 1/133606; G02F 1/133605; G02F 1/133524; G02B 6/0051; G02B 5/0205; G02B 6/0031; G02B 6/0055
See application file for complete search history.

(56) References Cited

U.S. PATENT DOCUMENTS 8,016,475 B2    9/2011    Travis
8,982,545 B2    3/2015    Kim et al.
(Continued)

FOREIGN PATENT DOCUMENTS

CN    105065995 A    11/2015
CN    106054446 A    10/2016
(Continued)

OTHER PUBLICATIONS

International Search Report and Written Opinion of the International Searching Authority; PCT/US2019/059820; dated Feb. 27, 2020; 5 pages; European Patent Office.
(Continued)

*Primary Examiner* — Jia X Pan
(74) *Attorney, Agent, or Firm* — Matthew J. Mason

(57) ABSTRACT

A backlight includes a substrate, a plurality of light sources, a reflective layer, a light guide plate, a pattern of light extractors, a plurality of patterned reflectors, and a diffusive layer. The plurality of light sources are proximate the substrate. The reflective layer is on the substrate. The light guide plate is proximate the plurality of light sources. The pattern of light extractors is on the light guide plate. The
(Continued)

plurality of patterned reflectors are on the light guide plate. Each patterned reflector is aligned with a corresponding light source. The diffusive layer is on the light guide plate.

13 Claims, 24 Drawing Sheets

(56) References Cited

U.S. PATENT DOCUMENTS

| | | | |
|---|---|---|---|
| 9,482,807 | B2 | 11/2016 | Wheatley et al. |
| 2003/0231483 | A1 | 12/2003 | Higashiyama |
| 2004/0141301 | A1 | 7/2004 | Yang |
| 2004/0196646 | A1 | 10/2004 | Machi et al. |
| 2004/0228105 | A1* | 11/2004 | Huang ............... G02B 6/0013 362/97.1 |
| 2006/0014085 | A1 | 1/2006 | Nakajima et al. |
| 2008/0158912 | A1 | 7/2008 | Chang et al. |
| 2008/0316770 | A1 | 12/2008 | Oku et al. |
| 2010/0002468 | A1 | 1/2010 | Liu et al. |
| 2010/0214802 | A1 | 8/2010 | Masuda et al. |
| 2010/0220484 | A1 | 9/2010 | Shani et al. |
| 2010/0265694 | A1* | 10/2010 | Kim .................. G02B 6/0021 362/97.1 |
| 2011/0017287 | A1* | 1/2011 | Borrelli ............. H01L 31/02168 136/256 |
| 2011/0242433 | A1 | 10/2011 | Yamasaki et al. |
| 2011/0317096 | A1* | 12/2011 | Yokota .............. G02F 1/133606 349/64 |
| 2012/0013811 | A1* | 1/2012 | Shimizu ............. G02B 6/0055 348/739 |
| 2012/0195065 | A1 | 8/2012 | Hyakuta et al. |
| 2013/0265769 | A1 | 10/2013 | Steedly |
| 2014/0132883 | A1 | 5/2014 | Roberts et al. |
| 2015/0131156 | A1* | 5/2015 | Borrelli ............. G02B 5/0278 359/599 |
| 2015/0234234 | A1 | 8/2015 | Lee et al. |
| 2015/0355505 | A1* | 12/2015 | Overes ............. G02B 6/0073 362/606 |
| 2016/0139454 | A1 | 5/2016 | Katsuta et al. |
| 2016/0238774 | A1 | 8/2016 | Koike et al. |
| 2018/0023784 | A1* | 1/2018 | Tamura ............. G02F 1/133608 362/235 |
| 2019/0011780 | A1* | 1/2019 | Wang ............... G02F 1/133602 |
| 2019/0094616 | A1* | 3/2019 | Kim ................. G02F 1/133605 |
| 2019/0129249 | A1* | 5/2019 | Lee ................... G09G 3/36 |
| 2020/0257035 | A1 | 8/2020 | Kuksenkov et al. |
| 2020/0400998 | A1* | 12/2020 | Lee .................. G02B 6/0055 |
| 2021/0063609 | A1 | 3/2021 | Bellman et al. |

FOREIGN PATENT DOCUMENTS

| | | | |
|---|---|---|---|
| EP | 2812752 A1 | 12/2014 | |
| JP | H10340613 A | * 12/1998 | |
| JP | 2011-044425 A | 3/2011 | |
| KR | 20110107210 A | * 9/2011 | ......... G02B 6/0051 |
| WO | 2013/117755 A1 | 8/2013 | |
| WO | 2018/144509 A1 | 8/2018 | |
| WO | 2018/156547 A1 | 8/2018 | |
| WO | 2019/046223 A1 | 3/2019 | |
| WO | 2019/046328 A1 | 3/2019 | |

OTHER PUBLICATIONS

International Search Report and Written Opinion of the International Searching Authority; PCT/RU2018/000738; dated Jul. 23, 2019; 09 pages; European Patent Office.

\* cited by examiner

US 11,709,397 B2

1

BACKLIGHT INCLUDING PATTERNED REFLECTORS, DIFFUSER PLATE, AND METHOD FOR FABRICATING THE BACKLIGHT

This application is a National Stage application under 35 U.S.C. § 371 of International Application No. PCT/US2019/059820, filed on Nov. 5, 2019, which claims the benefit of priority under 35 U.S.C. § 365 of International Patent Application Serial No. PCT/RU2019/000722, filed on Oct. 9, 2019, International Patent Application Serial No. PCT/RU2019/000250, filed on Apr. 15, 2019, and International Patent Application Serial No. PCT/RU2018/000738, filed on Nov. 12, 2018, the content of each are relied upon and incorporated herein by reference in their entirety.

BACKGROUND

Field

The present disclosure relates generally to backlights for displays. More particularly, it relates to backlights including patterned reflectors.

Technical Background

Liquid crystal displays (LCDs) are commonly used in various electronics, such as cell phones, laptops, electronic tablets, televisions, and computer monitors. LCDs are light valve-based displays in which the display panel includes an array of individually addressable light valves. LCDs may include a backlight for producing light that may then be wavelength converted, filtered, and/or polarized to produce an image from the LCD. Backlights may be edge-lit or direct-lit. Edge-lit backlights may include a light emitting diode (LED) array edge-coupled to a light guide plate that emits light from its surface. Direct-lit backlights may include a two-dimensional (2D) array of LEDs directly behind the LCD panel.

Direct-lit backlights may have the advantage of improved dynamic contrast as compared to edge-lit backlights. For example, a display with a direct-lit backlight may independently adjust the brightness of each LED to set the dynamic range of the brightness across the image. This is commonly known as local dimming. To achieve desired light uniformity and/or to avoid hot spots in direct-lit backlights, however, a diffuser plate or film may be positioned at a distance from the LEDs, thus making the overall display thickness greater than that of an edge-lit backlight. Lenses positioned over the LEDs have been used to improve the lateral spread of light in direct-lit backlights. The optical distance (OD) between the LEDs and the diffuser plate or film in such configurations (e.g., from at least 10 to typically about 20-30 millimeters), however, still results in an undesirably high overall display thickness and/or these configurations may produce undesirable optical losses as the backlight thickness is decreased. While edge-lit backlights may be thinner, the light from each LED may spread across a large region of the light guide plate such that turning off individual LEDs or groups of LEDs may have only a minimal impact on the dynamic contrast ratio.

SUMMARY

Some embodiments of the present disclosure relate to a backlight. The backlight includes a substrate, a plurality of light sources, a reflective layer, a light guide plate, a pattern of light extractors, a plurality of patterned reflectors, and a diffusive layer. The plurality of light sources are proximate the substrate. The reflective layer is on the substrate. The light guide plate is proximate the plurality of light sources. The pattern of light extractors is on the light guide plate. The plurality of patterned reflectors are on the light guide plate. Each patterned reflector is aligned with a corresponding light source. The diffusive layer is on the light guide plate.

Yet other embodiments of the present disclosure relate to a diffuser plate. The diffuser plate includes a glass substrate and a first scattering layer. The glass substrate includes a first surface and a second surface opposite to the first surface. The first scattering layer is on the first surface of the glass substrate. The diffuser plate includes a haze of greater than 90 percent and a cosine corrected Bi-Directional Transmittance Distribution Function along the normal direction (ccBTDF(0, 0)) for the normal incidence of less than 1.

Yet other embodiments of the present disclosure relate to a backlight. The backlight includes a substrate, a plurality of light sources, a first reflective layer, a light guide plate, a pattern of light extractors, a plurality of patterned reflectors, and a second reflective layer. The plurality of light sources are proximate the substrate. The first reflective layer is on the substrate. The light guide plate is proximate the plurality of light sources. The pattern of light extractors are on the light guide plate. The plurality of patterned reflectors are on the light guide plate. Each patterned reflector is aligned with a corresponding light source. The second reflective layer is between the light guide plate and the first reflective layer.

Yet other embodiments of the present disclosure relate to a backlight. The backlight includes a substrate, a plurality of light sources, a reflective layer, a light guide plate, a pattern of light extractors, a plurality of patterned reflectors, and an encapsulation layer. The plurality of light sources are proximate the substrate. The reflective layer is on the substrate. The light guide plate is proximate the plurality of light sources. The pattern of light extractors is on the light guide plate. The plurality of patterned reflectors are on the light guide plate. Each patterned reflector is aligned with a corresponding light source. The encapsulation layer is on the reflective layer and encapsulates the plurality of light sources.

Yet other embodiments of the present disclosure relate to a backlight. The backlight includes a substrate, a plurality of light sources, a first reflective layer, a light guide plate, a pattern of light extractors, and a plurality of patterned reflectors. The plurality of light sources are proximate the substrate. The first reflective layer is on the substrate. The light guide plate is proximate the plurality of light sources and includes a first surface and a second surface opposite to the first surface. The pattern of light extractors is on the first surface of the light guide plate. The plurality of patterned reflectors are on the first surface of the light guide plate. Each patterned reflector is aligned with a corresponding light source and includes a varying thickness. A gap between each patterned reflector and the pattern of light extractors is within a range from d2 to 3*d2, where d2 is a thickness of the light guide plate between the first surface and the second surface.

Yet other embodiments of the present disclosure relate to a backlight. The backlight includes a substrate, a plurality of light sources, a first reflective layer, a light guide plate, and a plurality of light extractors and a plurality of patterned reflectors. The plurality of light sources are proximate the substrate. The first reflective layer is on the substrate. The light guide plate is proximate the plurality of light sources and includes a first surface and a second surface opposite to the first surface. The plurality of light extractors and the plurality of patterned reflectors include the same material and are arranged in a grid pattern on the first surface of the light guide plate. Each patterned reflector is aligned with a corresponding light source.

Yet other embodiments of the present disclosure relate to a method for fabricating a backlight. The method includes applying a reflective layer on a substrate. The method includes arranging a plurality of light sources on the substrate. The method includes applying a pattern of light extractors and a plurality of patterned reflectors on a first surface of a light guide plate. The method includes arranging the light guide plate over the plurality of light sources such that each patterned reflector is aligned with a corresponding light source.

Yet other embodiments of the present disclosure relate to a backlight. The backlight includes a substrate, a plurality of light sources, a reflective layer, an encapsulation layer, a pattern of light extractors, and a plurality of patterned reflectors. The plurality of light sources are proximate the substrate. The reflective layer is on the substrate. The encapsulation layer is on the reflective layer and encapsulates the plurality of light sources. The pattern of light extractors is on the encapsulation layer. The plurality of patterned reflectors are on the encapsulation layer and each patterned reflector is aligned with a corresponding light source.

Yet other embodiments of the present disclosure relate to a backlight. The backlight includes a substrate, a plurality of light sources, a first reflective layer, a second reflective layer, and at least one encapsulation layer. The plurality of light sources are proximate the substrate. The first reflective layer is on the substrate. The second reflective layer is on the first reflective layer and includes a plurality of openings. Each opening is aligned with a corresponding light source. The at least one encapsulation layer is on the first reflective layer and encapsulates the plurality of light sources.

The backlights disclosed herein are thin direct-lit backlights with improved light efficiency. The backlights have an improved ability to hide light sources resulting in a thinner backlight. The improved ability to hide the light sources allows for the removal of so-called "hot" spots directly above the light sources of the backlight, thus resulting in a uniform brightness across the display.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description explain principles and operation of the various embodiments.

DETAILED DESCRIPTION

Figure 1A:
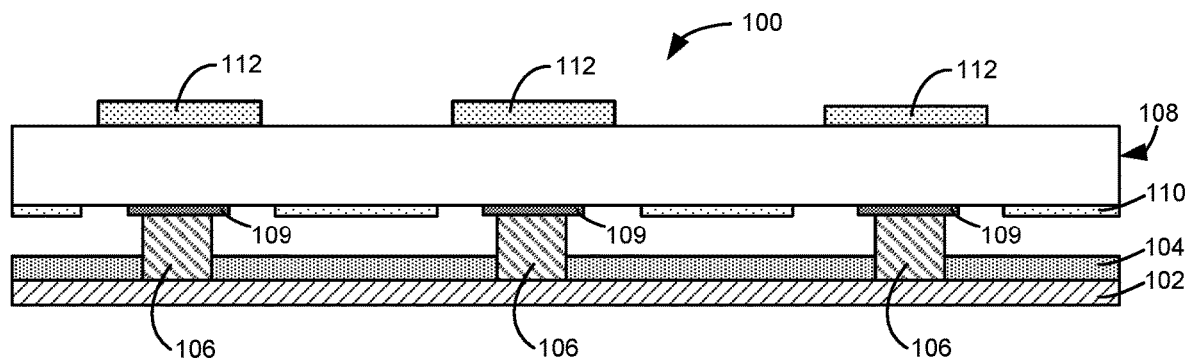
FIGS. 1A-1D are various views of an exemplary backlight including patterned reflectors.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, vertical, horizontal—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an," and "the" include plural references unless the context clearly dictates otherwise. Thus, for example, reference to "a" component includes aspects having two or more such components, unless the context clearly indicates otherwise.

Referring now to FIGS. 1A-1D, various views of an exemplary backlight 100 are depicted. FIG. 1A is a cross-sectional view of backlight 100. Backlight 100 may include a substrate 102, a reflective layer 104, a plurality of light sources 106, a light guide plate 108, and a plurality of patterned reflectors 112. The plurality of light sources 106 are arranged on substrate 102 and are in electrical communication with the substrate 102. The reflective layer 104 is on the substrate 102 and surrounds each light source 106. In certain exemplary embodiments, the substrate 102 may be reflective such that the reflective layer 104 may be excluded. The light guide plate 108 is over the plurality of light sources 106 and optically coupled to each light source 106. In certain exemplary embodiments, an optical adhesive 109 may be used to couple the plurality of light sources 106 to the light guide plate 108. The optical adhesive (e.g., phenyl silicone) may have a refractive index greater than or equal to a refractive index of the light guide plate 108. The plurality of patterned reflectors 112 are arranged on the upper surface of the light guide plate 108. Each patterned reflector 112 is aligned with a corresponding light source 106.

Figure 1B:
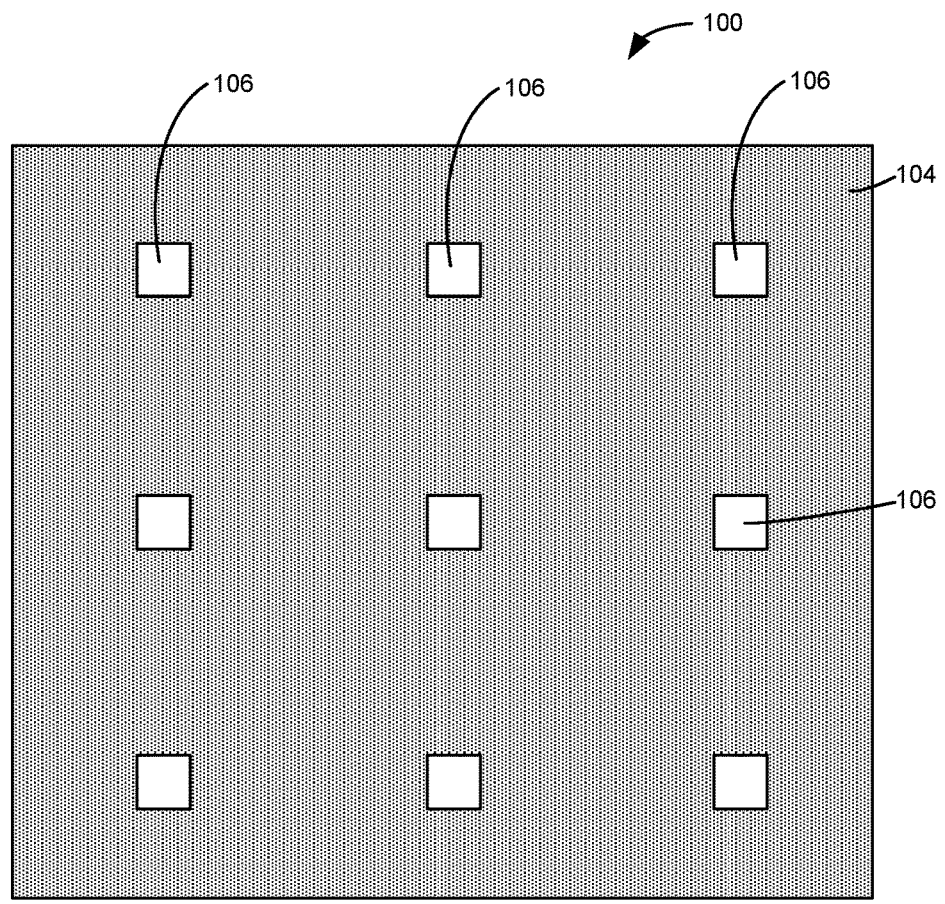

FIG. 1B is a top view of the plurality of light sources 106 and reflective layer 104 on substrate 102. Light sources 106 are arranged in a 2D array including a plurality of rows and a plurality of columns. While nine light sources 106 are illustrated in FIG. 1B in three rows and three columns, in other embodiments backlight 100 may include any suitable number of light sources 106 arranged in any suitable number of rows and any suitable number of columns. Light sources 106 may also be arranged in other periodic patterns, for example, a hexagonal or triangular lattice, or as quasi-periodic or non-strictly periodic patterns. For example, the spacing between light sources 106 may be smaller at the edges and/or corners of the backlight. Substrate 102 may be a printed circuit board (PCB), a glass or plastic substrate, or another suitable substrate for passing electrical signals to each light source 106 for individually controlling each light source. Substrate 102 may be a rigid substrate or a flexible substrate. For example, substrate 102 may include flat glass or curved glass. The curved glass, for example, may have a radius of curvature less than about 2000 millimeters, such as about 1500, 1000, 500, 200, or 100 millimeters. The reflective layer 104 may include, for example, metallic foils, such as silver, platinum, gold, copper, and the like; dielectric materials (e.g., polymers such as polytetrafluoroethylene (PTFE)); porous polymer materials, such as polyethylene terephthalate (PET), Poly(methyl methacrylate) (PMMA), polyethylene naphthalate (PEN), polyethersulfone (PES), etc.; multi-layer dielectric interference coatings, or reflective inks, including white inorganic particles such as titania, barium sulfate, etc., or other materials suitable for reflecting light and tuning the color of the reflected and transmitted light, such as colored pigments.

Each of the plurality of light sources 106 may, for example, be an LED (e.g., size larger than about 0.5 millimeters), a mini-LED (e.g., size between about 0.1 millimeters and about 0.5 millimeters), a micro-LED (e.g., size smaller than about 0.1 millimeter), an organic LED (OLED), or another suitable light source having a wavelength ranging from about 100 nanometers to about 750 nanometers. The light from each light source 106 is optically coupled to the light guide plate 108. As used herein, the term "optically coupled" is intended to denote that a light source is positioned at a surface of the light guide plate 108 and is in an optical communication with the light guide plate 108 directly or through an optically clear adhesive 109, so as to introduce light into the light guide plate that at least partially propagates due to total internal reflection. The light from each light source 106 is optically coupled to the light guide plate 108 such that a first portion of the light travels laterally in the light guide plate 108 due to the total internal reflection and is extracted out of the light guide plate by the pattern of light extractors 110, and a second portion of the light travels laterally between the reflective layer 104 and the patterned reflectors 112 due to multiple reflections at the reflective surfaces of the reflective layer 104 and the patterned reflectors 112 or between an optical film stack (shown in FIG. 3) and the reflective layer 104.

According to various embodiments, the light guide plate 108 may include any suitable transparent material used for lighting and display applications. As used herein, the term "transparent" is intended to denote that the light guide plate has an optical transmission of greater than about 70 percent over a length of 500 millimeters in the visible region of the spectrum (about 420-750 nanometers). In certain embodiments, an exemplary transparent material may have an optical transmittance of greater than about 50 percent in the ultraviolet (UV) region (about 100-400 nanometers) over a length of 500 millimeters. According to various embodiments, the light guide plate may include an optical transmittance of at least 95 percent over a path length of 50 millimeters for wavelengths ranging from about 450 nanometers to about 650 nanometers.

The optical properties of the light guide plate may be affected by the refractive index of the transparent material. According to various embodiments, the light guide plate 108 may have a refractive index ranging from about 1.3 to about 1.8. In other embodiments, the light guide plate 108 may have a relatively low level of light attenuation (e.g., due to absorption and/or scattering). The light attenuation ($\alpha$) of the light guide plate 108 may, for example, be less than about 5 decibels per meter for wavelengths ranging from about 420-750 nanometers. The light guide plate 108 may include polymeric materials, such as plastics (e.g., polymethyl methacrylate (PMMA), methylmethacrylate styrene (MS), polydimethylsiloxane (PDMS)), polycarbonate (PC), or other similar materials. The light guide plate 108 may also include a glass material, such as aluminosilicate, alkali-aluminosilicate, borosilicate, alkali-borosilicate, alumino-borosilicate, alkali-aluminoborosilicate, soda lime, or other suitable glasses. Non-limiting examples of commercially available glasses suitable for use as a glass light guide plate 108 include EAGLE XG®, Lotus™, Willow®, Iris™, and Gorilla® glasses from Corning Incorporated. In examples where substrate 102 includes curved glass, light guide plate 108 may also include curved glass to form a curved backlight.

Figure 1C:
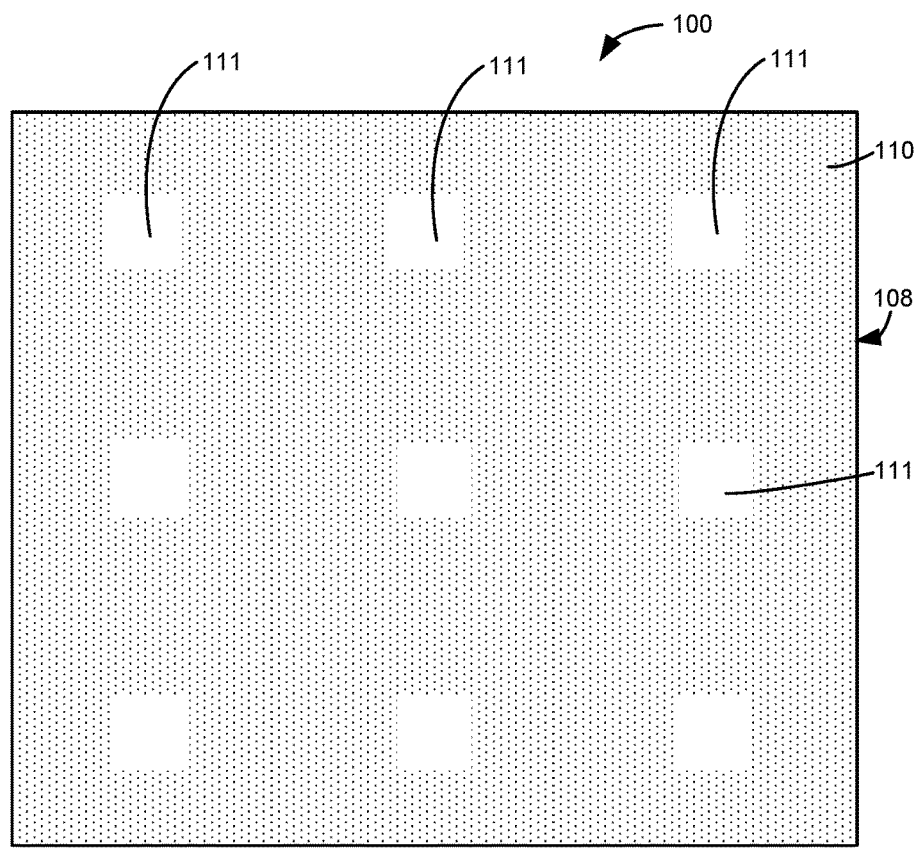

FIG. 1C is a top view of the pattern of light extractors 110 of the light guide plate 108. The pattern of light extractors 110 includes a plurality of gaps 111. Each gap 111 is aligned with a corresponding light source 106 and a corresponding patterned reflector 112. The light guide plate 108 includes a pattern of light extractors 110 on the lower surface of the light guide plate. In certain exemplary embodiments, light guide plate 108 may include a pattern of light extractors on the upper surface (e.g., see FIGS. 3-4) of the light guide plate in place of or in addition to the pattern of light extractors 110 on the lower surface of the light guide plate. As used herein, the term "pattern" is intended to denote that the light extractors are present on or under the surface of the light guide plate in any given pattern or design, which may, for example, be random or arranged, repetitive or non-repetitive, uniform or non-uniform. In other embodiments, the light extractors may be located within the matrix of the light guide plate adjacent to the surface (e.g., below the surface). For example, the light extractors may be distributed across the surface (e.g., as textural features making up a roughened or raised surface) or may be distributed within and throughout the light guide plate or portions thereof (e.g., as laser-damaged sites or features).

Suitable methods for creating such light extractors may include printing, such as inkjet printing, screen printing, microprinting, and the like, embossing or micro-replication, such as UV or thermal embossing in a light guide plate material itself or an additional material coated on the surface of the light guide plate, texturing, mechanical roughening, etching, injection molding, coating, laser damaging, or any combination thereof. Non-limiting examples of such methods include, for instance, acid etching a surface, coating a surface with $TiO_2$, particle filled ink or paint, coating a surface with a transparent ink containing micro polymer or glass beads of varying sizes, and laser damaging the substrate by focusing a laser on a surface or within the substrate matrix. Each gap 111 may be square, circular, or any other suitable shape. In one aspect, each gap 111 allows the corresponding light source 106 to be optically coupled to the light guide plate 108. In another aspect, the size of each gap 111 controls the impact of the pattern of light extractors 110 on the luminance around each light source 106. For example, a larger gap 111 means a larger distance between the pattern of light extractors 110 and each light source 106, resulting in a lower luminance near each light source. In comparison, a smaller gap 111 means a smaller distance between the pattern of light extractors and the light source 106, resulting in a higher luminance near the light source.

Figure 1D:
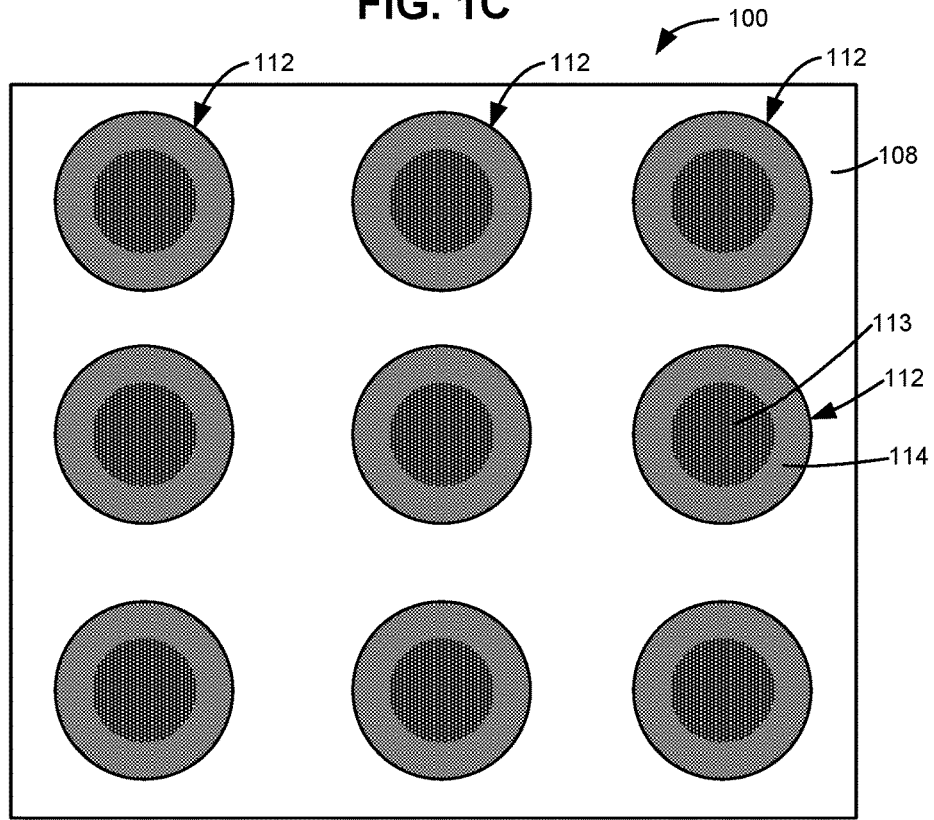

FIG. 1D is a top view of the plurality of patterned reflectors 112 on the light guide plate 108. Each patterned reflector 112 may include a first area 113 and a second area 114. The first area 113 may be more reflective than the second area 114, and the second area 114 may be more transmissive than the first area 113. The patterned reflector 112 may additionally have a third, a fourth and so on areas with different properties, or its properties may be changing in a continuous and smooth way with distance from its center. While in the embodiment illustrated in FIG. 1D, each patterned reflector 112 is circular in shape, in other embodiments each patterned reflector 112 may have another suitable shape (e.g., rectangular, hexagonal, etc.). With the patterned reflectors 112 fabricated directly on the upper surface of the light guide plate 108, the patterned reflectors 112 increase the ability of hiding the light sources 106. Fabricating patterned reflectors 112 directly on the upper surface of the light guide plate 108 also saves space. In certain exemplary embodiments, each patterned reflector 112 is a diffuse reflector, such that each patterned reflector 112 further enhances the performance of the backlight 100 by scattering some light rays at high enough angles such that they can propagate in the light guide plate 108 by total internal reflection. Such rays will then not experience multiple bounces between the patterned reflectors 112 and the reflective layer 104 or between an optical film stack and the reflective layer 104 and therefore avoid loss of optical power, thereby increasing the backlight efficiency. In certain exemplary embodiments, each patterned reflector 112 is a specular reflector. In other embodiments, some areas of each patterned reflector 112 have a more diffuse character of reflectivity and some areas have a more specular character of reflectivity.

Figure 2A:
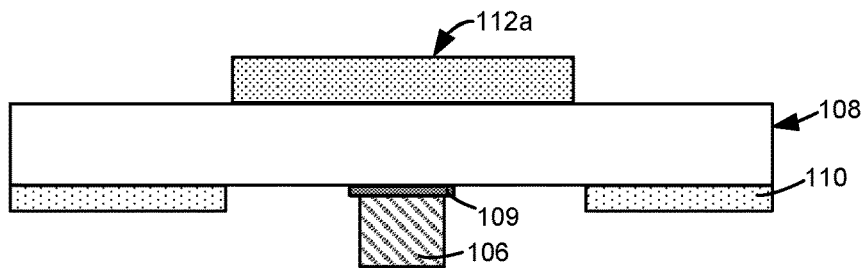
FIGS. 2A-2D are cross-sectional views of exemplary patterned reflectors on a light guide plate.

FIG. 2A is a cross-sectional view of an exemplary patterned reflector 112a. In certain exemplary embodiments, patterned reflector 112a may be used for each patterned reflector 112 of FIGS. 1A and 1D. Patterned reflector 112a is arranged on the upper surface of the light guide plate 108 and is aligned with the light source 106. Patterned reflector 112a includes a single layer having a constant thickness. Patterned reflector 112a may be formed, for example, by printing (e.g., inkjet printing, screen printing, microprinting, etc.) a pattern with white ink, black ink, metallic ink, or other suitable ink. Patterned reflector 112a may also be formed by first depositing a continuous layer of a white or metallic material, for example by physical vapor deposition (PVD) or any number of coating techniques such as for example slot die or spray coating, and then patterning the layer by photolithography or other known methods of area-selective material removal. Patterned reflector 112a may have a varying optical density. The varying optical density may be achieved, for example, by printing a variable proportion of clear and reflective ink on light guide plate 108 or by printing an ink of variable thickness. The varying optical density may also be achieved by making the patterned reflector 112a discontinuous, meaning that the reflective material is present in some places and not present in some other places, according to a predetermined pattern. In certain exemplary embodiments, the patterned reflector 112a could be a continuous layer with small gaps where the reflective material is not present. In other embodiments, the patterned reflector 112a may consist of relatively small isolated patches of reflective material separated by relatively large empty space. The proportion of covered and empty space within the patterned reflector may vary between 0 and 100 percent.

Figure 2B:
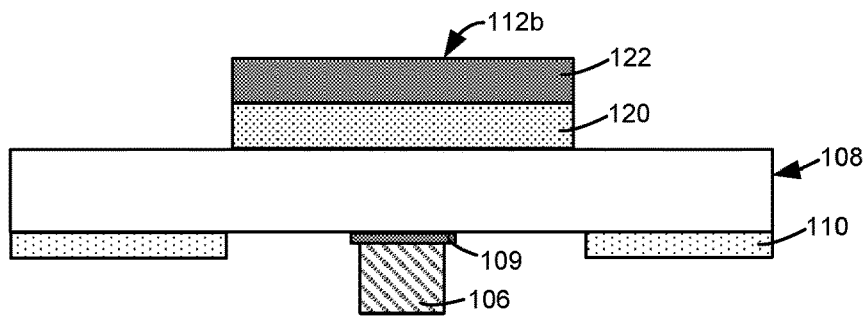

FIG. 2B is a cross-sectional view of an exemplary patterned reflector 112b. In certain exemplary embodiments, patterned reflector 112b may be used for each patterned reflector 112 of FIGS. 1A and 1D. Patterned reflector 112b is arranged on the upper surface of the light guide plate 108 and is aligned with the light source 106. Patterned reflector 112b includes a first layer 120 on the upper surface of the light guide plate 108 and a second layer 122 on the upper surface of the first layer 120. In certain exemplary embodiments, each of the first layer 120 and the second layer 122 may have a constant thickness. The constant thickness of the first layer 120 and the second layer 122, however, may be different for each layer. In other embodiments, each of the first layer 120 and the second layer 122 may have a variable thickness.

Each of the first layer 120 and the second layer 122 may have a varying optical density. The second layer 122 may vary from the first layer 120 in reflection, absorption, and/or transmission. Each of the first layer 120 and the second layer 122 may be absorptive, for example, by containing black material. Each of the first layer 120 and the second layer 122 may be reflective, for example, by containing white or metallic material. Each of the first layer 120 and the second layer 122 may also be both absorptive and reflective by containing more than one type of material, such as inks with added metal particles (e.g., silver, aluminum, etc.). In this case, the absorptive and/or reflective properties may vary over the patterned reflector area.

Figure 2C:
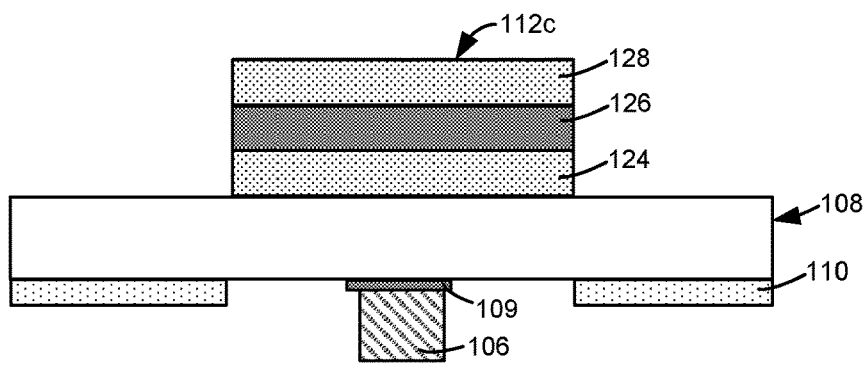

FIG. 2C is a cross-sectional view of an exemplary patterned reflector 112c. In certain exemplary embodiments, patterned reflector 112c may be used for each patterned reflector 112 of FIGS. 1A and 1D. Patterned reflector 112c is arranged on the upper surface of the light guide plate 108 and is aligned with the light source 106. Patterned reflector 112c includes a first layer 124 on the upper surface of the light guide plate 108, a second layer 126 on the upper surface of the first layer 124, and a third layer 128 on the upper surface of the second layer 126. In certain exemplary embodiments, each of the first layer 124, the second layer 126, and the third layer 128 may have a constant thickness. The constant thickness of the first layer 124, the second layer 126, and the third layer 128, however, may be different for each layer.

Each of the first layer 124, the second layer 126, and the third layer 128 may have a varying optical density. Each of the first layer 124, the second layer 126, and the third layer 128 may vary from each other in reflection, absorption, and/or transmission. Each of the first layer 124, the second layer 126, and the third layer 128 may be absorptive, for example, by containing black material. Each of the first layer 124, the second layer 126, and the third layer 128 may be reflective, for example, by containing white or metallic material. Each of the first layer 124, the second layer 126, and the third layer 128 may also be both absorptive and reflective by containing more than one type of material, such as inks with added metal particles (e.g., silver, aluminum, etc.). In this case, the absorptive and/or reflective properties may vary over the patterned reflector area. In certain exemplary embodiments, the first layer 124 and the third layer 128 are more reflective than the second layer 126, and the second layer 126 is more absorptive than the first layer 124 and the third layer 128. In this case, patterned reflector 112c reflects most of the light emitted from the top surface of the light source 106 as well as light redirected from a diffuser plate or other optical film above the light guide plate 108, while effectively blocking most of the light going directly through the patterned reflector 112c. Each of the layers 124, 126, and 128 could also be discontinuous with the proportion of the layer area where the reflective or absorptive material is present versus the layer area where it is not present being between 0 and 100 percent. Although all three layers 124, 126, and 128 are shown in FIG. 2C as having the same size (i.e., width), in various embodiments they may have different sizes. For example, the size of the layer 126 may be smaller than the layers 124 and 128, in which case layers 124 and 128 will be directly on top of each other at the periphery of the patterned reflector 112c. In other embodiments, the size of the layer 126 may be larger than layers 124 and 128, in which case the periphery of the layer 126 will be directly on the light guide plate top surface. In reference to FIG. 1D, different areas 113, 114 of the patterned reflector 112 could have a different number of layers and/or a different pattern within the layers.

Figure 2D:
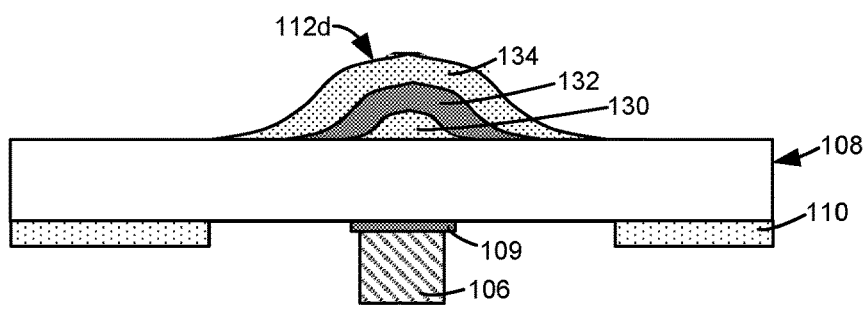

FIG. 2D is a cross-sectional view of an exemplary patterned reflector 112d. In certain exemplary embodiments, patterned reflector 112d may be used for each patterned reflector 112 of FIGS. 1A and 1D. Patterned reflector 112d is arranged on the upper surface of the light guide plate 108 and is aligned with the light source 106. Patterned reflector 112d includes a first layer 130 on the upper surface of the light guide plate 108, a second layer 132 on the upper surface of the first layer 130 and on the upper surface of the light guide plate 108, and a third layer 134 on the upper surface of the second layer 132 and on the upper surface of the light guide plate 108. In certain exemplary embodiments, each of the first layer 130, the second layer 132, and the third layer 134 may have a varying thickness such that patterned reflector 112d may have a varying thickness. The varying thickness of each of the first layer 130, the second layer 132, and the third layer 134 may, for example, be formed by printing each respective layer to include a different amount of ink versus position for each respective layer. The maximum thickness of each of the first layer 130, the second layer 132, and the third layer 134 may be centered with the light source 106.

Each of the first layer 130, the second layer 132, and the third layer 134 may have a varying optical density. Each of the first layer 130, the second layer 132, and the third layer 136 may vary from each other in reflection, absorption, and/or transmission. Each of the first layer 130, the second layer 132, and the third layer 134 may be absorptive, for example, by containing black material. Each of the first layer 130, the second layer 132, and the third layer 134 may be reflective, for example, by containing white or metallic material. Each of the first layer 130, the second layer 132, and the third layer 134 may also be both absorptive and reflective by containing more than one type of material, such as inks with added metal particles (e.g., silver, aluminum, etc.). In this case, the absorptive and/or reflective properties may vary over the patterned reflector area. In certain exemplary embodiments, the first layer 130 and the third layer 134 are more reflective than the second layer 132, and the second layer 132 is more absorptive than the first layer 130 and the third layer 134. In this case, patterned reflector 112d reflects most of the light emitted from the top surface of the light source 106 as well as light redirected from a diffuser plate or other optical film above the light guide plate 108, while effectively blocking most of the light going directly through the patterned reflector 112d.

In certain exemplary embodiments where white light sources 106 are used, the presence of different reflective and absorptive materials in variable density in the patterned reflectors 112a-112d may be beneficial for minimizing the color shift across each of the dimming zones of the backlight. Multiple bounces of light rays between the patterned reflectors and the reflective layer 104 (FIG. 1A) may cause more loss of light in the red part of the spectrum than in the blue, or vice versa. In this case, engineering the reflection to be color neutral, for example by using slightly colored reflective/absorptive materials, or materials with the opposite sign of dispersion (in this case, dispersion means spectral dependence of the reflection and/or absorption) may minimize the color shift.

Figure 3:
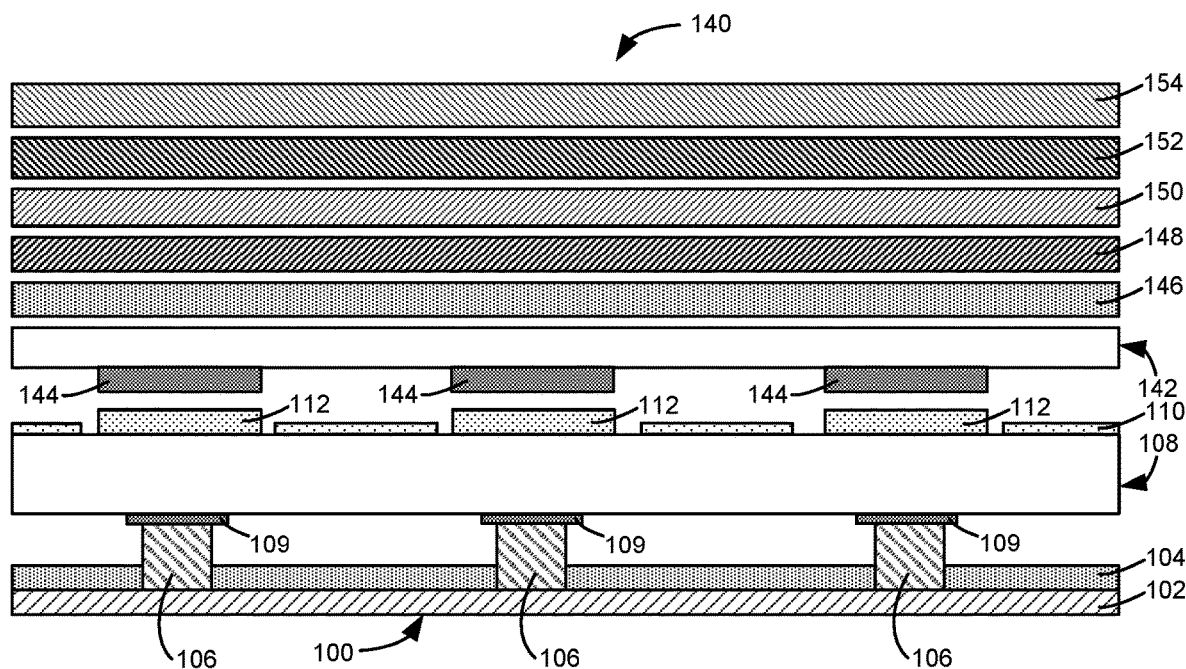
FIG. 3 is a cross-sectional view of an exemplary liquid crystal display (LCD) including a separate layer including patterned reflectors.

FIG. 3 is a cross-sectional view of an exemplary liquid crystal display (LCD) 140. LCD 140 includes a backlight 100 including first patterned reflectors 112 as previously described and illustrated with reference to FIGS. 1A-1D. In addition, LCD 140 includes a layer 142 over backlight 100, optionally a diffuser plate 146 over the layer 142, optionally a quantum dot film 148 over the diffuser plate 146, optionally a prismatic film 150 over the quantum dot film 148, optionally a reflective polarizer 152 over the prismatic film 150, and a display panel 154 over the reflective polarizer 152. Layer 142 includes a plurality of second patterned reflectors 144. Each of the second patterned reflectors 144 is aligned with a corresponding first patterned reflector 112.

Layer 142 may include a glass or transparent plastic material on which patterned reflectors 144 are formed. In certain exemplary embodiments, layer 142 may include the same or similar material as light guide plate 108. Each patterned reflector 144 may include the same or similar materials as patterned reflectors 112 and may be fabricated using the same or similar processes as those used to fabricate patterned reflectors 112. Using two separate patterned reflectors (i.e., first patterned reflectors 112 and second patterned reflectors 144) may add thickness and cost to the backlight, however, using two separate patterned reflectors may allow the use of a reduced number of reflective layers and/or a reduced layer thickness for both the first patterned reflectors 112 and the second patterned reflectors 144. As a result, both of the first patterned reflectors 112 and the second patterned reflectors 144 may be easier to fabricate. Additionally, both of the first patterned reflectors 112 and the second patterned reflectors 144 may be more durable due to better adhesion strength when the total thickness is less.

Figure 4:
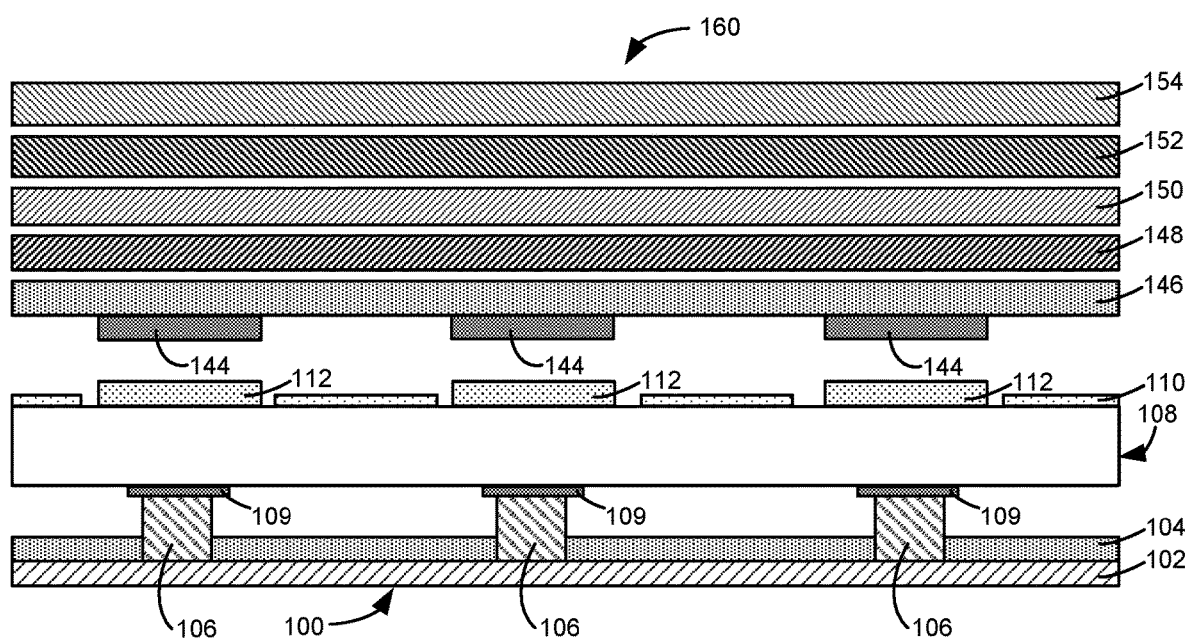
FIG. 4 is a cross-sectional view of an exemplary LCD including a diffuser plate with patterned reflectors.

FIG. 4 is a cross-sectional view of an exemplary LCD 160. LCD 160 is similar to LCD 140 previously described and illustrated with reference to FIG. 3, except that in LCD 160 second patterned reflectors 144 are formed on diffuser plate 146 instead of on the separate layer 142. In this example, each patterned reflector 144 may include the same or similar materials as patterned reflectors 112 and may be fabricated using the same or similar processes as those used to fabricate patterned reflectors 112. While second patterned reflectors 144 are formed on the lower surface of diffuser plate 146 in FIG. 4, in other embodiments second patterned reflectors 144 may be formed on the upper surface of diffuser plate 146. In other embodiments, second patterned reflectors 144 may be formed on the upper or lower surface of another adjacent optical component of LCD 160. Compared to LCD 140 of FIG. 3, LCD 160 may have a smaller overall thickness.

The optical component (e.g., diffuser plate) on which the second patterned reflectors 144 are fabricated should be accurately aligned with the light guide plate 108 for the first reflectors 112 and the second reflectors 144 to work correctly together. Since the material of the diffuser plate or other optical component on which the second reflectors 144 may be fabricated may have different coefficients of thermal expansion than the light guide plate 108, a small misalignment between the light sources 106, the first patterned reflectors 112 on the light guide plate 108, and the second patterned reflectors 144 may occur because of environmental changes. This small misalignment, however, should not be a significant issue when the size of the backlight is small or when the pitch of the light sources 106 is large.

To maintain the alignment between the light sources 106 and the patterned reflectors 112 on the light guide plate 108 for the proper functioning of the backlight 100, it is advantageous if the light guide plate 108 and the substrate 102 are made of the same or similar type of material so that both the patterned reflectors 112 on the light guide plate 108 and the light sources 106 on the substrate 102 are registered well to each over a large range of operating temperatures. Similarly, when the second patterned reflectors 144 are included, it is advantageous if the second patterned reflectors 144 are made on the same or similar type of material as the light guide plate 108, so the second patterned reflectors 144 and the first patterned reflectors 112 on the light guide plate 108 are registered well to each other over a large range of operating temperatures. In certain exemplary embodiments, the light guide plate 108 and the substrate 102 are made of the same plastic material. In other embodiments, the light guide plate 108 and the substrate 102 are made of the same type of glass. In yet other embodiments, the light guide plate 108, the substrate 102, and the layer 142 (FIG. 3) are all made of the same type of glass.

An alternative solution to keep the light guide plate 108 and light sources 106 on the substrate 102 in alignment is to use a highly flexible substrate. The highly flexible substrate may be made of a polyimide or other high temperature resistant polymer film to allow component soldering. The highly flexible substrate may also be made of materials such as FR4 or fiberglass, but of a significantly lower thickness than usual. In certain exemplary embodiments, an FR4 material of 0.4 millimeters thickness may be used for substrate 102, which may be sufficiently flexible to absorb the dimensional changes resulting from changing operating temperatures.

Figure 5A:
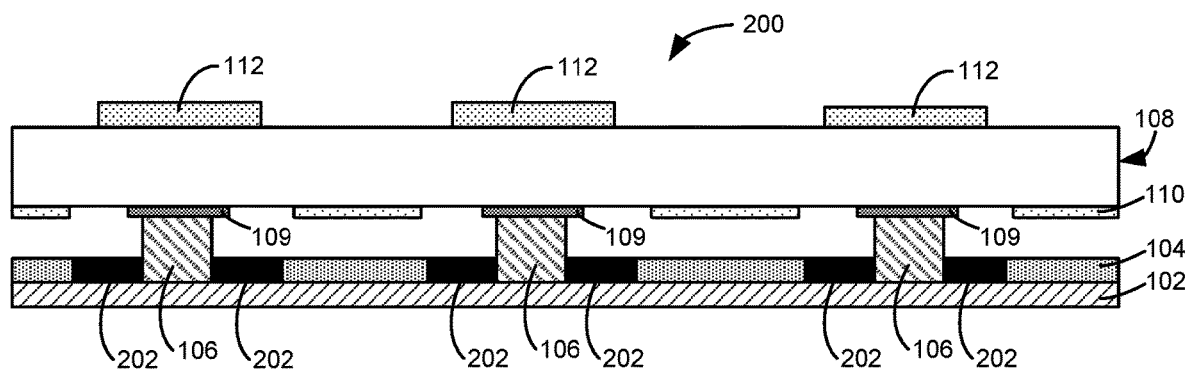
FIGS. 5A-5C are various views of an exemplary backlight including patterned reflectors and absorptive elements.
Figure 5B:
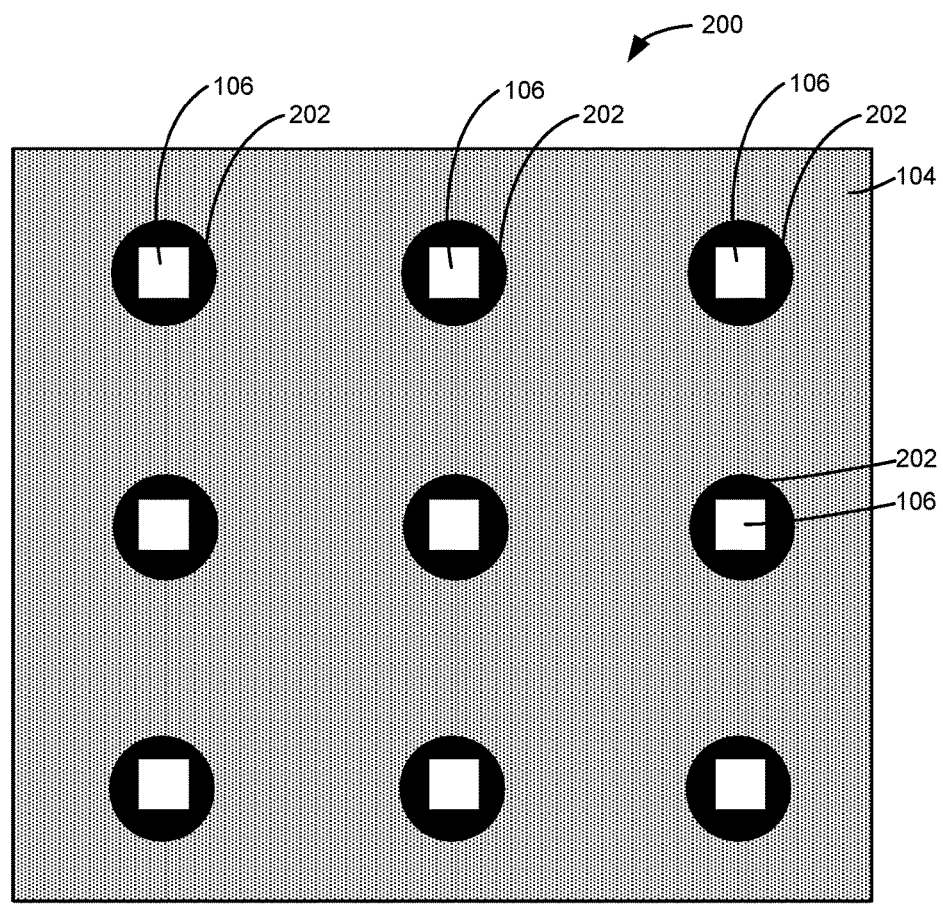
Figure 5C:
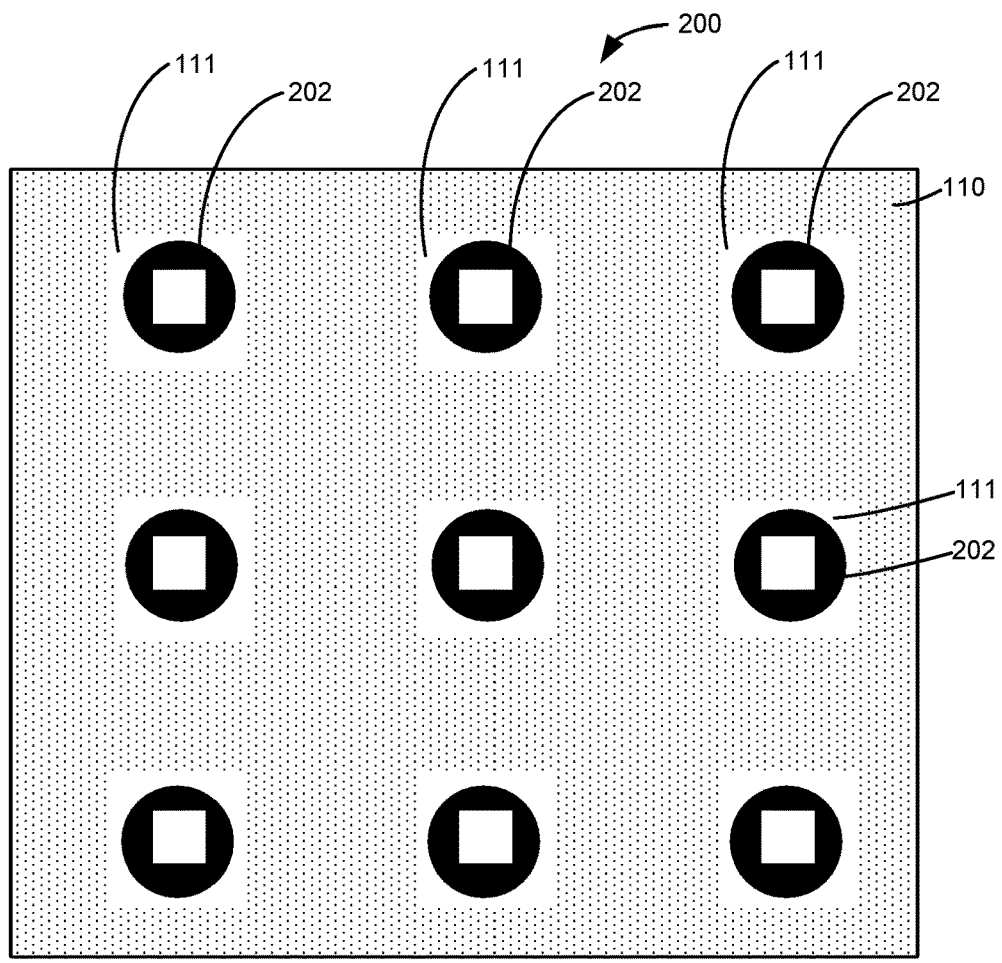

FIGS. 5A-5C are various views of an exemplary backlight 200. FIG. 5A is a cross-sectional view of backlight 200. Backlight 200 may include a substrate 102, a reflective layer 104, a plurality of light sources 106, a light guide plate 108, and a plurality of patterned reflectors 112 as previously described and illustrated with reference to FIGS. 1A-1D. In addition, backlight 200 includes a plurality of absorptive elements 202. Each absorptive element 202 laterally surrounds a corresponding light source 106. The reflective layer 104 is on the substrate 102 and surrounds each absorptive element 202. Each absorptive element 202 has a lower reflectance than the reflective layer 104. In certain exemplary embodiments, each absorptive element 202 may have a reflectance lower than about 4 percent, or within a range between about 1 and about 85 percent. In other embodiments, each absorptive element 202 might have a reflectance that varies depending on the radial distance to the center of the light source 106, for example is smaller closer to the light source and larger away from the light source 106. Each absorptive element 202 may also have a shape of a ring, meaning that it might start at a certain distance from the light source 106 and end at a larger distance.

FIG. 5B is a top view of the plurality of light sources 106, reflective layer 104, and absorptive elements 202 on substrate 102. While in the embodiment illustrated in FIG. 5B each absorptive element 202 is circular in shape, in other embodiments each absorptive element 202 may have another suitable shape (e.g., rectangular, hexagonal, etc.). FIG. 5C is a top view of the pattern of light extractors 110 and absorptive elements 202. The pattern of light extractors 110 includes a plurality of gaps 111. Each gap 111 is aligned with a corresponding light source 106, a corresponding absorptive element 202, and a corresponding patterned reflector 112.

The absorptive elements 202 may be a black paper, black plastic, black paint, black ink, a chemically altered (e.g., anodized) metal, or another suitable optically absorptive material. The absorptive elements 202 may be positioned anywhere between the substrate 102 and the lower surface of the light guide plate 108. For example, the absorptive elements 202 may be painted or laminated directly to the substrate 102 surface or wrapped around each light source 106.

Figure 6:
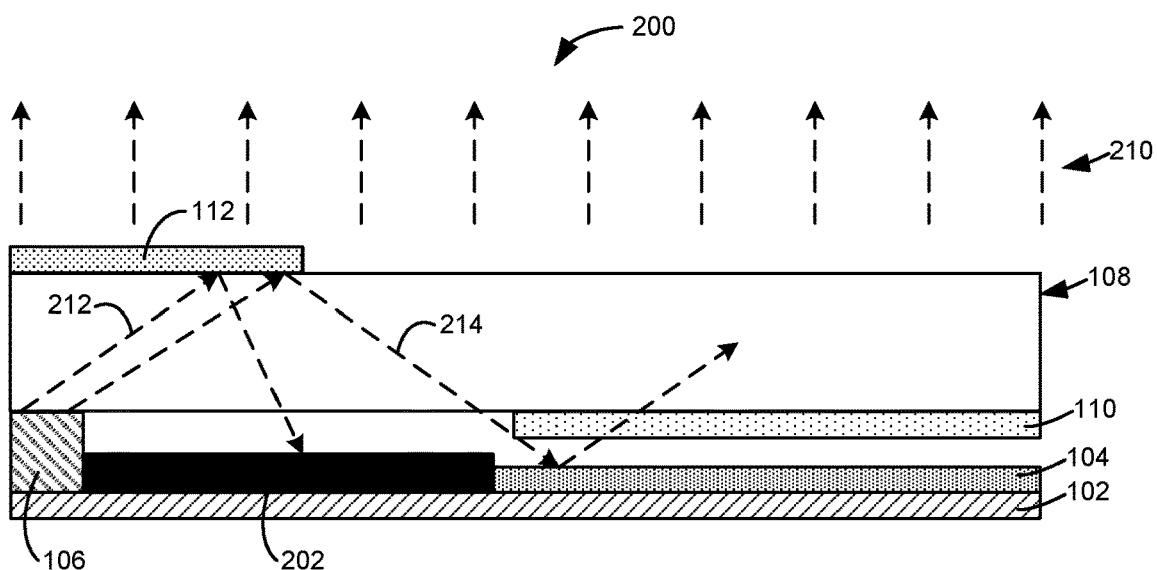
FIG. 6 is a simplified cross-sectional view of an exemplary backlight including a patterned reflector and an absorptive element.

FIG. 6 is a simplified cross-sectional view of an exemplary backlight 200 including a patterned reflector 112 and an absorptive element 202. Light rays 210 indicate light escaping from backlight 200. Light ray 212 indicates light that is reflected by patterned reflector 112 and then absorbed by absorptive element 202 and thus does not escape backlight 200. Light ray 214 indicates light that is reflected by patterned reflector 112 and then reflected by reflective layer 104 back to light guide plate 108 where the light may escape backlight 200.

The function of the absorptive elements 202 is to increase the luminance uniformity of the backlight 200. More specifically, it has been observed that placing a high reflectivity reflector (i.e., patterned reflector 112) on the upper surface of the light guide plate 108 directly above the light sources 106 may cause a bright ring or halo to appear adjacent to the outer edge of the reflector. This is due to the light rays emitted from the light source 106 at a small angle (i.e., nearly vertical) that, after multiple bounces between the light source and the patterned reflector 112, and/or reflective layer 104 and the patterned reflector 112, escape upwards as soon as the light rays hit the top surface of the light guide plate 108 where the light guide plate is not covered by the patterned reflector 112. The absorptive elements may eliminate or reduce the number of such rays and thereby may remove or reduce the halo.

The same effect may be achieved if the size of the patterned reflector 112 is increased, while making the patterned reflector less and less dense from the center towards the edge. Increasing the size of the patterned reflector 112 to suppress the halo, however, may lead to a decreased backlight efficiency. When the absorptive element 202 is included, the size of the patterned reflector 112 may be reduced and the backlight efficiency may be improved. In certain exemplary embodiments, the size of each absorptive element 202 is within the range of about 0.5 to 5 times the thickness of the light guide plate 108 on all sides of the light source 106. For example, if the light source 106 is a 1 by 1 millimeter LED chip and the light guide plate thickness is 1 millimeter, the size of the absorptive element may be between 2 by 2 millimeters and 11 by 11 millimeters. The absorptive element may also be a rectangle with rounded corners, or a circle with the diameter between 2 and 11 millimeters.

Figure 7A:
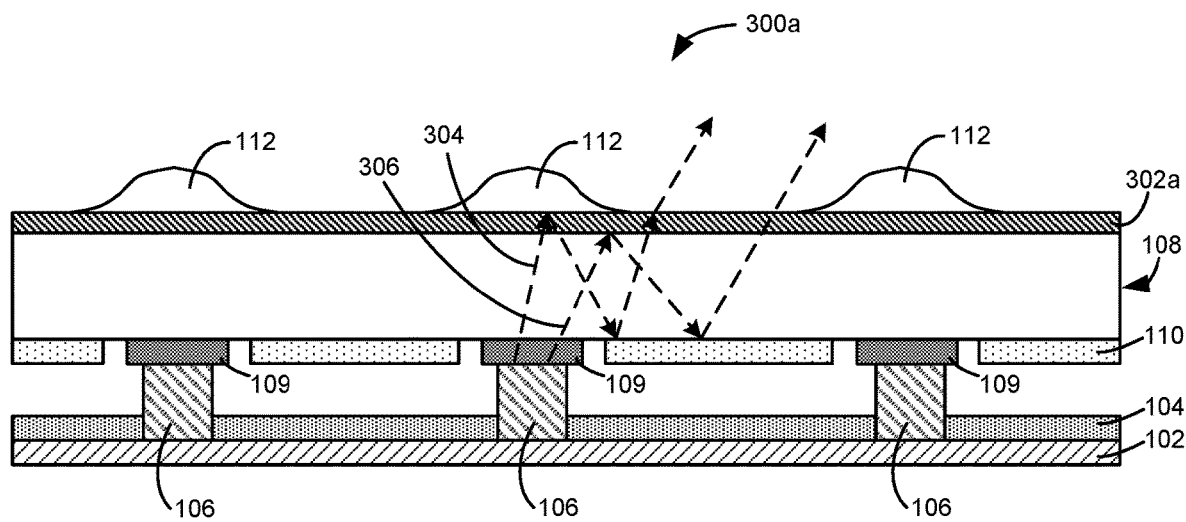
FIGS. 7A and 7B are cross-sectional views of exemplary backlights including patterned reflectors and a low index material.

FIG. 7A is a cross-sectional view of an exemplary backlight 300a. Backlight 300a may include a substrate 102, a reflective layer 104, a plurality of light sources 106, and a light guide plate 108 as previously described and illustrated with reference to FIGS. 1A-1D. In addition, backlight 300a may include a single continuous layer of low index material 302a on the upper surface of the light guide plate 108. Patterned reflectors 112 are on the upper surface of the layer of low index material 302a and aligned with light sources 106. In the example illustrated in FIG. 7A, each patterned reflector 112 has a varying thickness.

As a result of the layer of low index material 302a presence on the upper surface of the light guide plate 108, and the patterned reflectors 112 placed over the layer of low index material 302a, low angle rays, such as ray 304 (i.e., nearly along the normal direction of the light guide plate 108), may be reflected back into the light guide plate 108 by the thicker portions of the patterned reflector 112. High angle rays, such as ray 306, may be reflected back into the light guide plate 108 due to the total internal reflection at the interface of the light guide plate 108 and the layer of low index material 302a despite the fact that the patterned reflector 112 is thin above the location where ray 306 intersects the upper surface of the light guide plate 108. Both low angle and high angle rays may then be subsequently extracted out of the light guide plate 108 by the light extractors 110 with variable density to achieve improved luminance uniformity. Without the layer of low index material 302a, high angle rays may be undesirably extracted out of the backlight by the thinner portions of the patterned reflector 112, which may reduce the luminance uniformity.

The low index material 302a has a lower refractive index than the light guide plate material. In certain exemplary embodiments, the low index material 302a has a refractive index equal to about 1.25 (e.g., for a polymer filled with hollow silica particles), about 1.3 (e.g., for fluorinated polymers), or about 1.37 (e.g., for magnesium fluoride). As a result, some high angle light from the light source 106 may be trapped inside the light guide plate 108 without getting into the low index material 302a but may still be extracted out by the light extractors 110 on the lower surface of the light guide plate 108.

Figure 7B:
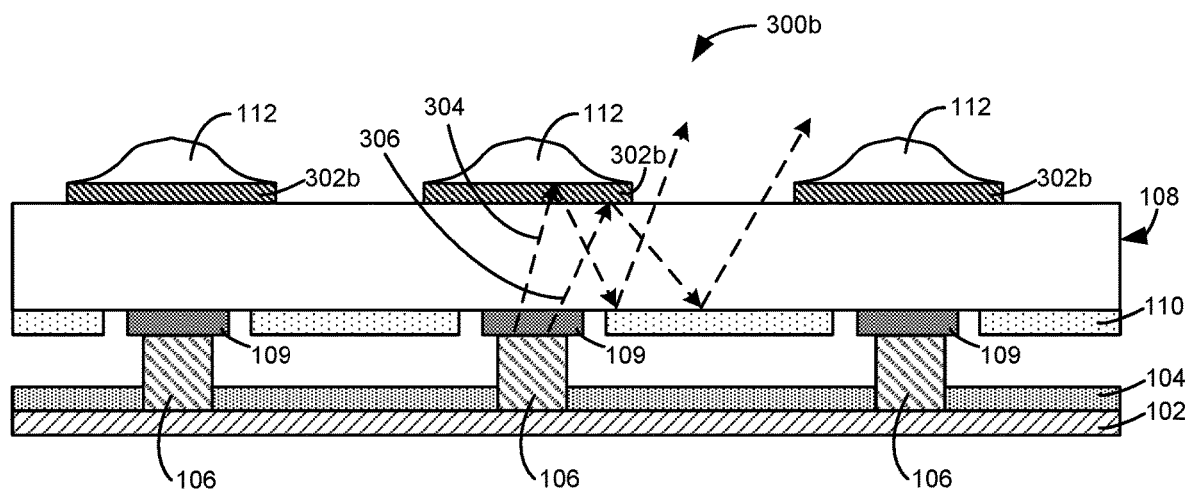

FIG. 7B is a cross-sectional view of an exemplary backlight 300b. Backlight 300b is similar to backlight 300a previously described and illustrated with reference to FIG. 7A except that in backlight 300b, layer of low index material 302a is replaced with a plurality of low index material layers 302b. Each patterned reflector 112 is aligned with a corresponding low index material layer 302b. The plurality of low index material layers 302b provide the same function as the layer of low index material 302a of FIG. 7A.

Figure 8:
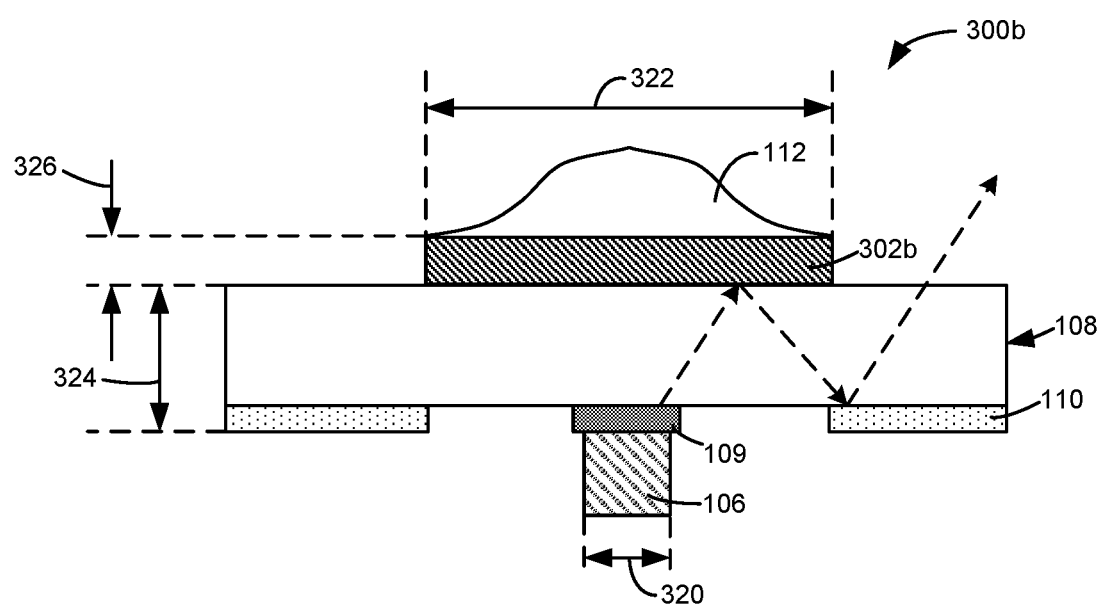
FIG. 8 is a simplified cross-sectional view of an exemplary backlight including a top emitting light source, a patterned reflector, and a low index material.

FIG. 8 is a simplified cross-sectional view of the exemplary backlight 300b of FIG. 7B. Referring to FIG. 8, the light guide plate 108 has a thickness T1 indicated at 324 and a refractive index n1 at the wavelength of interest, while the low index material 302b has a thickness T2 indicated at 326 and a refractive index n2 at the wavelength of interest. The wavelength of interest may, for example, be 450±30 nanometers for a blue light source, 550±30 nanometers for a green or white light source, or 650±30 nanometers for a red light source. The size S0 (i.e., width or diameter) of the light source 106 is indicated at 320. The size S2 (i.e., width or diameter) of the low index material 302b is indicated at 322.

In certain exemplary embodiments, the minimum size S2 of the low index material is given by:

$$S2 = S0 + 2T1 * \tan(\theta c)$$

where θc is the total internal critical angle for rays incident from the light guide plate 108 upon the low index material 302b, and is determined by:

$$\theta c = \sin^{-1}\left(\frac{n2}{n1}\right)$$

Or $$S2 = S0 + 2T1 * \tan\left(\sin^{-1}\left(\frac{n2}{n1}\right)\right)$$

TABLE 1

Various examples showing the dependence of the minimum size S2 of the low index material and the critical angle θc on light source size S0, light guide plate thickness T1, light guide plate refractive index n1, and the low index material refractive index n2.

| | | | | | | | | | |
|---|---|---|---|---|---|---|---|---|---|
| S0 (mm) | 2 | 2 | 2 | 2 | 2 | 2 | 2 | 2 | 2 |
| T1 (mm) | 1.1 | 1.1 | 1.1 | 1.1 | 1.1 | 1.1 | 1.1 | 1.1 | 1.1 |
| n1 | 1.49 | 1.49 | 1.49 | 1.49 | 1.49 | 1.49 | 1.49 | 1.49 | 1.49 |
| n2 | 1 | 1.1 | 1.15 | 1.2 | 1.25 | 1.3 | 1.35 | 1.4 | 1.45 |
| θc (Degree) | 42.2 | 47.6 | 50.5 | 53.6 | 57.0 | 60.7 | 65.0 | 70.0 | 76.7 |
| S2 (mm) | 3.99 | 4.41 | 4.67 | 4.99 | 5.39 | 5.93 | 6.71 | 8.04 | 11.30 |
| S0 (mm) | 2 | 2 | 2 | 2 | 2 | 2 | 2 | 2 | 2 |
| T1 (mm) | 1.1 | 1.1 | 1.1 | 1.1 | 1.1 | 1.1 | 1.1 | 1.1 | 1.1 |
| n1 | 1.59 | 1.59 | 1.59 | 1.59 | 1.59 | 1.59 | 1.59 | 1.59 | 1.59 |
| n2 | 1 | 1.1 | 1.15 | 1.2 | 1.25 | 1.3 | 1.35 | 1.4 | 1.45 |
| θc (Degree) | 39.0 | 43.8 | 46.3 | 49.0 | 51.8 | 54.8 | 58.1 | 61.7 | 65.8 |
| S2 (mm) | 3.78 | 4.11 | 4.30 | 4.53 | 4.80 | 5.12 | 5.54 | 6.09 | 6.89 |
| S0 (mm) | 2 | 2 | 2 | 2 | 2 | 2 | 2 | 2 | 2 |
| T1 (mm) | 1.1 | 1.1 | 1.1 | 1.1 | 1.1 | 1.1 | 1.1 | 1.1 | 1.1 |
| n1 | 1.8 | 1.8 | 1.8 | 1.8 | 1.8 | 1.8 | 1.8 | 1.8 | 1.8 |
| n2 | 1 | 1.1 | 1.15 | 1.2 | 1.25 | 1.3 | 1.35 | 1.4 | 1.45 |
| θc (Degree) | 33.7 | 37.7 | 39.7 | 41.8 | 44.0 | 46.2 | 48.6 | 51.1 | 53.7 |
| S2 (mm) | 3.47 | 3.70 | 3.83 | 3.97 | 4.12 | 4.30 | 4.49 | 4.72 | 4.99 |
| S0 (mm) | 2 | 2 | 2 | 2 | 2 | 2 | 2 | 2 | 2 |
| T1 (mm) | 0.7 | 0.7 | 0.7 | 0.7 | 0.7 | 0.7 | 0.7 | 0.7 | 0.7 |
| n1 | 1.49 | 1.49 | 1.49 | 1.49 | 1.49 | 1.49 | 1.49 | 1.49 | 1.49 |
| n2 | 1 | 1.1 | 1.15 | 1.2 | 1.25 | 1.3 | 1.35 | 1.4 | 1.45 |
| θc (Degree) | 42.2 | 47.6 | 50.5 | 53.6 | 57.0 | 60.7 | 65.0 | 70.0 | 76.7 |
| S2 (mm) | 3.27 | 3.53 | 3.70 | 3.90 | 4.16 | 4.50 | 5.00 | 5.84 | 7.92 |

Table 1 shows in various examples the dependence of the minimum size S2 of the low index material and the critical angle θc on light source size S0, light guide plate thickness T1, light guide plate refractive index n1, and the low index material refractive index n2. In general, S2 increases with light guide plate thickness T1 and the ratio n2/n1. The refractive index of the low index material may be slightly smaller than that of the light guide plate, such as by a difference of about 0.01, 0.04, 0.1, 0.2, 0.3, or 0.4. The refractive index of the low index material may be slightly larger than 1, such as by a difference of about 0.005, 0.1, 0.2, 0.3, 0.3, or 0.4.

Figure 9A:
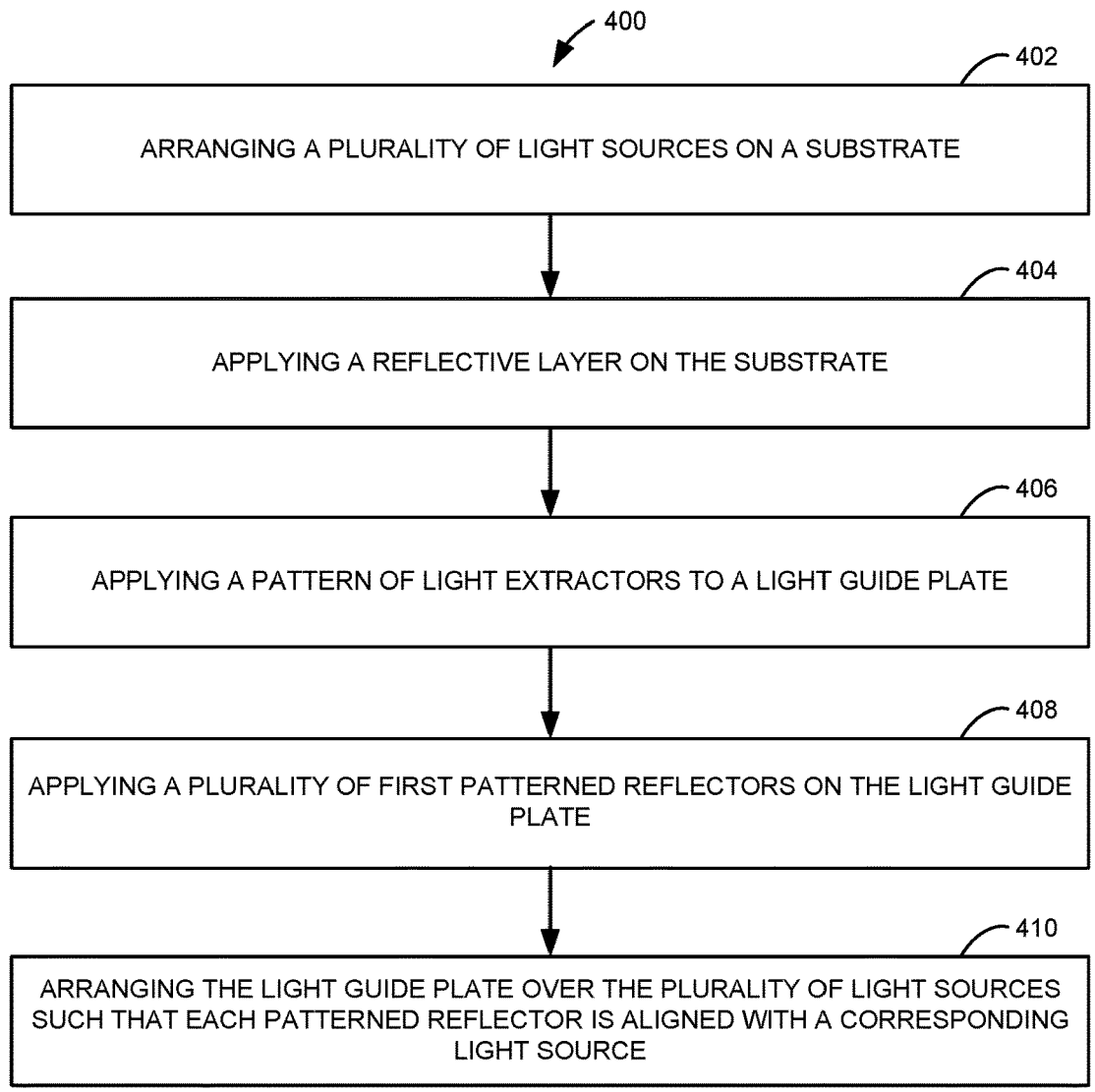
FIGS. 9A-9C are flow diagrams illustrating an exemplary method for fabricating a backlight.
Figure 9B:
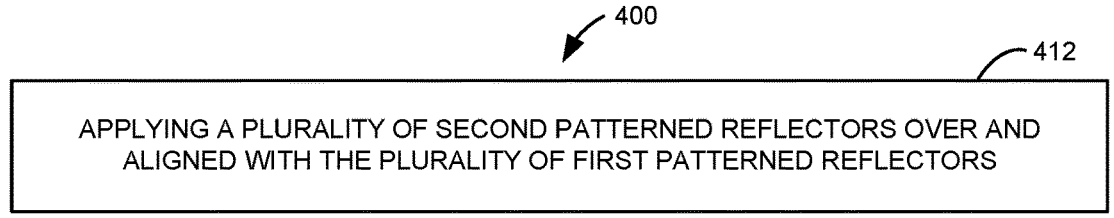
Figure 9C:
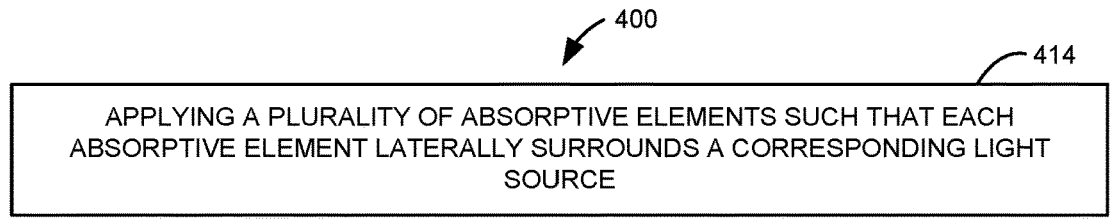

FIGS. 9A-9C are flow diagrams illustrating an exemplary method 400 for fabricating a backlight. Method 400 may, for example, be used to fabricate backlight 100 previously described and illustrated with reference to FIGS. 1A-1D, backlight 200 previously described and illustrated with reference to FIGS. 5A-5C, or backlights 300a or 300b previously described and illustrated with reference to FIGS. 7A-8. As illustrated in FIG. 9A, at 402 method 400 includes arranging a plurality of light sources on a substrate. For example, a plurality of light sources 106 may be arranged on and electrically connected to a substrate 102 as illustrated in FIG. 1A. At 404, method 400 includes applying a reflective layer on the substrate. For example, a reflective layer 104 may be applied to substrate 102 as illustrated in FIG. 1A. The reflective layer may be applied to the substrate via a printing process, a deposition process, a film application process, or another suitable process.

At 406, method 400 includes applying a pattern of light extractors to a light guide plate. For example, a pattern of light extractors 110 may be applied to a light guide plate 108 as illustrated in FIG. 1A. At 408, method 400 includes applying a plurality of first patterned reflectors on the light guide plate. For example, a plurality of first patterned reflectors 112 may be applied to light guide plate 108 as illustrated in FIG. 1A and as further described with reference to FIGS. 2A-2D. At 410, method 400 includes arranging the light guide plate over the plurality of light sources such that each patterned reflector is aligned with a corresponding light source. The light guide plate may be arranged over the light sources such that gaps in the pattern of light extractors (e.g., gaps 111 of pattern of light extractors 110 illustrated in FIG. 1C) are aligned with corresponding light sources. In certain exemplary embodiments, an optical adhesive (e.g., phenyl silicone) may be used to couple the plurality of light sources to the light guide plate.

In certain exemplary embodiments, applying the plurality of first patterned reflectors includes printing the plurality of first patterned reflectors on the light guide plate. Printing the plurality of first patterned reflectors may include, for example, printing a layer of white ink, black ink, or metallic ink for each first patterned reflector. In other examples, printing the plurality of first patterned reflectors may include printing a layer including a different amount of ink versus position for each first patterned reflector. In other examples, printing the plurality of first patterned reflectors includes printing a layer including a variable proportion of clear and reflective ink for each first patterned reflector.

As illustrated in FIG. 9B, at 412 method 400 may further include applying a plurality of second patterned reflectors over and aligned with the plurality of first patterned reflectors. For example, a plurality of patterned reflectors 144 as part of a separate layer 142 or as part of a diffuser plate 146 may be applied over and aligned with a plurality of patterned reflectors 112 as illustrated in FIGS. 3 and 4, respectively. As illustrated in FIG. 9C, at 414 method 400 may further include applying a plurality of absorptive elements such that each absorptive element laterally surrounds a corresponding light source. For example, a plurality of absorptive elements 202 may be applied such that each absorptive element laterally surrounds a corresponding light source 106 as illustrated in FIGS. 5A-5C. The absorptive elements may be applied, for example, by applying black paper, black plastic, black paint, black ink, a chemically altered (anodized) metal, or another suitable optically absorptive material to the portions of the substrate laterally surrounding each light source, to each light source itself, or to the portions of the lower surface of the light guide plate laterally surrounding each light source. The absorptive elements may be applied prior to arranging the light guide plate over the plurality of light sources.

Figure 10A:
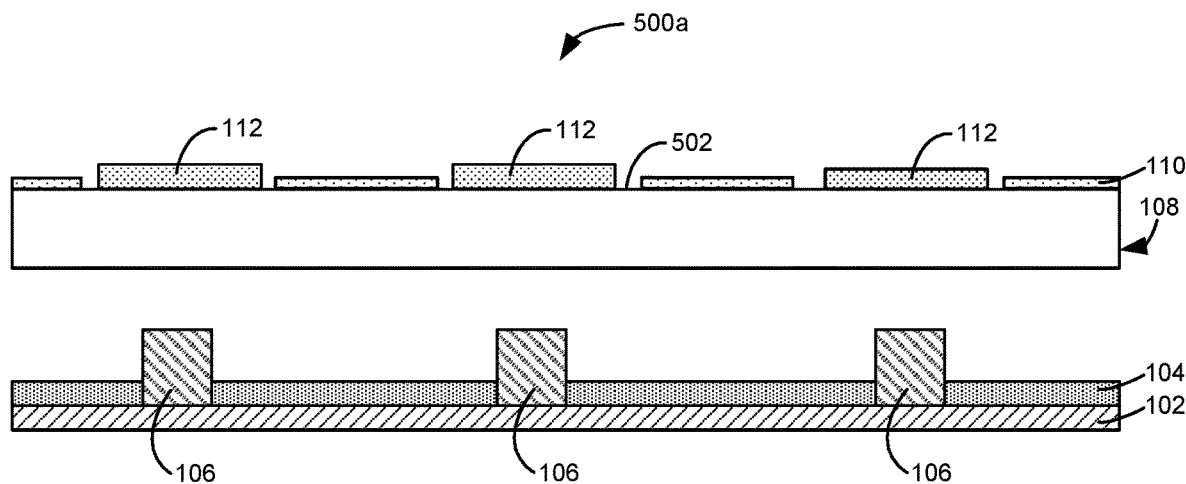
FIGS. 10A-10D are various views of exemplary backlights including patterned reflectors and light extractors on the same side of a light guide plate.

FIGS. 10A-10D are various views of exemplary backlights including patterned reflectors and light extractors on the same side of a light guide plate. FIG. 10A is a cross-sectional view of a backlight 500a. Backlight 500a may include a substrate 102, a reflective layer 104, a plurality of light sources 106, a light guide plate 108, and a plurality of patterned reflectors 112 as previously described and illustrated with reference to FIGS. 1A-1D. In this embodiment, however, the light guide plate 108 is spaced apart from the plurality of light sources 106. This spacing between the light guide plate 108 and the plurality of light sources 106 renders the bonding of the light sources 106 to the light guide plate 108 unnecessary, and eliminates issues and costs associated with the bonding of the light sources 106 to the light guide plate 108. This spacing becomes increasingly important when the size of the light sources 106 shrinks. When the light sources such as conventional LEDs having a size of more than 1 millimeter are replaced with mini-LEDs that have a size of less than 1 millimeter, or with micro-LEDs that have a size of less than about 0.1 millimeter, a reliable bonding of a plurality of the light sources to the light guide plate may be a significant challenge. The backlight according to the present disclosure removes this challenge.

Figure 10B:
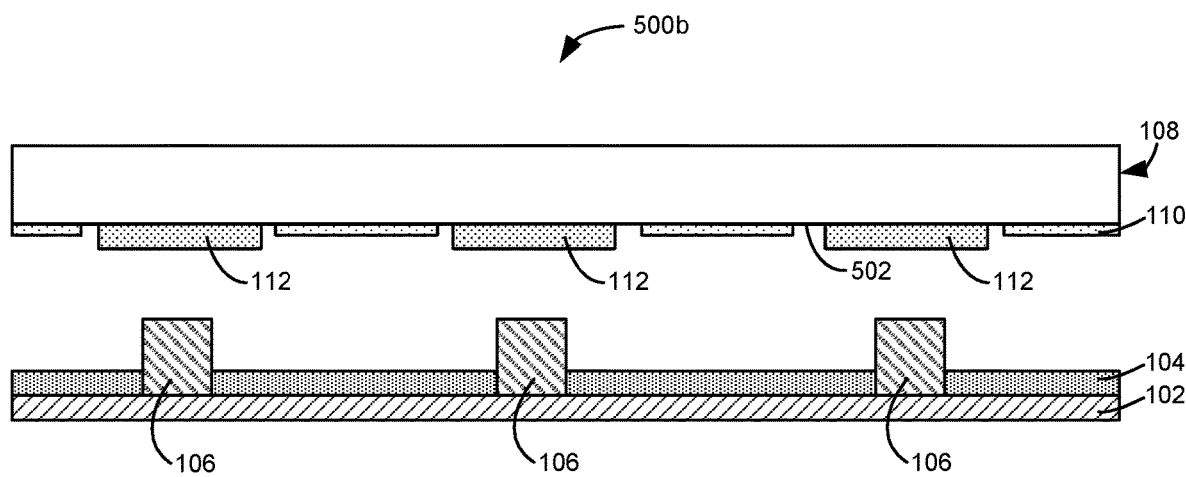

In addition, light guide plate 108 includes a pattern of light extractors 110 on a first surface 502 of the light guide plate. The plurality of patterned reflectors 112 are also on the first surface 502 of the light guide plate 108. By having the pattern of light extractors 110 and the plurality of patterned reflectors 112 on the same surface of the light guide plate 108, significant cost saving may be achieved over a light guide plate having the pattern of light extractors 110 and the plurality of patterned reflectors 112 on opposite surfaces of the light guide plate 108. Each patterned reflector 112 is aligned with a corresponding light source 106. As illustrated in FIG. 10A for backlight 500a, the first surface 502 of the light guide plate 108 may face way from the plurality of light sources 106. As illustrated in FIG. 10B for a backlight 500b, the first surface 502 of the light guide plate 108 may face the plurality of light sources 106.

Figure 10C:
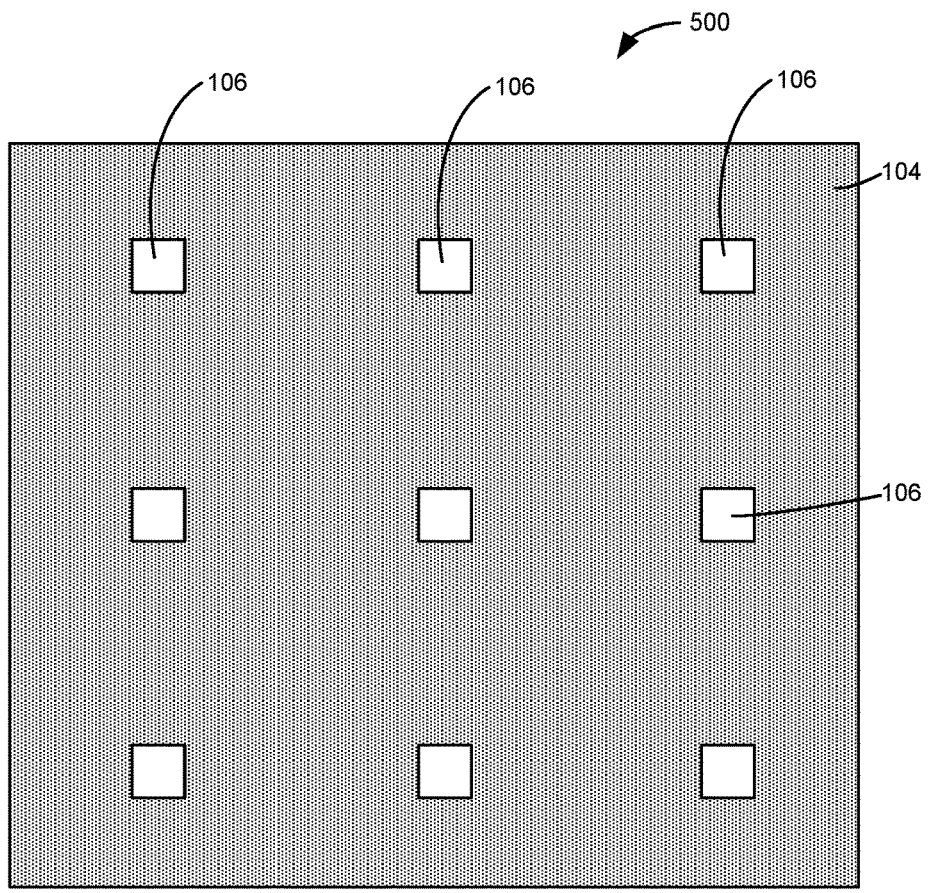

FIG. 10C is a top view of the plurality of light sources 106 and reflective layer 104 on substrate 102 for backlight 500a or 500b (collectively referred to as backlight 500). Light sources 106 are arranged in a 2D array including a plurality of rows and a plurality of columns. While nine light sources 106 are illustrated in FIG. 10C in three rows and three columns, in other embodiments backlight 500 may include any suitable number of light sources 106 arranged in any suitable number of rows and any suitable number of columns. Light sources 106 may also be arranged in other periodic patterns, for example, a hexagonal or triangular lattice, or as quasi-periodic or non-strictly periodic patterns. For example, the spacing between light sources 106 may be smaller at the edges and/or corners of the backlight. In addition, though the light sources 106 are shown as square shaped, it should be understood that the light sources may have other suitable shapes, such as a rectangle or a circle when viewed from the top.

Figure 10D:
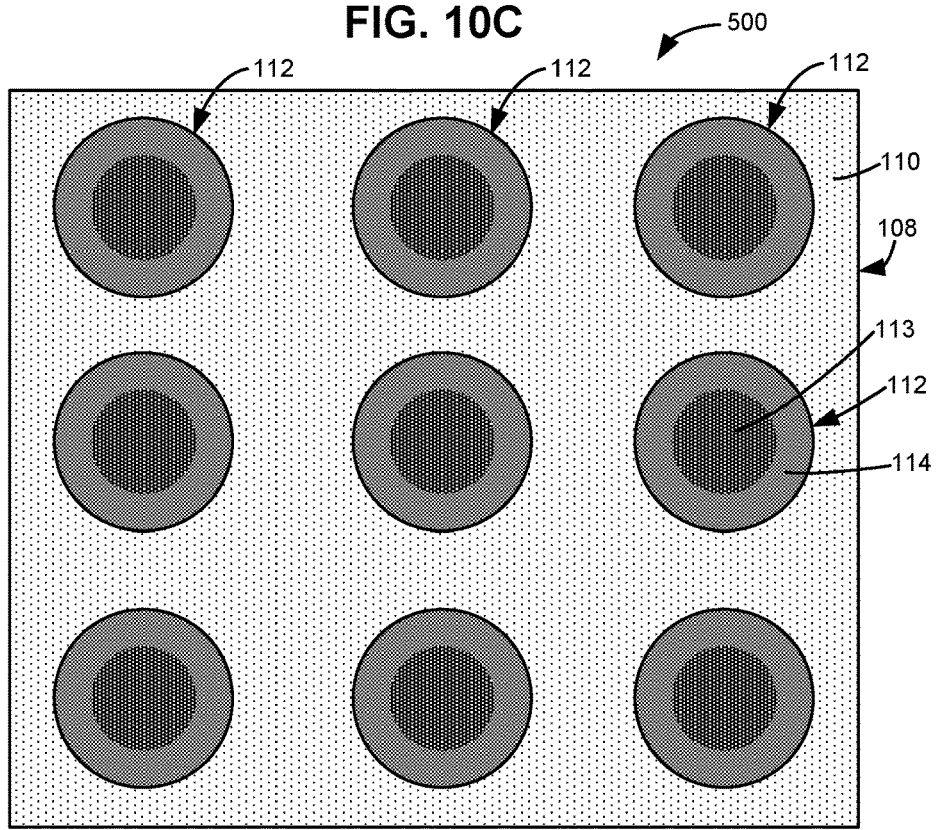

FIG. 10D is a top view of the plurality of patterned reflectors 112 and the pattern of light extractors 110 on the light guide plate 108. The pattern of light extractors 110 surrounds the plurality of patterned reflectors 112. The pattern of light extractors 110 was previously described with reference to FIG. 1C. Each patterned reflector 112 may include a first area 113 and a second area 114. The first area 113 may be more reflective than the second area 114, and the second area 114 may be more transmissive than the first area 113. The patterned reflector 112 may additionally have a third, a fourth and so on areas with different properties, or its properties may be changing in a continuous and smooth way with distance from its center. The patterned reflector 112 may include a varying transmittance that is lowest at locations that are nearest to the plurality of light sources 106. While in the embodiment illustrated in FIG. 10D, each patterned reflector 112 is circular in shape, in other embodiments each patterned reflector 112 may have another suitable shape (e.g., rectangular, hexagonal, etc.). With the patterned reflectors 112 fabricated directly on the first surface 502 of the light guide plate 108, the patterned reflectors 112 increase the ability of hiding the light sources 106. Fabricating patterned reflectors 112 directly on the first surface 502 of the light guide plate 108 also saves space. In certain exemplary embodiments, each patterned reflector 112 is a diffuse reflector, such that each patterned reflector 112 further enhances the performance of the backlight 500 by redirecting some light rays at high enough angles such that they can propagate in the light guide plate 108 by total internal reflection. Such rays will then not experience multiple bounces between the patterned reflectors 112 and the reflective layer 104 or between an optical film stack and the reflective layer 104 and therefore avoid loss of optical power, thereby increasing the backlight efficiency.

Figure 11:
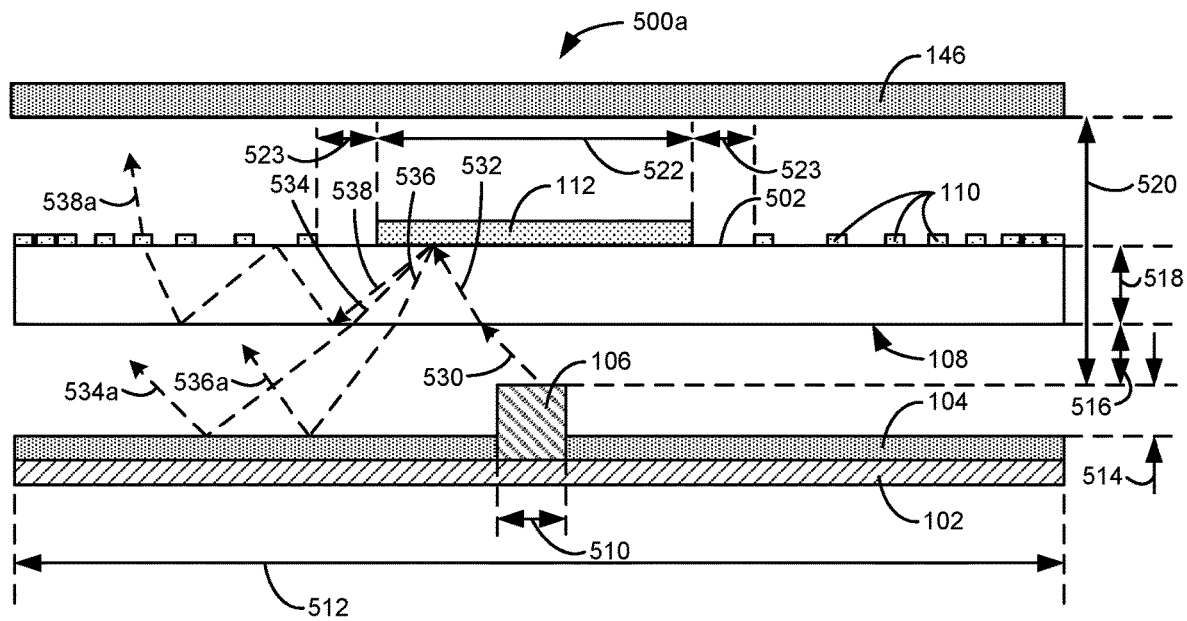
FIG. 11 is a simplified cross-sectional view of the exemplary backlight of FIG. 10A in more detail.

FIG. 11 is a simplified cross-sectional view of the exemplary backlight 500a of FIG. 10A in more detail. FIG. 11 also includes a quantum dot film (or equivalent phosphor film or color conversion film suitable to convert a blue light into a green or red light), diffuser sheet, or diffuser plate 146 as the first layer of an optical film stack (not shown) over the light guide plate 108. The size S0 (i.e., width or diameter) of the light source 106 is indicated at 510. The pitch P between light sources 106 (not shown) adjacent to the illustrated light source 106 is indicated at 512. The pitch P may, for example, be about 90, 45, 30, 10, 5, 2, 1, or 0.5 millimeters, larger than about 90 millimeters, or smaller than about 0.5 millimeters. The direction of the Pitch P may be in vertical, horizontal, or other direction. The distance h0 between the top of the reflective layer 104 and the top of the light source 106 is indicated at 514. The distance d1 between the top of the light source 106 and the bottom of the light guide plate 108 is indicated at 516. The thickness d2 of the light guide plate 108 is indicated at 518. The optical distance OD between the top of the light sources 106 and the bottom of the quantum dot film, diffuser sheet, or diffuser plate 146 is indicated at 520. The size S (i.e., width, length, or diameter) of the patterned reflector 112 is indicated at 522. In certain exemplary embodiments, the size S of the patterned reflector 112 is given by:

$S \leq S0 + 2\{d1 \tan(\theta) + d2 \tan[\sin^{-1}(\sin(\theta)/n)]\}$ where n is the refractive index of the light guide plate 108 and θ is the angle of incidence of rays on the light guide plate 108 and equals about 60° or about 85°.

The gap between each patterned reflector 112 and the pattern of light extractors 110 is indicated at 523. In certain exemplary embodiments, the gap 523 between each patterned reflector 112 and the pattern of light extractors 110 is within a range from d2 to 3*d2. In this example, each patterned reflector 112 may include a varying thickness, such as described with reference to FIG. 2D, 7A, 7B, or 8.

The optical distance 520 may be larger than in embodiments where the light sources 106 are bonded to the light guide plate 108. The optical distance 520, however, is still smaller than in a backlight without a light guide plate 108. In certain exemplary embodiments, the optical distance 520 divided by the pitch P is less than or equal to 0.2, where the pitch P is the largest pitch of the light sources 106 if the pitch of the light sources varies in different directions. The pattern of light extractors 110 may include a varying density that is highest at locations that are farthest away from the plurality of light sources 106 as illustrated in FIG. 11.

The light source 106 emits light concentrated along the normal of the emitting surface. The patterned reflector 112 is aligned with the light source 106. With size S of the patterned reflector 112 as defined above and with θ equal to about 60°, patterned reflector 112 captures all of the light emitted by light source 106 within a cone of θ equal to 60°. Table 2 below shows the size S of the patterned reflector 112 varying with n, d1, d2, S0, and targeted θ. The size S of the patterned reflector 112 typically varies within a range from about the size S0 of the light source 106 to about 10 millimeters. The size S of the patterned reflector 112 may be about 2.5 millimeters to capture all of the light emitted from light source 106 within a cone of θ equal to 60° (as shown for No. 13 in Table 2), and about 4.5 millimeters to capture all of the light emitted from light source 106 with a cone of θ equal to 85° (as shown for No. 15 in Table 2).

TABLE 2

Size S of a patterned reflector on the top of the light guide plate in a number of examples in which n, d1, d2, S0, and θ vary.

| No. | Category | n | d1 (mm) | d2 (mm) | S0 (mm) | θ | S (mm) |
|---|---|---|---|---|---|---|---|
| 1 | vary d2 | 1.5 | 0.1 | 0.1 | 2 | 60 | 2.49 |
| 2 | | 1.5 | 0.1 | 0.5 | 2 | 60 | 3.05 |
| 3 | | 1.5 | 0.1 | 0.7 | 2 | 60 | 3.34 |
| 4 | | 1.5 | 0.1 | 1.1 | 2 | 60 | 3.90 |
| 5 | | 1.5 | 0.1 | 2 | 2 | 60 | 5.17 |
| 6 | vary n | 1 | 0.1 | 1 | 2 | 60 | 5.81 |
| 7 | | 1.25 | 0.1 | 1 | 2 | 60 | 4.27 |
| 8 | | 1.5 | 0.1 | 1 | 2 | 60 | 3.76 |
| 9 | | 1.75 | 0.1 | 1 | 2 | 60 | 3.49 |
| 10 | | 2 | 0.1 | 1 | 2 | 60 | 3.31 |
| 11 | vary θ | 1.5 | 0.1 | 0.1 | 2 | 0 | 2.00 |
| 12 | | 1.5 | 0.1 | 0.1 | 2 | 30 | 2.19 |
| 13 | | 1.5 | 0.1 | 0.1 | 2 | 60 | 2.49 |
| 14 | | 1.5 | 0.1 | 0.1 | 2 | 80 | 3.31 |
| 15 | | 1.5 | 0.1 | 0.1 | 2 | 85 | 4.46 |
| 16 | vary d1 | 1.5 | 0.1 | 0.1 | 2 | 60 | 2.49 |
| 17 | | 1.5 | 0.5 | 0.1 | 2 | 60 | 3.87 |
| 18 | | 1.5 | 0.7 | 0.1 | 2 | 60 | 4.57 |
| 19 | | 1.5 | 1.1 | 0.1 | 2 | 60 | 5.95 |
| 20 | | 1.5 | 2 | 0.1 | 2 | 60 | 9.07 |

The patterned reflector 112 reflects at least a portion of the light emitted from the light source 106 into the light guide plate 108. The patterned reflector 112 has a specular reflectance and a diffuse reflectance. The specularly reflected light exits from the bottom surface of the light guide plate 108. While this light travels laterally primarily due to the reflection between the reflective layer 104 and the light guide plate 108, or due to the reflection between the reflective layer 104 and the quantum dot film, diffuser sheet, or diffuser plate 146, some loss of light may occur due to imperfect reflection from the reflective layer 104.

The diffusively reflected light has an angular distribution between 0° and 90° measured from the normal of the light guide plate 108. About 50 percent of the diffusively reflected light has an angle exceeding the critical angle ($\theta_{TIR}$) of the total internal reflection. Thus, this light can travel laterally due to the total internal reflection without any loss, until the light is subsequently extracted out of the light guide plate 108 by the pattern of light extractors 110 located on the top surface of the light guide plate 108.

Ray 530 is emitted from light source 106 and has an angle of incidence of 60° in air. Ray 530 becomes ray 532 having an angle of incidence of about 35° in light guide plate 108 (for n=1.5). Ray 532 is reflected into light guide plate 108, with the specularly reflected ray referred to as ray 534, and diffusively reflected rays referred to as ray 536 and ray 538, where the diffusively reflected ray 536 has an angle of incidence less than $\theta_{TIR}$ and the diffusively reflected ray 538 has an angle of incidence greater than $\theta_{TIR}$. The specularly reflected ray 534 then exits from the bottom surface of the light guide plate 108 and is reflected by the reflective layer 104 as ray 534a, which can be specular or diffusive. The diffusively reflected ray 536, having an angle of incidence less than $\theta_{TIR}$, also exits from the bottom surface of the light guide plate 108, and is reflected by the reflective layer 104 as ray 536a, which can be specular or diffusive. However, the diffusively reflected ray 538, having an angle of incidence greater than $\theta_{TIR}$, travels laterally inside of the light guide plate 108 due to the total internal reflection, until the light ray is extracted out as ray 538a by a light extractor 110 on the top surface of the light guide plate 108. Rays such as ray 538 or ray 538a improve the lateral spreading of the light emitted from the light sources 106 without incurring light loss.

Figure 12:
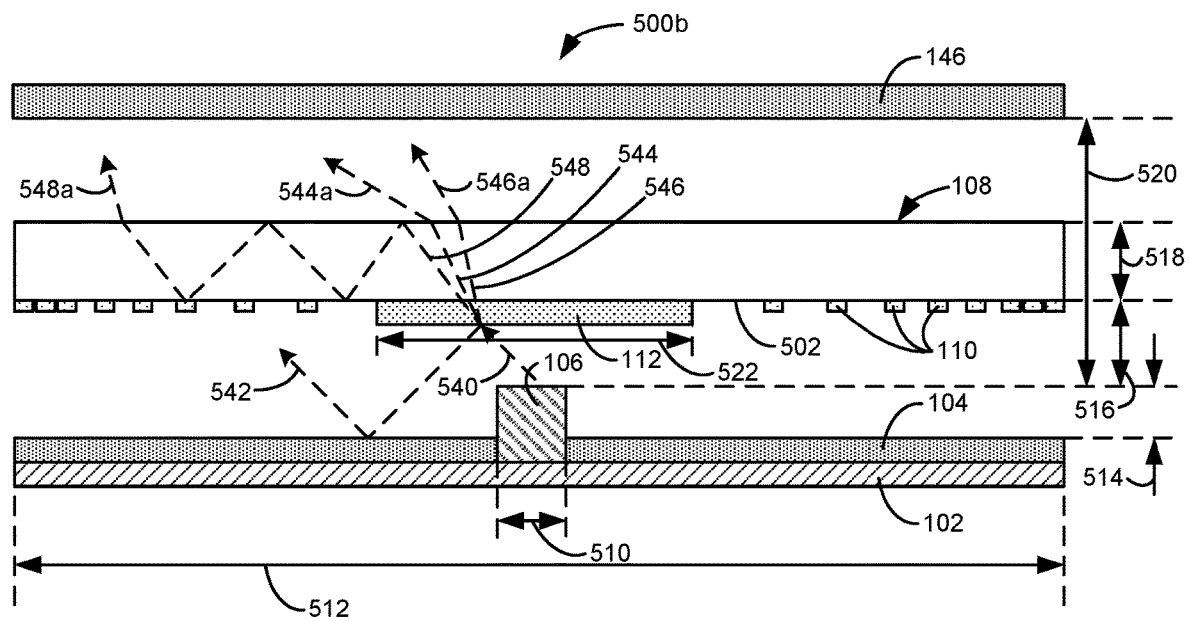
FIG. 12 is a simplified cross-sectional view of the exemplary backlight of FIG. 10B in more detail.

FIG. 12 is a simplified cross-sectional view of the exemplary backlight 500b of FIG. 10B in more detail. FIG. 12 also illustrates a quantum dot film, diffuser sheet, or diffuser plate 146 as the first layer of an optical film stack (not shown) over the light guide plate 108. The dimensions 510, 512, 514, 516, 518, 520, and 522 were previously defined with reference to FIG. 11. The light source 106 emits light concentrated along the normal of the emitting surface. The patterned reflector 112 is aligned with the light source 106. In certain exemplary embodiments, the size S of the patterned reflector 112 is given by:

$$S \leq S0 + 2d1 \tan(\theta)$$

where θ is the angle of incidence of rays on light guide plate 108 and equals about 60°.

With size S of the patterned reflector 112 as defined above, the patterned reflector 112 captures all of the light emitted by light source 106 within a cone of θ equal to 60°. Table 3 below shows the size S of the patterned reflector 112 varying with d1, S0, and targeted θ. The size S of the patterned reflector 112 typically varies within a range from about the size S0 of the light source 106 to about 10 millimeters. The size S of the patterned reflector 112 may be about 2.35 millimeters to capture all of the light emitted from light source 106 within a cone of θ equal to 60° (as shown for No. 23 in Table 3), and about 4.3 millimeters to capture all of the light emitted from the light source 106 within a cone of θ equal to 85° (as shown for No. 28 in Table 3).

TABLE 3

Size S of the patterned reflector on the bottom of the light guide plate in a number of examples in which d1, S0, and θ vary.

| No. | Category | d1 (mm) | S0 (mm) | θ | S (mm) |
|---|---|---|---|---|---|
| 21 | vary S0 | 0.1 | 1 | 60 | 1.35 |
| 22 | | 0.1 | 1.5 | 60 | 1.85 |
| 23 | | 0.1 | 2 | 60 | 2.35 |
| 24 | vary θ | 0.1 | 2 | 0 | 2.00 |
| 25 | | 0.1 | 2 | 30 | 2.12 |
| 26 | | 0.1 | 2 | 60 | 2.35 |
| 27 | | 0.1 | 2 | 80 | 3.13 |
| 28 | | 0.1 | 2 | 85 | 4.29 |
| 29 | vary S0 | 1 | 1 | 60 | 4.46 |
| 30 | | 1 | 1.5 | 60 | 4.96 |
| 31 | | 1 | 2 | 60 | 5.46 |
| 32 | vary θ | 0.5 | 2 | 0 | 2.00 |
| 33 | | 0.5 | 2 | 30 | 2.58 |
| 34 | | 0.5 | 2 | 60 | 3.73 |
| 35 | | 0.5 | 2 | 80 | 7.67 |
| 36 | | 0.5 | 2 | 85 | 13.43 |
| 37 | vary d1 | 0.1 | 2 | 60 | 2.35 |
| 38 | | 0.5 | 2 | 60 | 3.73 |
| 39 | | 0.7 | 2 | 60 | 4.42 |
| 40 | | 1.1 | 2 | 60 | 5.81 |
| 41 | | 2 | 2 | 60 | 8.93 |

The patterned reflector 112 transmits at least a portion of the light emitted from the light source 106 into the light guide plate 108. The patterned reflector 112 has a specular transmittance and a diffuse transmittance. The specularly transmitted light exits from the top surface of the light guide plate 108. While this light travels laterally primarily due to the reflection between the reflective layer 104 and the quantum dot film, diffuser sheet, or diffuser plate 146, some loss of light may occur due to imperfect reflection from the reflective layer 104.

The diffusively transmitted light has an angular distribution between 0° and 90° measured from the normal of the light guide plate 108. About 50 percent of the diffusively transmitted light has an angle exceeding the critical angle of the total internal reflection. Thus, this light can travel laterally due to the total internal reflection without any loss, until the light is subsequently extracted out of the light guide plate 108 by the pattern of light extractors 110 located on the bottom surface of the light guide plate 108.

Ray 540 is emitted from light source 106 and has an angle of incidence 60° in air. Ray 540 becomes ray 542 when it is first reflected by the patterned reflector 112 and then subsequently reflected by the reflective layer 104. Ray 542 can be either specularly or diffusively reflected by the patterned reflector 112 or by the reflective layer 104. Ray 544 is the specularly transmitted ray of ray 540 and has an angle of incidence of about 35° in light guide plate 108 (for n=1.5). Ray 544 is transmitted through the light guide plate as ray 544a. Ray 546 is the diffusively transmitted ray of ray 540 and has an angle of incidence less than $\theta_{TIR}$. Ray 546 is transmitted through the light guide plate as ray 546a. Ray 548 is the diffusively transmitted ray of ray 540 and has an angle of incidence greater than $\theta_{TIR}$. Ray 548 undergoes the total internal reflection within the light guide plate 108 until the light ray is extracted out as ray 548a by a light extractor 110 located on the bottom surface of the light guide plate 108. Rays such as ray 548 or ray 548a improve the lateral spreading of the light emitted from the light sources 106 without incurring light loss.

Figure 13:
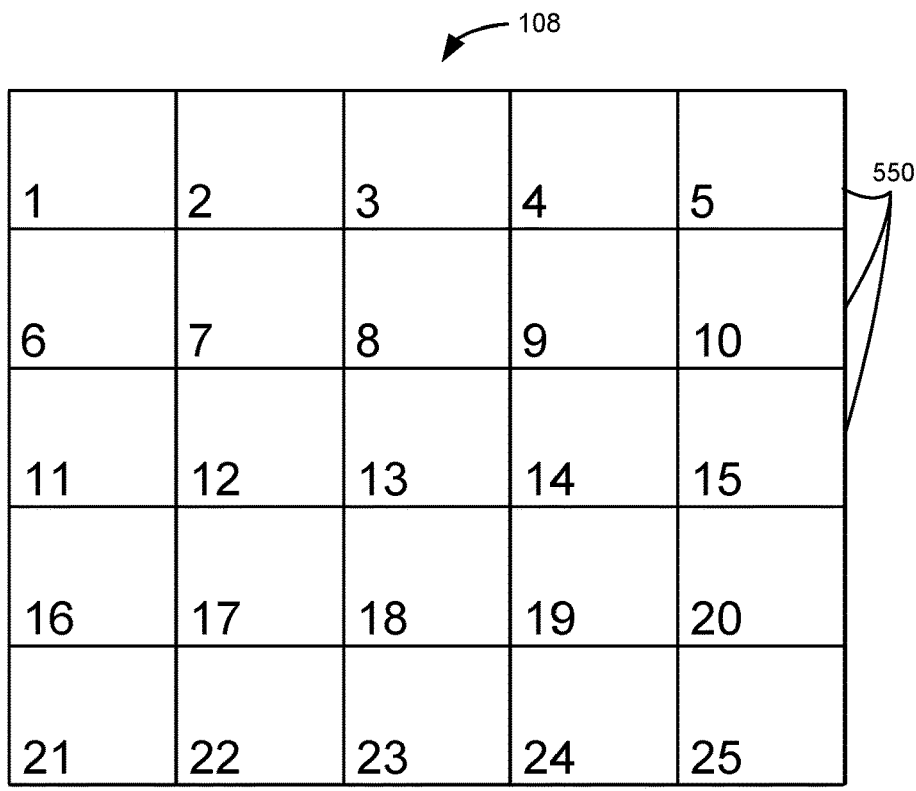
FIG. 13 is a grid for defining a plurality of regions of a light guide plate.
Figure 14:
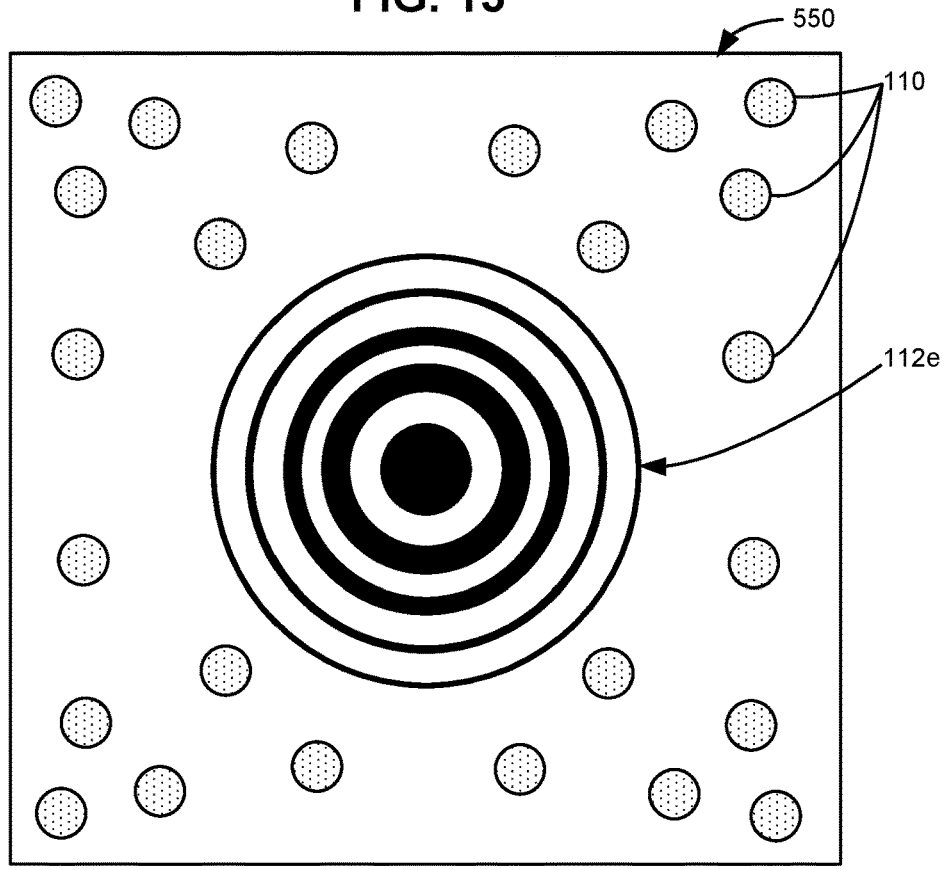
FIG. 14 illustrates an exemplary patterned reflector and light extractors for one region of the grid of FIG. 13.

FIG. 13 is a grid for defining a plurality of regions 550 of a light guide plate 108. In this embodiment, light guide plate 108 is divided into 25 regions in five rows and five columns. In other embodiments, light guide plate 108 may be divided into another suitable number of regions 550 in any suitable number of rows and columns. In certain exemplary embodiments, each region 550 may have a length of about 15 millimeters and a width of about 15 millimeters. As illustrated in FIG. 14, each region 550 includes a patterned reflector 112e and a pattern of light extractors 110. The patterned reflector 112e may be centered within region 550.

Figure 15:
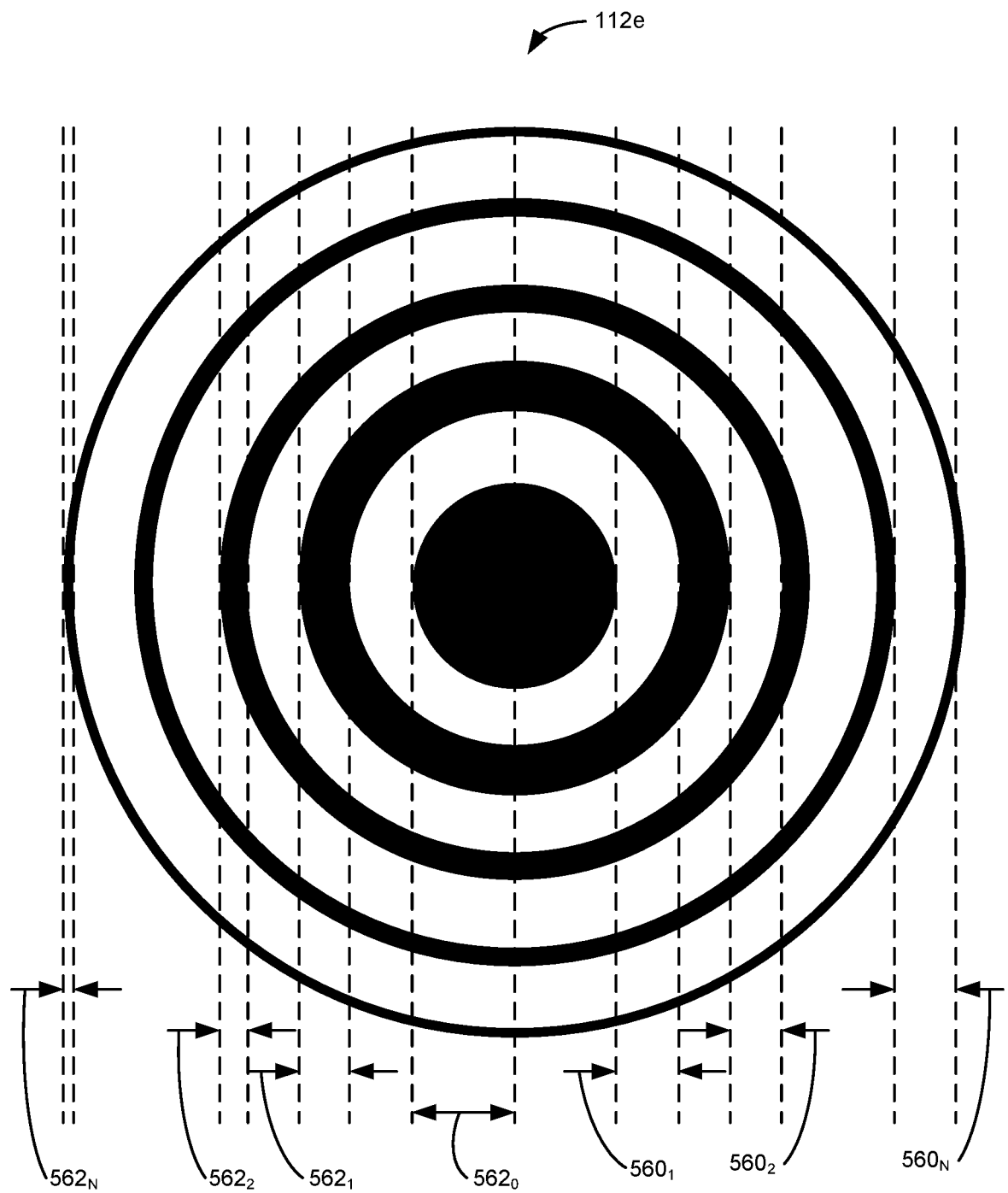
FIG. 15 is an enlarged view of the patterned reflector of FIG. 14.

FIG. 15 is an enlarged view of the patterned reflector 112e of FIG. 14. Patterned reflector 112e includes a concentric circle pattern of reflective material to create a variable diffusive reflector. The reflective material may include, for example, metallic foils, such as silver, platinum, gold, copper, and the like; dielectric materials (e.g., polymers such as PTFE); porous polymer materials, such as PET, PMMA, PEN, PES, etc., multi-layer dielectric interference coatings, or reflective inks, including white inorganic particles such as titania, barium sulfate, etc., or other materials suitable for reflecting light. Patterned reflector 112 may include any suitable number of concentric circles. The spacing $560_1$ to $560_N$ between each of the concentric circles may vary, and the width $562_0$ to $562_N$ of the reflective material of each concentric circle may also vary. Patterned reflector 112 may have a radius less than or equal to 5 millimeters. In certain exemplary embodiments, each spacing $560_1$ to $560_N$ may be equal, and each width $562_0$ to $562_N$ may be equal. Each spacing $560_1$ to $560_N$ may, for example, be within a range from about 0.001 millimeters to about 0.1 millimeters. Each width $562_0$ to $562_N$ may, for example, be within a range from about 0.1 millimeters to about 0.03 millimeters.

Figure 16:
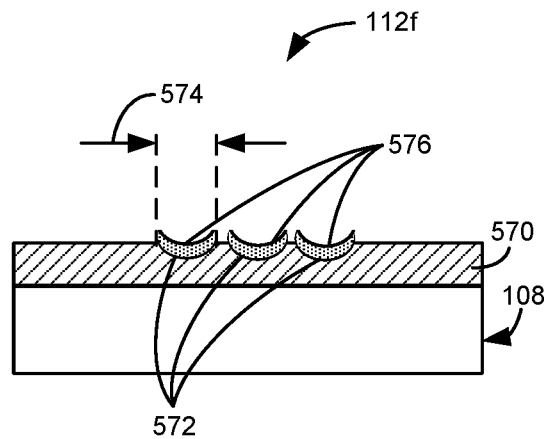
FIG. 16 is a cross-sectional view of an exemplary patterned reflector including concave microstructures.

FIG. 16 is a cross-sectional view of an exemplary patterned reflector 112f including concave microstructures. In certain exemplary embodiments, patterned reflector 112f of FIG. 16 may be used for each patterned reflector 112 of FIGS. 10A and 10B and may be combined with the features of patterned reflector 112f of FIG. 15. A resin layer 570 (e.g., an optically transparent material) may be applied on a surface of light guide plate 108. Concave microstructures 572 may be formed in the resin layer 570 to create a diffusive reflecting surface. The size (e.g., width or diameter) of each microstructure 572 as indicated at 574 may, for example, be within a range from about 1 micrometer to about 5 micrometers. A reflective material 576 is applied over the concave microstructures 572. In other embodiments, referring back to FIG. 11, the concave microstructures may be selected to increase the portion of the high angle light as indicated by ray 538 and reduce the portion of the low angle light as indicated by ray 536. In other embodiments, concave microstructures 572 may be formed directly in light guide plate 108 and resin layer 570 may be excluded. For example, the concave microstructures may be made with a masking and etching process.

Figure 17:
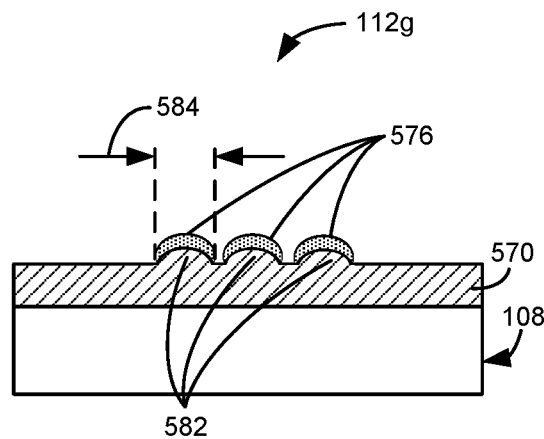
FIG. 17 is a cross-sectional view of an exemplary patterned reflector including convex microstructures.

FIG. 17 is a cross-sectional view of an exemplary patterned reflector 112g including convex microstructures. In certain exemplary embodiments, patterned reflector 112g of FIG. 17 may be used for each patterned reflector 112 of FIGS. 10A and 10B and may be combined with the features of patterned reflector 112f of FIG. 15. A resin layer 570 (e.g., an optically transparent material) may be applied on a surface of light guide plate 108. Convex microstructures 582 may be formed in the resin layer 570 to create a diffusive reflecting surface. The size (e.g., width or diameter) of each microstructure 582 as indicated at 584 may, for example, be within a range from about 1 micrometer to about 5 micrometers. A reflective material 576 is applied over the convex microstructures 582. In other embodiments, referring back to FIG. 11, the convex microstructures may be selected to increase the portion of the high angle light as indicated by ray 538 and reduce the portion of the low angle light as indicated by ray 536. In other embodiments, convex microstructures 582 may be formed directly on light guide plate 108 and resin layer 570 may be excluded.

Figure 18:
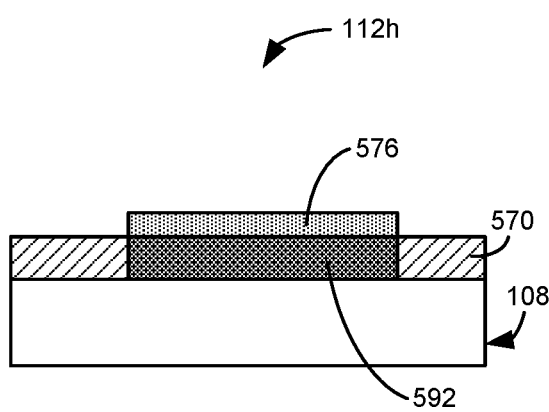
FIG. 18 is a cross-sectional view of an exemplary patterned reflector including scattering beads.

FIG. 18 is a cross-sectional view of an exemplary patterned reflector 112h including scattering beads. In certain exemplary embodiments, patterned reflector 112h of FIG. 18 may be used for each patterned reflector 112 of FIGS. 10A and 10B and may be combined with the features of patterned reflector 112f of FIG. 15. A resin layer 570 (e.g., an optically transparent material) may be applied on a surface of light guide plate 108. Scattering beads 592 may be formed in the resin layer 570 to create a diffusive reflecting surface. A reflective material 576 is applied over the scattering beads 592. In other embodiments, scattering beads 592 may be formed directly in light guide plate 108 and resin layer 570 may be excluded.

Figure 19:
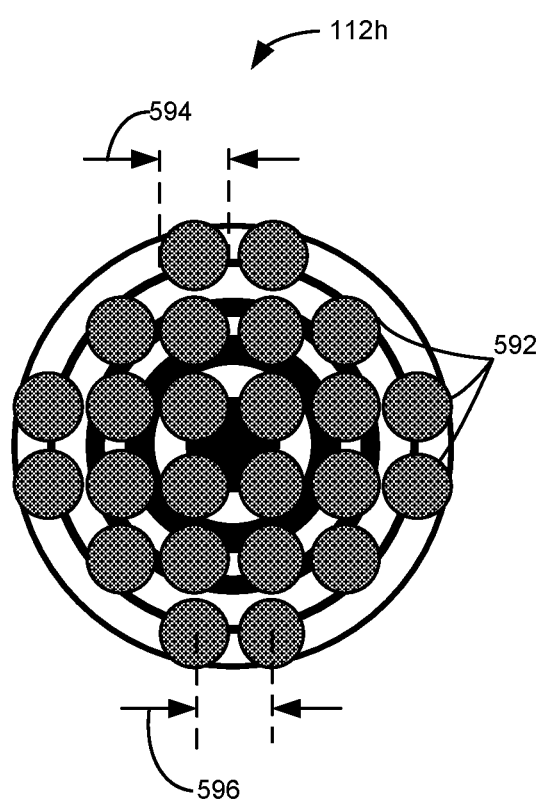
FIG. 19 is a bottom view of an exemplary patterned reflector including scattering beads.

FIG. 19 is a bottom view of an exemplary patterned reflector 112h including scattering beads 592. The size (e.g., width or diameter) of each bead as indicated at 594 may, for example, be within a range from about 1 micrometer to about 5 micrometers. The center to center distance between the scattering beads 592 as indicated at 596 may, for example, equal a factor times the size 594 of the scattering beads, where the factor is greater than or equal to about 1.05 and less than or equal to about 2. The scattering beads 592 may extend within a circle having a radius about equal to the radius of the outer concentric circle of reflective material. Within the circle, the scattering beads 592 may be arranged in an array of squares or in another suitable configuration.

Figure 20:
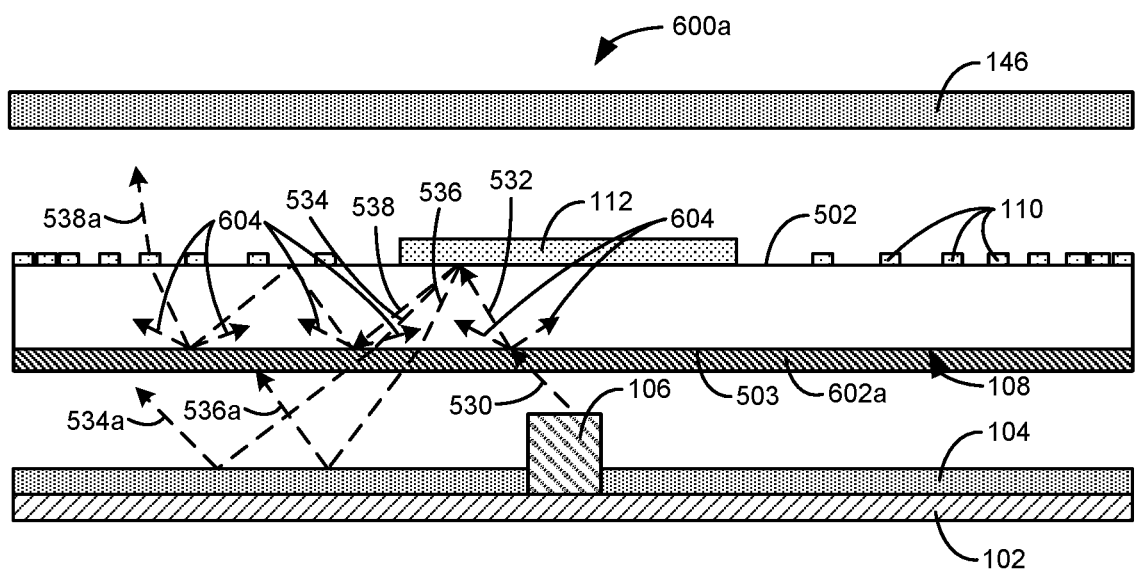
FIG. 20 is a simplified cross-sectional view of an exemplary backlight including a diffusive layer.

FIG. 20 is a simplified cross-sectional view of an exemplary backlight 600a. Backlight 600a is similar to backlight 500a previously described and illustrated with reference to FIG. 11. Backlight 600a may include a substrate 102, a reflective layer 104, a plurality of light sources 106, a light guide plate 108, and a plurality of patterned reflectors 112 as previously described and illustrated with reference to FIGS. 1A-1D. Backlight 600a also includes a pattern of light extractors 110 on the first surface 502 of the light guide plate 108 as previously described and illustrated with reference to FIG. 11. In addition, backlight 600a may include a diffusive layer 602a. FIG. 20 also includes a quantum dot film, diffuser sheet, or diffuser plate 146 as the first layer of an optical film stack (not shown) over the light guide plate 108.

Diffusive layer 602a is on a second surface 503 of the light guide plate 108 opposite to the first surface 502. Diffusive layer 602a faces the plurality of light sources 106. Diffusive layer 602a improves the lateral spreading of the light emitted from the light sources 106, thereby improving light uniformity. The diffusive layer 602a may have specular and diffuse reflectance and specular and diffuse transmittance. The specular reflectance or transmittance is the percent of reflected or transmitted light along the specular direction with 0 or 8 degrees depending on the measurement setup, while the diffuse reflectance or transmittance is the percent of reflected or transmitted light excluding the specular reflectance or transmittance. The diffusive layer 602a may have a haze and a transmittance. The diffusive layer 602a may have a haze, for example, of about 10, 20, 30, 40, 50, 60, 70, 80, 90, or 95 percent or higher, and a transmittance of about 60, 70, 80, 90, or 95 percent or higher. In certain exemplary embodiments, the diffusive layer 602a has a haze of about 70 percent and a total transmittance of about 90 percent. In other embodiments, the diffusive layer 602a has a haze of about 88 percent and a total transmittance of about 96 percent. Haze is defined as the percent of transmitted light that is scattered so that its direction deviates more than 2.5 degrees from the direction of the incident beam, and transmittance is defined as the percent of transmitted light, per American Society for Testing and Materials (ASTM) D1003 "Standard Test Method for Haze and Luminous Transmittance of Transparent Plastics." Haze and transmittance can be measured by various haze meters.

At least a portion of rays 530, 534, 536, 538, etc., as previously described and illustrated with reference to FIG. 11 are diffused by diffusive layer 602a as indicated by rays 604. Diffusive layer 602a diffuses ray 530 from the light source 106. As a result, the patterned reflector 112 of backlight 600a may be thinner than a patterned reflector of a backlight not including diffusive layer 602a while still effectively hiding the light source 106. Diffusive layer 602a also diffuses ray 538 that otherwise would undergo total internal reflection. In addition, diffusive layer 602a diffuses any rays that are reflected back by the quantum dot film, diffuser sheet, or diffuser plate 146. Thus, the diffusive layer 602a increases the light recycling effect caused by the quantum dot film, diffuser sheet, or diffuser plate 146 and any prismatic films (not shown) over the diffuser plate or diffuser sheet, such as one or two brightness enhancement films. While in FIG. 20, rays 604 are shown inside the light guide plate 108, it is understood that a portion of the rays may be reflected or transmitted at the surface of the diffusive layer 602a facing the plurality of light sources 106.

While FIG. 20 illustrates the second surface 503 of the light guide plate 108 facing the plurality of light sources 106, in other embodiments the first surface 502 of the light guide plate 108 may face the plurality of light sources 106, such that the diffusive layer 602a faces away from the plurality of light sources 106 and the pattern of light extractors 110 and the plurality of patterned reflectors 112 face the plurality of light sources 106 (e.g., as in FIG. 12).

In certain exemplary embodiments, diffusive layer 602a includes a uniform or continuous layer of scattering particles. Diffusive layer 602a is considered to include a uniform layer of scattering particles where the distance between neighboring scattering particles is less than one fifth the size of the light source. That is, regardless of the location of diffusive layer 602a relative to the light source, diffusive layer 602a exhibits a similar diffusive property. The scattering particles may, for example, be within a clear or white ink that includes micro-sized or nano-sized scattering particles, such as alumina particles, $TiO_2$ particles, PMMA particles, or other suitable particles. The particle size may vary, for example, within a range from about 0.1 micrometers and about 10.0 micrometers. In other embodiments, diffusive layer 602a may include an anti-glare pattern. The anti-glare pattern may be formed of a layer of polymer beads or may be etched. Diffusive layer 602a may have a thickness, for example, of about 1, 3, 7, 14, 21, 28, or 50 micrometers, or another suitable thickness.

In certain exemplary embodiments, diffusive layer 602a may include a pattern that may be applied to the light guide plate 108 via screen printing. The diffusive layer 602a may be screen printed on a primer layer (e.g., an adhesive layer) applied to the light guide plate 108. In other embodiments, diffusive layer 602a may be applied to the light guide plate 108 by laminating the diffusive layer to the light guide plate via an adhesive layer. In yet other embodiments, diffusive layer 602a may be applied to the light guide plate 108 by embossing (e.g., thermal or mechanical embossing) the diffusive layer into the light guide plate, stamping (e.g., roller stamping) the diffusive layer into the light guide plate, or injection molding the diffusive layer. In yet other embodiments, diffusive layer 602a may be applied to the light guide plate 108 by etching (e.g., chemical etching) the light guide plate. In some embodiments, diffusive layer 602a may be applied to the light guide plate 108 with a laser (e.g., laser damaging).

Figure 21:
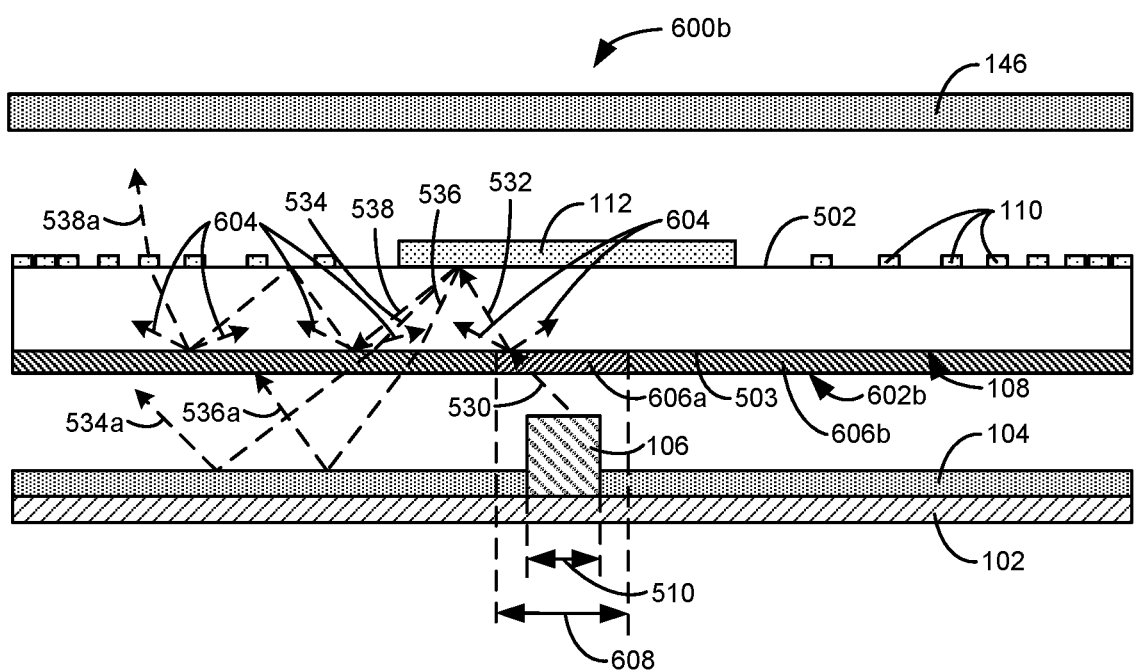
FIG. 21 is a simplified cross-sectional view of an exemplary backlight including a diffusive layer including two patterns.

FIG. 21 is a simplified cross-sectional view of an exemplary backlight 600b. Backlight 600b is similar to backlight 600a previously described and illustrated with reference to FIG. 20, except that backlight 600b includes a diffusive layer 602b in place of diffusive layer 602a. Diffusive layer 602b includes a plurality of first portions 606a and a second portion 606b. Each first portion 606a is aligned with a corresponding light source 106 within the size of the corresponding light source. That is, the in-plane distance between each first portion 606a and the corresponding light source 106 should be as small as practically possible and should not be greater than the size of the light source. The size of each light source 106 may vary based in the intended application. The size of each light source 106 may, for example, be a few millimeters, a few tenth millimeters, or smaller than 0.1 millimeters. The size (i.e., width of diameter) of each first portion 606a as indicated at 608 may be greater than the size of each light source 106 as indicated at 510. The second portion 606b surrounds each of the plurality of first portions 606a. Each of the plurality of first portions 606a include a first diffusive pattern, and the second portion 606b includes a second diffusive pattern. The second diffusive pattern includes a transmittance less than a transmittance of the first diffusive pattern. Thus, more light from the light source 106 may be diffusively transmitted into the light guide plate 108, and less light may be transmitted through the light guide plate 108 and reflected back into the light guide plate 108. Accordingly, diffusive layer 602b may further improve the lateral spreading of the light emitted from the light sources 106, thereby improving light uniformity. Patterned diffusive layer 602b may be applied to light guide plate 108 using similar processes as described for diffusive layer 602a of FIG. 20.

While FIG. 21 illustrates the second surface 503 of the light guide plate 108 facing the plurality of light sources 106, in other embodiments the first surface 502 of the light guide plate 108 may face the plurality of light sources 106, such that the diffusive layer 602b faces away from the plurality of light sources 106 and the pattern of light extractors 110 and the plurality of patterned reflectors 112 face the plurality of light sources 106 (e.g., as in FIG. 12).

Figure 22:
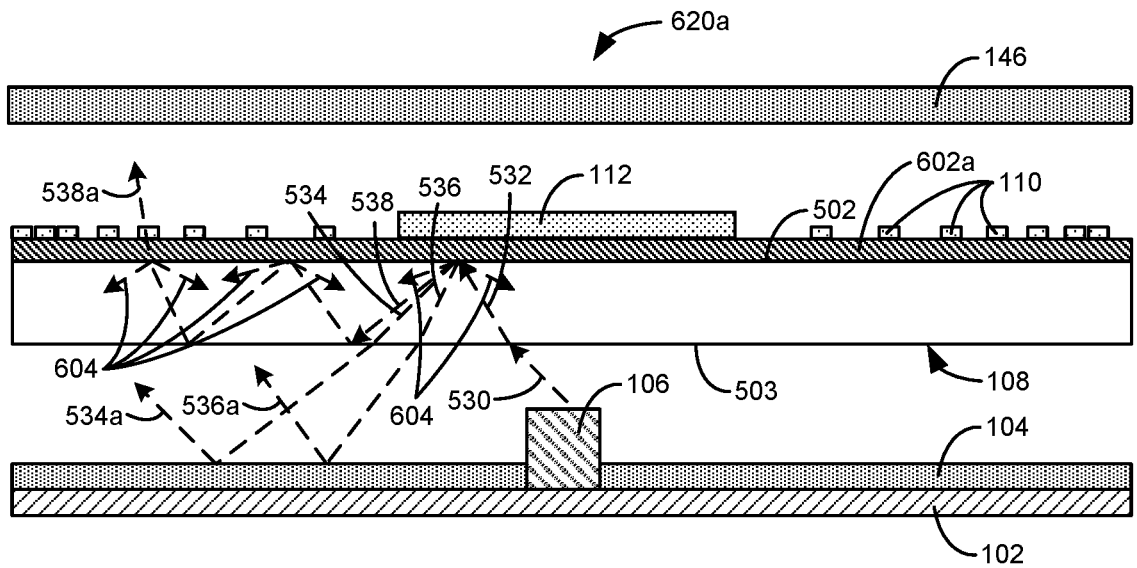
FIG. 22 is a simplified cross-sectional view of another exemplary backlight including a diffusive layer.

FIG. 22 is a simplified cross-sectional view of another exemplary backlight 620a. Backlight 620a is similar to backlight 600a previously described and illustrated with reference to FIG. 20, except that for backlight 620a diffusive layer 602a is on the first surface 502 of the light guide plate 108 rather than on the second surface 503 of the light guide plate 108. In this embodiment, the pattern of light extractors 110, the plurality of patterned reflectors 112, and the diffusive layer 602a are on the same side of the light guide plate 108. In certain exemplary embodiments, backlight 620a may also include a further diffusive layer 602a (not shown) on the second surface 503 of the light guide plate as illustrated in FIG. 20.

In certain exemplary embodiments, the diffusive layer 602a may be uniformly screen printed over the light guide plate 108. The pattern of light extractors 110 and the plurality of patterned reflectors 112 may then be inkjet printed over the diffusive layer 602a. In other embodiments, an adhesive layer may be applied onto the surface of the light guide plate 108 prior to applying the diffusive layer 602a to improve the adhesion of the diffusive layer 602a to the light guide plate 108. In other embodiments, an adhesive layer may be printed on the diffusive layer 602a prior to applying the pattern of light extractors 110 and the plurality of patterned reflectors 112 to improve the adhesion of the pattern of light extractors 110 and the plurality of patterned reflectors 112 to the diffusive layer 602a.

While FIG. 22 illustrates the first surface 502 of the light guide plate 108 facing away from the plurality of light sources 106, in other embodiments the first surface 502 of the light guide plate 108 may face the plurality of light sources 106, such that the pattern of light extractors 110, the plurality of patterned reflectors 112, and the diffusive layer 602a face the plurality of light sources 106.

Figure 23:
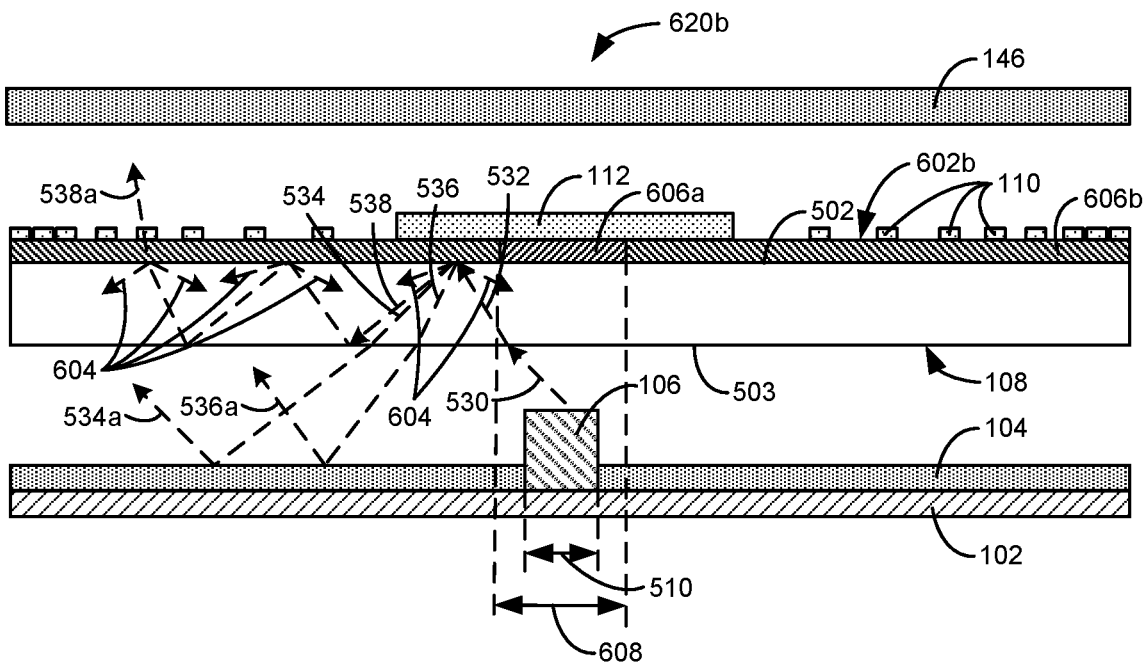
FIG. 23 is a simplified cross-sectional view of another exemplary backlight including a diffusive layer including two patterns.

FIG. 23 is a simplified cross-sectional view of another exemplary backlight 620b. Backlight 620b is similar to backlight 600b previously described and illustrated with reference to FIG. 21, except that for backlight 620b diffusive layer 602b is on the first surface 502 of the light guide plate 108 rather than on the second surface 503 of the light guide plate 108. In this embodiment, the pattern of light extractors 110, the plurality of patterned reflectors 112, and the diffusive layer 602b are on the same side of the light guide plate 108. In certain exemplary embodiments, backlight 620b may also include a further diffusive layer 602b (not shown) on the second surface 503 of the light guide plate as illustrated in FIG. 21. The diffusive layer 602b, the pattern of light extractors 110, and the plurality of patterned reflectors 112 may be applied to the light guide plate 108 using similar processes as described for diffusive layer 602a of FIG. 22.

While FIG. 23 illustrates the first surface 502 of the light guide plate 108 facing away from the plurality of light sources 106, in other embodiments the first surface 502 of the light guide plate 108 may face the plurality of light sources 106, such that the pattern of light extractors 110, the plurality of patterned reflectors 112, and the diffusive layer 602b face the plurality of light sources 106.

Figure 24:
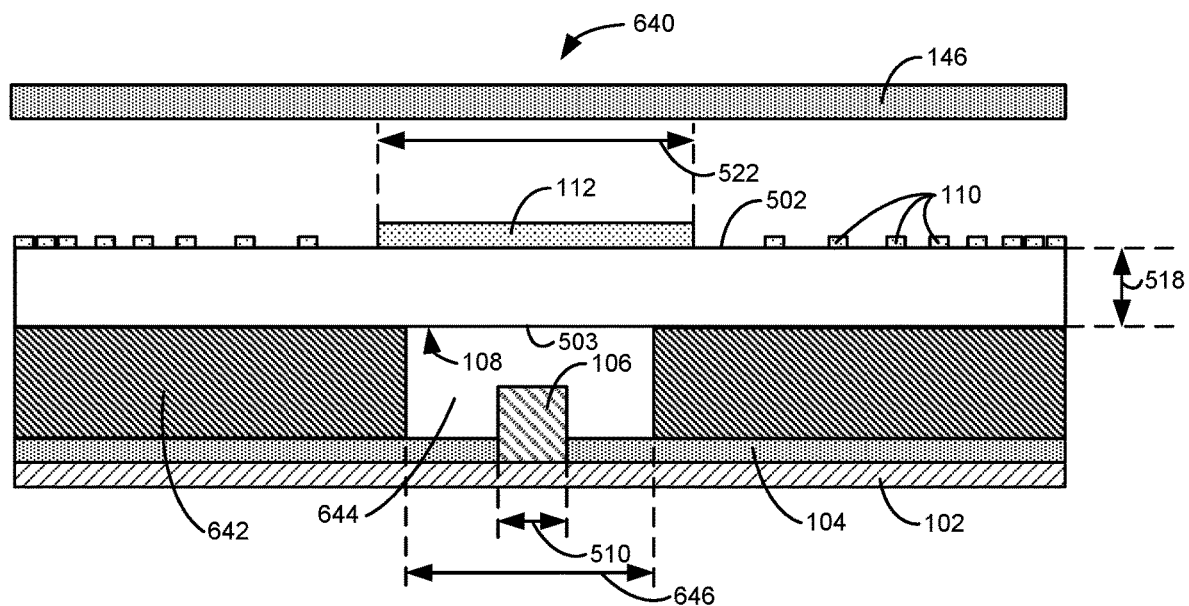
FIG. 24 is a simplified cross-sectional view of an exemplary backlight including a second reflective layer.

FIG. 24 is a simplified cross-sectional view of an exemplary backlight 640. Backlight 640 is similar to backlight 500a previously described and illustrated with reference to FIG. 11. Backlight 640 may include a substrate 102, a first reflective layer 104, a plurality of light sources 106, a light guide plate 108, and a plurality of patterned reflectors 112 as previously described and illustrated with reference to FIGS. 1A-1D. Backlight 640 also includes a pattern of light extractors 110 on the first surface 502 of the light guide plate 108 as previously described and illustrated with reference to FIG. 11. In addition, backlight 640 may include a second reflective layer 642 in addition to the first reflective layer 104. FIG. 24 also includes a quantum dot film, diffuser sheet, or diffuser plate 146 as the first layer of an optical film stack (not shown) over the light guide plate 108. Backlight 640 may also include a diffusive layer (not shown), such as diffusive layer 602a or diffusive layer 602b on either the first surface 502 and/or the second surface 503 of the light guide plate 108 as previously described and illustrated with reference to FIGS. 20-23.

The second reflective layer 642 is between the light guide plate 108 and the first reflective layer 104. In this embodiment, the second reflective layer 642 contacts the upper surface of the first reflective layer 104 and the second surface 503 of the light guide plate 108. The second reflective layer 642 may be coupled to the second surface 503 of the light guide plate 108 via an optical adhesive (e.g., phenyl silicone). In other embodiments, there may be an air gap between the second reflective layer 642 and the second surface 503 of the light guide plate 108.

The first reflective layer 104 and the second reflective layer 642 may include different materials or the same material. In certain exemplary embodiments, a reflectance of the second reflective layer 642 is greater than a reflectance of the first reflective layer 104. For example, the reflectance of the second reflective layer 642 may be, for example, greater than about 90, 95, or 99 percent. As illustrated in FIG. 24, the surface of the second reflective layer 642 facing the light guide plate 108 may be closer to the light guide plate 108 than the surface of each light source 106 facing the light guide plate 108. The second reflective layer 642 includes a plurality of openings 644. Each opening 644 is aligned with a corresponding light source 106. In certain exemplary embodiments, the corresponding light source 106 is at the center of each opening 644 or within twice the size of the light source around the center of each opening 644. The size D0 (i.e., width or diameter) of each opening 644 of the second reflective layer 642 is indicated at 646. In certain exemplary embodiments, the size S (i.e., width or diameter) of each patterned reflector 112 as indicated at 522 is within a range from about 80 percent to about 120 percent of:

$$2*d2*\tan(\sin^{-1}(1/n))+D0$$

where n is a refractive index of the light guide plate 108 and d2 is the thickness of the light guide plate 108 as indicated at 518.

Each light source 106 may be substantially located in the center of each opening 644. Each opening 644, when viewed from the top, may be a circle, square, hexagon, or polygon in shape. Each opening 644 may also be an ellipse, rectangle, or other less symmetrical shape. The walls of each opening 644 may be straight (i.e., vertical) as shown in FIG. 24. In other embodiments, the walls of each opening 644 may be sloped, such that each opening 644 is larger near the light guide plate 108 and smaller near the first reflective layer 104. Each light source 106 may also be located off the center of the opening 644. The transmittance of each patterned reflector 112 closely matches to the location of the corresponding light source 106. Each patterned reflector 112 has a lower transmittance right above the corresponding light source 106 than away from the light source 106. Each patterned reflector 112 may have a shape similar to the openings 644.

Figure 25:
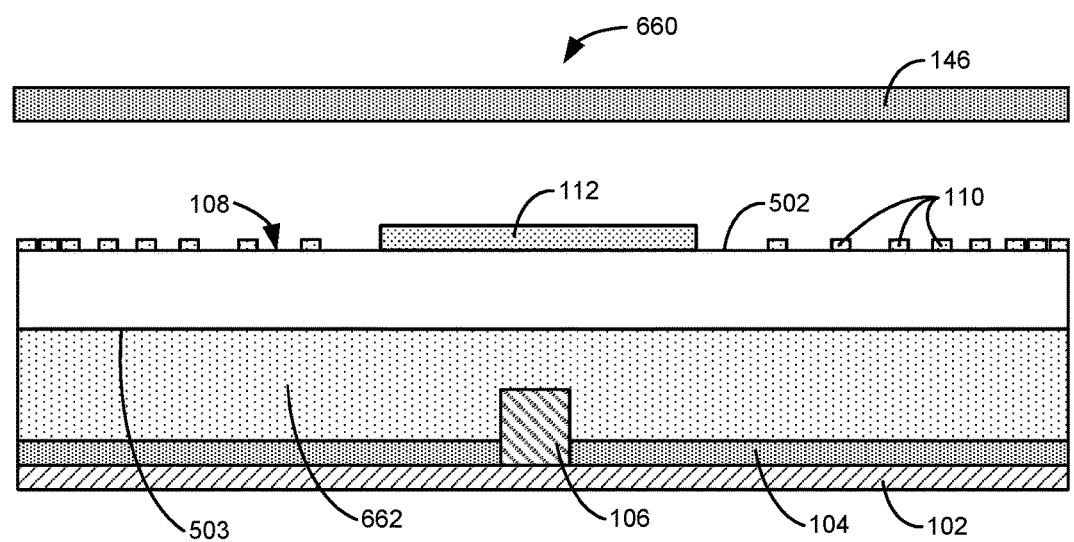
FIG. 25 is a simplified cross-sectional view of an exemplary backlight including an encapsulation layer.

FIG. 25 is a simplified cross-sectional view of an exemplary backlight 660. Backlight 660 is similar to backlight 500a previously described and illustrated with reference to FIG. 11. Backlight 660 may include a substrate 102, a reflective layer 104, a plurality of light sources 106, a light guide plate 108, and a plurality of patterned reflectors 112 as previously described and illustrated with reference to FIGS. 1A-1D. Backlight 660 also includes a pattern of light extractors 110 on the first surface 502 of the light guide plate 108 as previously described and illustrated with reference to FIG. 11. In addition, backlight 660 may include an encapsulation layer 662. FIG. 25 also includes a quantum dot film, diffuser sheet, or diffuser plate 146 as the first layer of an optical film stack (not shown) over the light guide plate 108. Backlight 660 may also include a diffusive layer (not shown), such as diffusive layer 602a or diffusive layer 602b on either the first surface 502 and/or the second surface 503 of the light guide plate 108 as previously described and illustrated with reference to FIGS. 20-23.

The encapsulation layer 662 is between the light guide plate 108 and the reflective layer 104. In this embodiment, the encapsulation layer 662 contacts the upper surface of the reflective layer 104 and the second surface 503 of the light guide plate 108. The encapsulation layer 662 may be coupled to the second surface 503 of the light guide plate 108 via an optical adhesive (e.g., phenyl silicone). In other embodiments, there may be an air gap between the encapsulation layer 662 and the second surface 503 of the light guide plate 108. The encapsulation layer 662 may include a clear resin material, a silicone, or another suitable material. The clear resin material, silicone, or another suitable material should have a transmittance of over about 60 percent and preferably over about 90 percent. The encapsulation layer 662 may include nano-sized or micro-sized scattering particles. As illustrated in FIG. 25, the encapsulation layer 662 encapsulates each of the plurality of light sources 106.

Figure 26A:
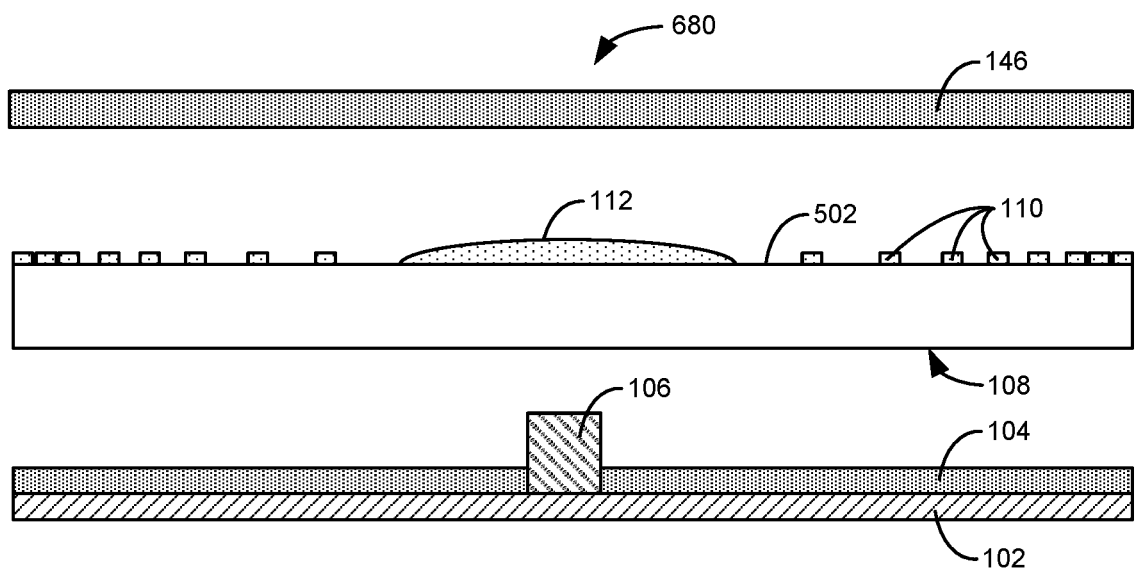
FIGS. 26A and 26B are various views of an exemplary backlight including light extractors and patterned reflectors including the same material.
Figure 26B:
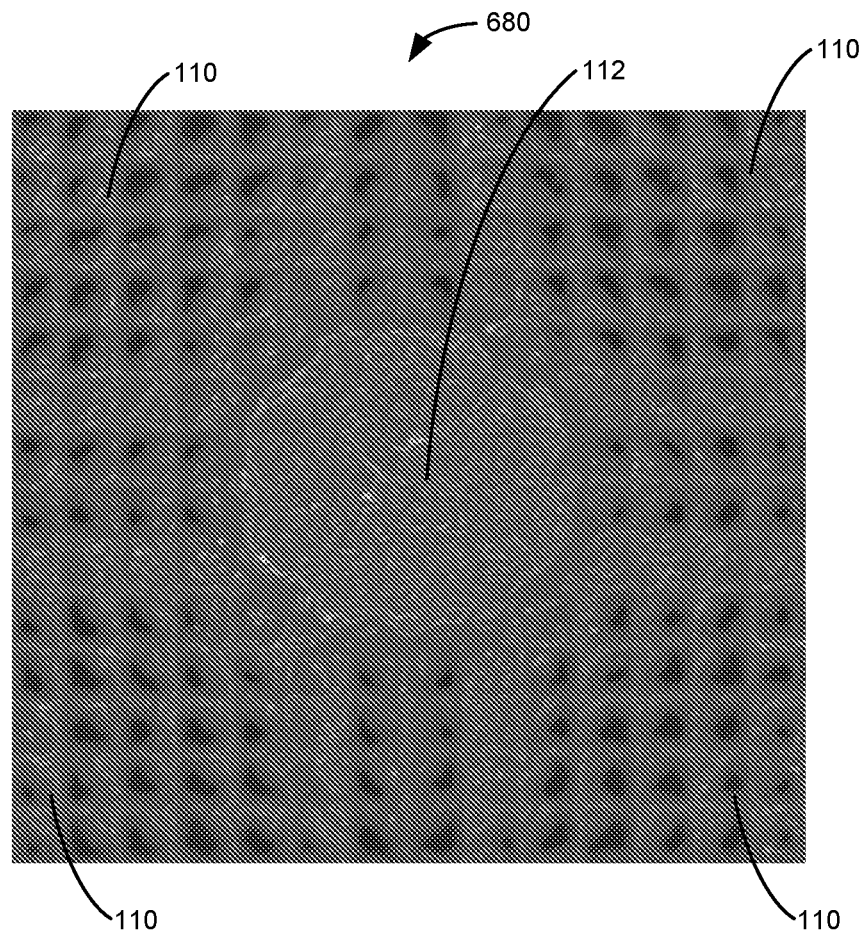

FIG. 26A is a simplified cross-sectional view and FIG. 26B is a top view of an exemplary backlight 680. Backlight 680 is similar to backlight 500a previously described and illustrated with reference to FIG. 11. Backlight 680 may include a substrate 102, a reflective layer 104, a plurality of light sources 106, a light guide plate 108, and a plurality of patterned reflectors 112 as previously described and illustrated with reference to FIGS. 1A-1D. Backlight 680 also includes a pattern of light extractors 110 on the first surface 502 of the light guide plate 108 as previously described and illustrated with reference to FIG. 11. For backlight 680, however, the plurality of light extractors 110 and the plurality of patterned reflectors 112 include the same material and each of the plurality of patterned reflectors 112 includes a varying thickness. FIG. 26A also includes a quantum dot film, diffuser sheet, or diffuser plate 146 as the first layer of an optical film stack (not shown) over the light guide plate 108.

Backlight 680 may also include a diffusive layer (not shown), such as diffusive layer 602a or diffusive layer 602b on either the first surface 502 and/or the second surface 503 of the light guide plate 108 as previously described and illustrated with reference to FIGS. 20-23. In certain exemplary embodiments, backlight 680 may also include a second reflective layer (not shown), such as second reflective layer 642 previously described and illustrated with reference to FIG. 24. In other embodiments, backlight 680 may also include an encapsulation layer (not shown), such as encapsulation layer 662 previously described and illustrated with reference to FIG. 25.

As illustrated in FIG. 26B, the plurality of light extractors 110 and the plurality of patterned reflectors 112 are arranged in a grid pattern on the first surface 502 of the light guide plate 108. The darker areas of FIG. 26B indicate openings in the grid where the first surface 502 of the light guide plate 108 is exposed, and the lighter areas of FIG. 26B indicate the material used to form the plurality of light extractors 110 and the plurality of patterned reflectors 112. The plurality of light extractors 110 and the plurality of patterned reflectors 112 may be applied to the light guide plate 108 via printing (e.g., screen printing and/or inkjet printing).

Figure 27A:
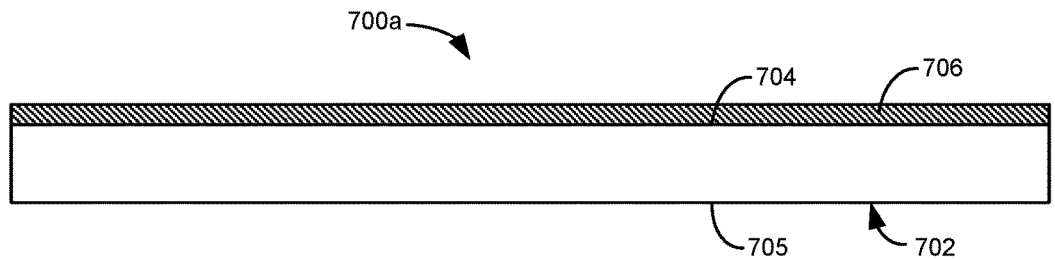
FIGS. 27A-27C are cross-sectional views of exemplary diffuser plates.

FIG. 27A is a cross-sectional view of an exemplary diffuser plate 700a. Diffuser plate 700a may be used for diffuser sheet or diffuser plate 146 of FIGS. 3, 4, 11, 12, and 20-26A. Diffuser plate 700a includes a glass substrate 702 and a scattering layer 706. The glass substrate 702 includes a first surface 704 and a second surface 705 opposite to the first surface 704. The scattering layer 706 is on the first surface 704 of the glass substrate 702. The diffuser plate 700a includes a haze of greater than about 90 percent and a cosine corrected Bi-Directional Transmittance Distribution Function along the normal direction (ccBTDF(0,0)) for the normal incidence of less than about 1, 0.5, or 0.3. The Bi-directional Transmittance Distribution Function (BTDF) describes the radiance of transmitted light as a function of the angle of transmitted light from the surface normal (the angle of incidence, $\theta_T$), and as a function of the angle of incidence illuminating the scattering surface ($\theta i$). BTDF is defined as: $BTDF(\theta i, \theta_T) = dP_T/\Omega_T/(P_i \cos\theta_T)$, where $P_T$ is the transmitted light flux, $\Omega_T$ is the solid angle into which the transmitted light is redirected, $P_i$ is the incident light flux, and $\theta_T$ is the transmitted angle. The cosine corrected BTDF ($\theta i, \theta_T$) equals $BTDF(\theta i, \theta_T)*\cos(\theta_T)$.

Diffuser plate 700a may include a Total Integrated Scatter (TIS) greater than about 40 percent. The glass substrate 702 may include scattering elements between the first surface 704 and the second surface 705. In certain exemplary embodiments, the scattering layer 706 may include a pattern etched into the glass substrate 702 or into another suitable material applied to the glass substrate 702. In other embodiments, the scattering layer 706 may include ink or another suitable material. The scattering layer 706 may include a diffusely reflective polarizer.

Figure 27B:
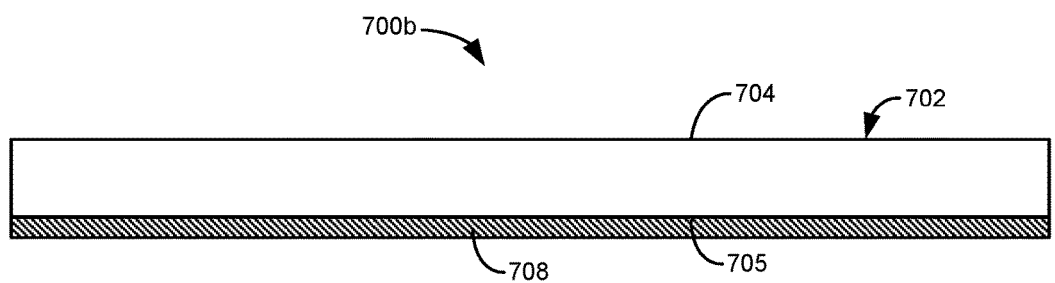

FIG. 27B is a cross-sectional view of an exemplary diffuser plate 700b. Diffuser plate 700b may be used for diffuser sheet or diffuser plate 146 of FIGS. 3, 4, 11, 12, and 20-26A. Diffuser plate 700b includes a glass substrate 702 and a scattering layer 708. The glass substrate 702 includes a first surface 704 and a second surface 705 opposite to the first surface 704. The scattering layer 708 is on the second surface 705 of the glass substrate 702. The diffuser plate 700b includes a haze of greater than about 90 percent and a cosine corrected Bi-Directional Transmittance Distribution Function along the normal direction (ccBTDF(0,0)) for the normal incidence of less than about 1, 0.5, or 0.3. Diffuser plate 700b may include a Total Integrated Scatter (TIS) greater than about 40 percent. The ccBTDF as a function of angle and TIS can be measured by any suitable instrument, such as Radiant Imaging's Imaging Sphere for scatter and appearance. The glass substrate 702 may include scattering elements between the first surface 704 and the second surface 705. In certain exemplary embodiments, the scattering layer 708 may include a pattern etched into the glass substrate 702 or into another suitable material applied to the glass substrate 702. In other embodiments, the scattering layer 708 may include ink or another suitable material. The scattering layer 708 may include a diffusely reflective polarizer.

Figure 27C:
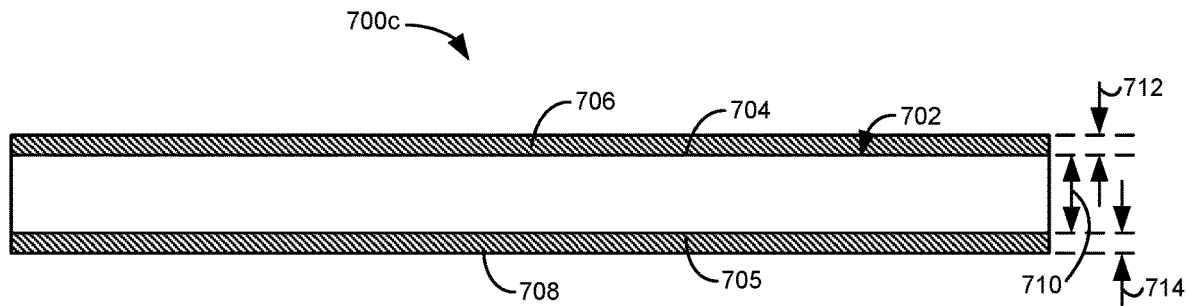

FIG. 27C is a cross-sectional view of an exemplary diffuser plate 700c. Diffuser plate 700c may be used for diffuser sheet or diffuser plate 146 of FIGS. 3, 4, 11, 12, and 20-26A. Diffuser plate 700c includes a glass substrate 702, a first scattering layer 706 as previously described and illustrated with reference to FIG. 27A, and a second scattering layer 708 as previously described and illustrated with reference to FIG. 27B. The glass substrate 702 includes a first surface 704 and a second surface 705 opposite to the first surface 704. The first scattering layer 706 is on the first surface 704 of the glass substrate 702, and the second scattering layer 708 is on the second surface 705 of the glass substrate 702. The diffuser plate 700c includes a haze of greater than about 90 percent and a cosine corrected Bi-Directional Transmittance Distribution Function along the normal direction (ccBTDF(0,0)) for the normal incidence of less than about 1, 0.5, or 0.3. Diffuser plate 700c may include a Total Integrated Scatter (TIS) greater than about 40 percent. The glass substrate 702 may include scattering elements between the first surface 704 and the second surface 705.

The thickness T0 of the glass substrate between the first surface 704 and the second surface 705 as indicated at 710 may be within a range from about 0.1 millimeters to about 1.5 millimeters. In certain exemplary embodiments, the thickness T1 of the first scattering layer 706 as indicated at 712 is different from the thickness T2 of the second scattering layer 708 as indicated at 714. In other embodiments, the thickness of the first scattering layer 706 as indicated at 712 is about equal to the thickness of the second scattering layer 708. Table 4 below lists example diffuser plates, where a blank entry for the thickness T2 for the second scattering layer indicates that the example diffuser plate includes the first scattering layer but not the second scattering layer.

TABLE 4

Diffuser Plate Examples

| Example No. | T0 (μm) | T1 (μm) | T2 (μm) | Haze | TIS | ccBTDF(0, 0) |
|---|---|---|---|---|---|---|
| 1 | 700 | 24 | 25 | >90% | 0.061 | 0.019 |
| 2 | 700 | 11 | 40 | >90% | 0.062 | 0.020 |
| 3 | 700 | 48 |  | >90% | 0.063 | 0.021 |
| 4 | 700 | 12 | 27 | >90% | 0.086 | 0.027 |
| 5 | 700 | 33 |  | >90% | 0.089 | 0.030 |
| 6 | 700 | 25 | 7 | >90% | 0.104 | 0.033 |
| 7 | 700 | 10 | 11 | >90% | 0.133 | 0.042 |
| 8 | 700 | 12 |  | >90% | 0.136 | 0.045 |
| 9 | 700 | 14 | 7.5 | >90% | 0.170 | 0.053 |
| 10 | 700 | 12 |  | >90% | 0.222 | 0.074 |
| 11 | 700 | 12 |  | >90% | 0.236 | 0.075 |
| 12 | 500 | 12 |  | >90% | 0.256 | 0.081 |
| 13 | 700 | 6.8 |  | >90% | 0.345 | 0.109 |
| 14 | 500 | 6.8 |  | >90% | 0.368 | 0.116 |
| 15 | 500 | 5.5 |  | >90% | 0.391 | 0.123 |

Each of the example diffuser plates in Table 4 has a glass substrate thickness T0 equal to 500 micrometers or 700 micrometers and a first scattering layer thickness T1 varying from about 5.5 micrometers to about 48 micrometers. Some of the example diffuser plates such as Examples 1, 2, 4, 7, and 9 also have a second scattering layer thickness T2 varying from about 7 micrometers to about 40 micrometers. All the examples have a haze of greater than about 90 percent. The examples have different Total Integrated Scatter (TIS) and cosine corrected Bi-Directional Transmittance Distribution Function along the normal direction (ccBTDF (0,0)) for the normal incidence, when measured with a normal incident light with a wavelength of 550 nanometers.

The thickness of the first scattering layer 706 or the thickness of the second scattering layer 708 may be thinner or thicker than the ranges provided above. The TIS, for example, may be higher than about 40, 50, 60, or 70 percent. The glass substrate thickness may, for example, be 100, 200, 300, 400, 900, 1000, 1500, 2500, or 5000 micrometers. One or more of the above example diffuser plates may be placed between the light guide plate 108 and the quantum dot film, diffuser sheet, or diffuser plate 146 or replace the diffuser sheet or diffuser plate 146. One or more of the above example diffuser plates may also replace a diffuser plate or diffuser sheet used in any other backlight. The example glass diffuser plates offer varying optical properties such as TIS and ccBTDF(0,0), while having about a 10 times smaller coefficient of thermal expansion (CTE) than polymer-based diffuser plates or sheets.

Figure 28A:
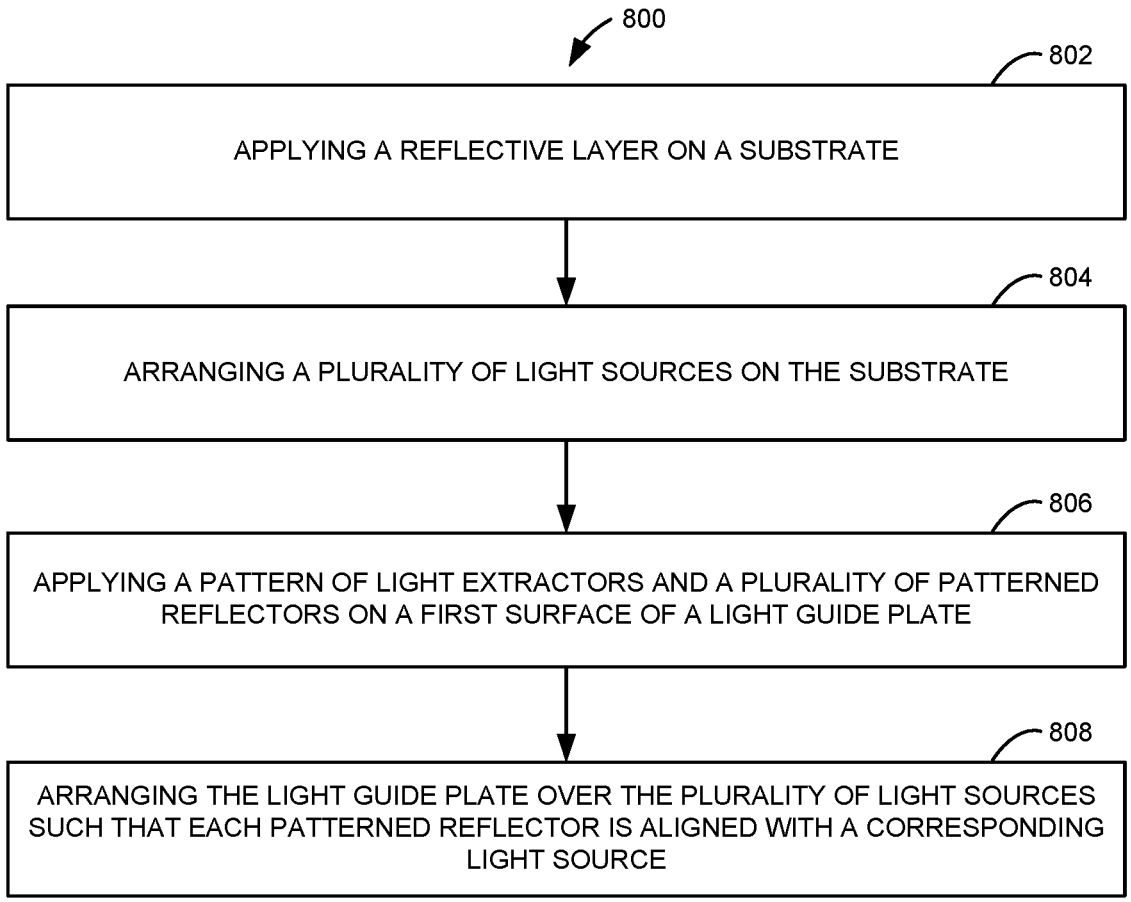
FIGS. 28A and 28B are flow diagrams illustrating another exemplary method for fabricating a backlight.
Figure 28B:
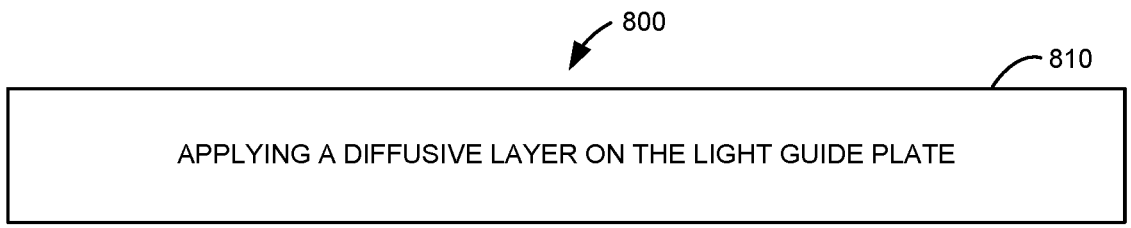

FIGS. 28A and 28B are flow diagrams illustrating another exemplary method 800 for fabricating a backlight. Method 800 may, for example, be used to fabricate backlight 600a, 600b, 620a, 620b, 640, 660, or 680 previously described and illustrated with reference to FIGS. 20-26A/26B, respectively. As illustrated in FIG. 28A, at 802 method 800 includes applying a reflective layer on a substrate. For example, a reflective layer 104 may be applied to substrate 102 as illustrated in FIG. 20. At 804, method 800 includes arranging a plurality of light sources on the substrate. For example, a plurality of light sources 106 may be arranged on and electrically connected to a substrate 102 as illustrated in FIG. 20. At 806, method 800 includes applying a pattern of light extractors and a plurality of patterned reflectors on a first surface of a light guide plate. For example, a pattern of light extractors 110 and a plurality of patterned reflectors 112 may be applied on the first surface 502 of the light guide plate 108 as illustrated in FIG. 20. At 808, method 800 includes arranging the light guide plate over the plurality of light sources such that each patterned reflector is aligned with a corresponding light source. In certain exemplary embodiments, the in-plane distance between the center of each patterned reflector and the center of the corresponding light source is as small as practically possible and does not exceed half the size of the patterned reflector.

Applying the pattern of light extractors and the plurality of patterned reflectors may include printing the pattern of light extractors and the plurality of patterned reflectors on the first and/or second surface of the light guide plate. In certain exemplary embodiments, printing the pattern of light extractors and the plurality of patterned reflectors may include printing the pattern of light extractors and the plurality of patterned reflectors using a single ink. In other embodiments, printing the pattern of light extractors and the plurality of patterned reflectors may include printing the pattern of light extractors using a first ink and printing the plurality of patterned reflectors using a second ink different from the first ink. In some embodiments, the printing may include inkjet printing. In other embodiments, the printing may include screen printing. In yet other embodiments, printing the pattern of light extractors and the plurality of patterned reflectors may include screen printing the pattern of light extractors and inkjet printing the plurality of patterned reflectors.

In other embodiments, applying the pattern of light extractors may include at least one of injection molding the pattern of light extractors, roller stamping the pattern of light extractors, chemical etching the pattern of light extractors, and embossing the pattern of light extractors on the first surface of the light guide plate. In this case, applying the plurality of patterned reflectors may include printing the plurality of patterned reflectors on the first surface of the light guide plate. In some embodiments, applying the pattern of light extractors may include laminating a layer of light extractors to the light guide plate via an adhesive layer on the first surface of the light guide plate. In other embodiments, applying the pattern of light extractors and the plurality of patterned reflectors may include laminating a layer of light extractors and the plurality of patterned reflectors to the light guide plate via an adhesive layer on the first surface of the light guide plate. In yet other embodiments, applying the plurality of patterned reflectors may include at least one of printing the plurality of patterned reflectors, depositing a layer of metal film, and depositing a stack of dielectric layers on the first surface of the light guide plate.

As illustrated in FIG. 28B, at 810 method 800 may further include applying a diffusive layer on the light guide plate. For example, a diffusive layer 602a or 602b may be applied on the light guide plate 108 as illustrated in FIGS. 20 and 21, respectively. In certain exemplary embodiments, applying the diffusive layer may include applying the diffusive layer on the first surface of the light guide plate. In other embodiments, applying the diffusive layer may include applying the diffusive layer on a second surface of the light guide plate opposite to the first surface. In some embodiments, applying the diffusive layer may include screen printing the diffusive layer. Screen printing the diffusive layer may include screen printing the diffusive layer on a primer layer. In other embodiments, applying the diffusive layer may include laminating the diffusive layer to the light guide plate via an adhesive layer. In yet other embodiments, applying the diffusive layer may include embossing the diffusive layer into the light guide plate, injection molding the diffusive layer, etching the light guide plate, or applying the diffusive layer with a laser.

Figure 29A:
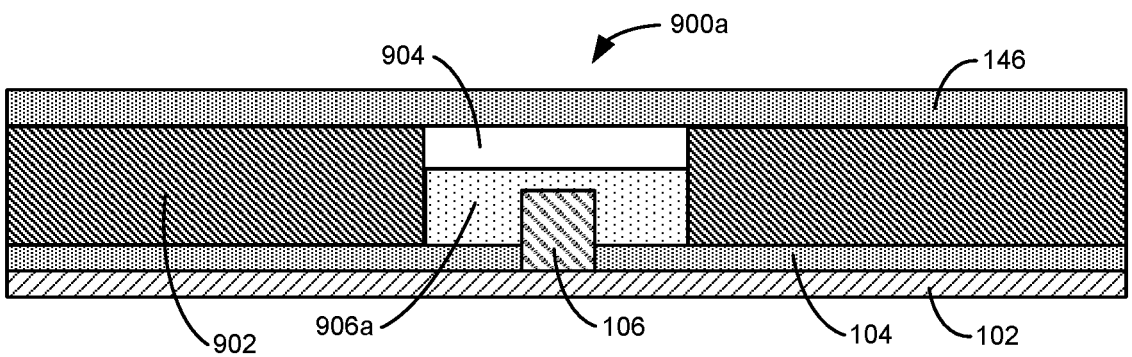
FIGS. 29A-29C are simplified cross-sectional views of exemplary backlights including a second reflective layer and an encapsulation layer.

FIG. 29A is a simplified cross-sectional view of an exemplary backlight 900a. Backlight 900a may include a substrate 102, a first reflective layer 104, and a plurality of light sources 106 as previously described and illustrated with reference to FIGS. 1A-1D. Backlight 900a also includes a second reflective layer 902 and a plurality of encapsulation layers 906a. In addition, backlight 900a may include a quantum dot film, a diffuser sheet, or a diffuser plate 146 as the first layer of an optical film stack (not shown) over the second reflective layer 902. In certain exemplary embodiments, the optical film stack may include, in order from the bottom to the top, a diffuser plate, a quantum dot film, a diffuser sheet, a prismatic film, and a reflective polarizer. In other embodiments, the optical film stack may include, in order from the bottom to the top, a quantum dot film, a diffuser plate, a diffuser sheet, a prismatic film, and a reflective polarizer. In yet other embodiments, the optical film stack may include, in order from the bottom to the top, a quantum dot film, a diffuser sheet, a prismatic film, and a reflective polarizer.

The second reflective layer 902 is between the quantum dot film, diffuser sheet, or diffuser plate 146 and the first reflective layer 104. In this embodiment, the second reflective layer 902 contacts the upper surface of the first reflective layer 104 and the lower surface of the quantum dot film, diffuser sheet, or diffuser plate 146. The second reflective layer 902 may be coupled to the lower surface of the quantum dot film, diffuser sheet, or diffuser plate 146 via an optical adhesive (e.g., phenyl silicone). In other embodiments, there may be an air gap between the second reflective layer 902 and the lower surface of the quantum dot film, diffuser sheet, or diffuser plate 146.

The first reflective layer 104 and the second reflective layer 902 may include different materials or the same material. In certain exemplary embodiments, a reflectance of the second reflective layer 902 is greater than a reflectance of the first reflective layer 104. For example, the reflectance of the second reflective layer 902 may be, for example, greater than about 90, 95, or 99 percent. As illustrated in FIG. 29A, the surface of the second reflective layer 902 facing the quantum dot film, diffuser sheet, or diffuser plate 146 may be closer to the quantum dot film, diffuser sheet, or diffuser plate 146 than the surface of each light source 106 facing the quantum dot film, diffuser sheet, or diffuser plate 146. The second reflective layer 902 includes a plurality of openings 904. Each opening 904 is aligned with a corresponding light source 106.

Each light source 106 may be substantially located in the center of each opening 904. Each opening 904, when viewed from the top, may be a circle, square, hexagon, or polygon in shape. Each opening 904 may also be an ellipse, rectangle, or other less symmetrical shape. The walls of each opening 904 may be straight (i.e., vertical) as shown in FIG. 29A. In other embodiments, the walls of each opening 904 may be sloped, such that each opening 904 is larger near the quantum dot film, diffuser sheet, or diffuser plate 146 and smaller near the first reflective layer 104. Each light source 106 may also be located off the center of the opening 904.

Each encapsulation layer 906a is within a corresponding opening 904 between the quantum dot film, diffuser sheet, or diffuser plate 146 and the first reflective layer 104. In this embodiment, each encapsulation layer 906a contacts the upper surface of the first reflective layer 104 and partially fills the corresponding opening 904. Each encapsulation layer 906a may include a clear resin material, a silicone, or another suitable material. As illustrated in FIG. 29A, each encapsulation layer 906a encapsulates a corresponding light source 106.

Figure 29B:
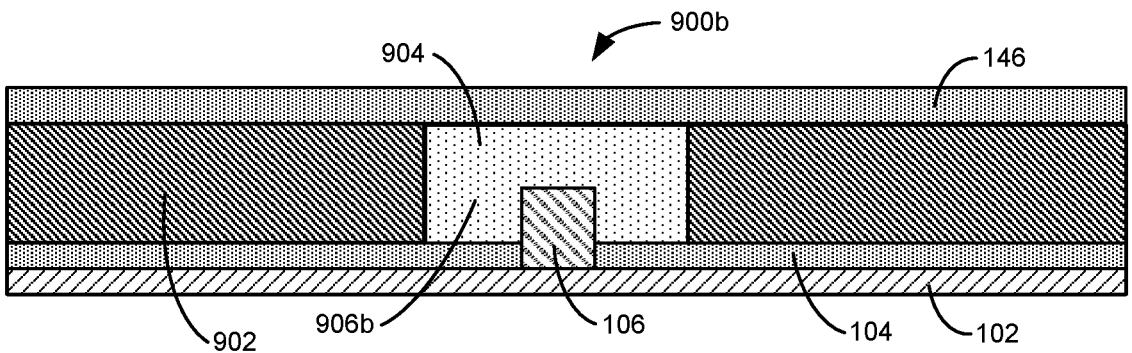

FIG. 29B is a simplified cross-sectional views of an exemplary backlight 900b. Backlight 900b is similar to backlight 900a previously described and illustrated with reference to FIG. 29A, except that backlight 900b includes a plurality of encapsulation layers 906b in place of encapsulation layers 906a. As illustrated in FIG. 29B, each encapsulation layer 906b fully fills each corresponding opening 904 such that the upper surface of each encapsulation layer 906b contacts the lower surface of the quantum dot film, diffuser sheet, or diffuser plate 146.

Figure 29C:
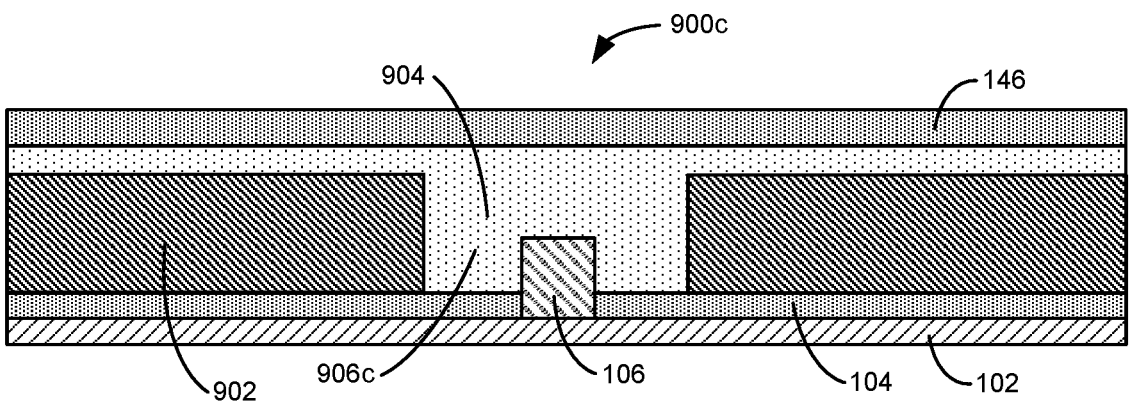

FIG. 29C is a simplified cross-sectional views of an exemplary backlight 900c. Backlight 900c is similar to backlight 900b previously described and illustrated with reference to FIG. 29B, except that backlight 900c includes an encapsulation layer 906c in place of the plurality of encapsulation layers 906b. As illustrated in FIG. 29C, the encapsulation layer 906c is between the upper surface of the second reflective layer 902 and the lower surface of the quantum dot film, diffuser sheet, or diffuser plate 146 and fully fills each opening 904. Thus, the encapsulation layer 906c extends over the second reflective layer 902.

In certain exemplary embodiments, the second reflective layer 902 and the encapsulation layers 906a, 906b, or 906c described above with reference to FIGS. 29A-29C may be used in place of second reflective layer 642 of backlight 640 previously described and illustrated with reference to FIG. 24.

Figure 30:
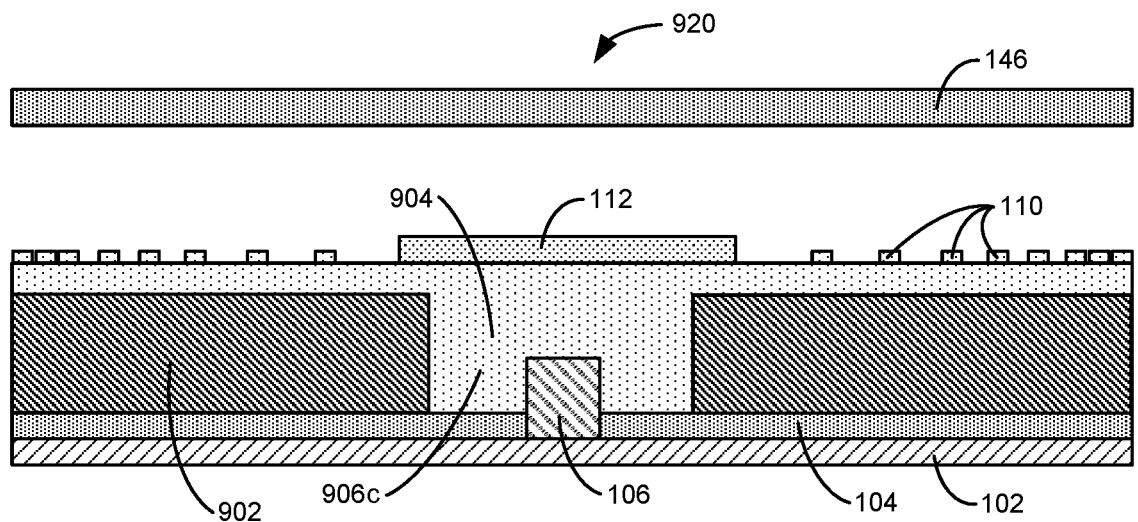
FIG. 30 is a simplified cross-sectional view of an exemplary backlight including an encapsulation layer.

FIG. 30 is a simplified cross-sectional view of an exemplary backlight 920. Backlight 920 is similar to backlight 900c previously described and illustrated with reference to FIG. 29C, except that backlight 920 also includes a pattern of light extractors 110 and a plurality of patterned reflectors 112. FIG. 30 also includes a quantum dot film, diffuser sheet, or diffuser plate 146 as the first layer of an optical film stack (not shown) over the pattern of light extractors 110 and the plurality of patterned reflectors 112. In this embodiment, the pattern of light extractors 110 and the plurality of patterned reflectors 112 contact the upper surface of the encapsulation layer 906c. In other embodiments, a diffusive layer, such as diffusive layer 602a or 602b as previously described and illustrated with reference to FIGS. 22 and 23, may be between the pattern of light extractors 110 and the plurality of patterned reflectors 112 and the encapsulation layer 906c.

Figure 31:
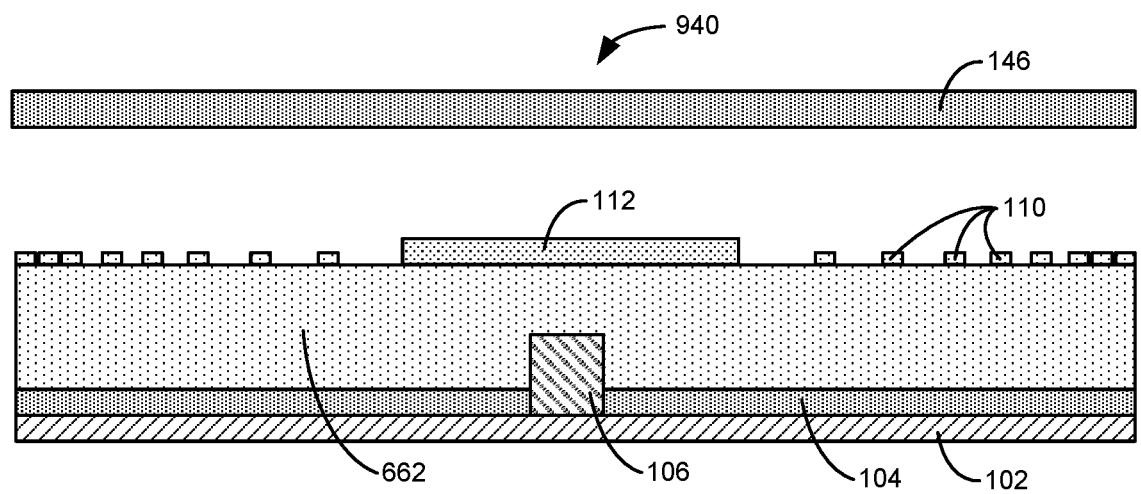
FIG. 31 is a simplified cross-sectional view of an exemplary backlight including an encapsulation layer.

FIG. 31 is a simplified cross-sectional view of an exemplary backlight 940. Backlight 940 is similar to backlight 660 previously described and illustrated with reference to FIG. 25, except that backlight 940 does not include the light guide plate 108. In this embodiment, the pattern of light extractors 110 and the plurality of patterned reflectors 112 contact the upper surface of the encapsulation layer 662. In other embodiments, a diffusive layer, such as diffusive layer 602a or 602b as previously described and illustrated with reference to FIGS. 22 and 23, may be between the pattern of light extractors 110 and the plurality of patterned reflectors 112 and the encapsulation layer 662.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A backlight comprising:
a substrate;
a plurality of light sources proximate the substrate;
a reflective layer on the substrate;
a light guide plate proximate the plurality of light sources;
a pattern of light extractors on the light guide plate, the pattern of light extractors comprising a varying density that is highest at locations that are farthest away from the plurality of light sources;
a plurality of patterned reflectors on the light guide plate, each patterned reflector aligned with a corresponding light source; and
a diffusive layer directly on a surface of the light guide plate,
wherein the diffusive layer comprises a plurality of first portions comprising a first diffusive pattern, each first portion aligned with a corresponding light source, and
a second portion surrounding each of the plurality of first portions, the second portion comprising a second diffusive pattern, the second diffusive pattern comprising a transmittance less than a transmittance of the first diffusive pattern.

2. The backlight of claim 1, further comprising:
a diffuser plate over the light guide plate, the diffuser plate comprising a glass substrate comprising a first surface and a second surface opposite to the first surface and a first scattering layer on the first surface,
wherein the diffuser plate comprises a haze of greater than 90 percent and a cosine corrected Bi-Directional Transmittance Distribution Function along the normal direction (ccBTDF(0,0)) for the normal incidence of less than 1.

3. A backlight comprising:
a substrate;
a plurality of light sources proximate the substrate;
a reflective layer on the substrate;
a light guide plate proximate the plurality of light sources;
a pattern of light extractors on the light guide plate;
a plurality of patterned reflectors on the light guide plate, each patterned reflector aligned with a corresponding light source; and
a diffusive layer on the light guide plate,
wherein the diffusive layer comprises a plurality of first portions comprising a first diffusive pattern, each first portion aligned with a corresponding light source, and
a second portion surrounding each of the plurality of first portions, the second portion comprising a second diffusive pattern, the second diffusive pattern comprising a transmittance less than a transmittance of the first diffusive pattern.

4. A backlight comprising:
a substrate;
a plurality of light sources directly on the substrate;
a first reflective layer directly on the substrate and surrounding each of the plurality of light sources;

a light guide plate proximate the plurality of light sources, the light guide plate comprising a constant thickness;
a pattern of light extractors on the light guide plate;
a plurality of patterned reflectors on the light guide plate, each patterned reflector aligned with a corresponding light source; and
a planar second reflective layer directly on an upper surface of the first reflective layer and directly contacting a lower surface of the light guide plate; and
wherein the second reflective layer comprises a plurality of openings, each opening aligned with a corresponding light source.

5. A backlight comprising:
a substrate;
a plurality of light sources proximate the substrate;
a reflective layer on the substrate;
a light guide plate proximate the plurality of light sources;
a pattern of light extractors on the light guide plate;
a plurality of patterned reflectors on the light guide plate, each patterned reflector aligned with a corresponding light source;
an encapsulation layer on the reflective layer and encapsulating the plurality of light sources; and
a diffusive layer directly on a surface of the light guide plate,
wherein the diffusive layer comprises a plurality of first portions comprising a first diffusive pattern, each first portion aligned with a corresponding light source, and
a second portion surrounding each of the plurality of first portions, the second portion comprising a second diffusive pattern, the second diffusive pattern comprising a transmittance less than a transmittance of the first diffusive pattern.

6. A backlight comprising:
a substrate;
a plurality of light sources proximate the substrate;
a first reflective layer on the substrate;
a light guide plate proximate the plurality of light sources, the light guide plate comprising a first surface and a second surface opposite to the first surface;
a pattern of light extractors on the first surface of the light guide plate;
a plurality of patterned reflectors on the first surface of the light guide plate, each patterned reflector aligned with a corresponding light source and comprising a varying thickness; and
a diffusive layer directly on the first surface or the second surface of the light guide plate,
wherein a gap between each patterned reflector and the pattern of light extractors is within a range from d2 to 3*d2, where d2 is a thickness of the light guide plate between the first surface and the second surface, and
wherein the diffusive layer comprises a plurality of first portions comprising a first diffusive pattern, each first portion aligned with a corresponding light source, and
a second portion surrounding each of the plurality of first portions, the second portion comprising a second diffusive pattern, the second diffusive pattern comprising a transmittance less than a transmittance of the first diffusive pattern.

7. The backlight of claim 6, further comprising:
a second reflective layer between the light guide plate and the first reflective layer, the second reflective layer comprising a plurality of openings, each opening aligned with a corresponding light source.

8. The backlight of claim 7, wherein a diameter of each patterned reflector is within a range from 80 percent to 120 percent of $2*d2*\tan(\sin^{-1}(1/n))+D0$, where n is a refractive index of the light guide plate and D0 is a diameter of each opening of the second reflective layer.

9. The backlight of claim 6, further comprising:
an encapsulation layer on the first reflective layer and encapsulating the plurality of light sources.

10. A backlight comprising:
a substrate;
a plurality of light sources proximate the substrate;
a first reflective layer on the substrate;
a light guide plate proximate the plurality of light sources, the light guide plate comprising a first surface and a second surface opposite to the first surface;
a plurality of light extractors and a plurality of patterned reflectors comprising the same material and arranged in a grid pattern on the first surface of the light guide plate, each patterned reflector aligned with a corresponding light source; and
a diffusive layer directly on the first surface or the second surface of the light guide plate,
wherein the diffusive layer comprises a plurality of first portions comprising a first diffusive pattern, each first portion aligned with a corresponding light source, and
a second portion surrounding each of the plurality of first portions, the second portion comprising a second diffusive pattern, the second diffusive pattern comprising a transmittance less than a transmittance of the first diffusive pattern.

11. The backlight of claim 10, further comprising:
a second reflective layer between the light guide plate and the first reflective layer, the second reflective layer comprising a plurality of openings, each opening aligned with a corresponding light source.

12. A method for fabricating a backlight, the method comprising:
applying a reflective layer on a substrate;
arranging a plurality of light sources on the substrate;
applying a pattern of light extractors and a plurality of patterned reflectors on a first surface of a light guide plate;
arranging the light guide plate over the plurality of light sources such that each patterned reflector is aligned with a corresponding light source; and
applying a diffusive layer directly on the first surface of the light guide plate or directly on a second surface of the light guide plate opposite to the first surface,
wherein the diffusive layer comprises a plurality of first portions comprising a first diffusive pattern, each first portion aligned with a corresponding light source, and
a second portion surrounding each of the plurality of first portions, the second portion comprising a second diffusive pattern, the second diffusive pattern comprising a transmittance less than a transmittance of the first diffusive pattern.

13. A backlight comprising:
a substrate;
a plurality of light sources proximate the substrate;
a reflective layer on the substrate;
an encapsulation layer on an upper surface of the reflective layer and encapsulating the plurality of light sources;
a pattern of light extractors on an upper surface of the encapsulation layer, the pattern of light extractors comprising a varying density that is highest at locations that are farthest away from the plurality of light sources; and a plurality of patterned reflectors on the encapsulation layer, each patterned reflector aligned with a corresponding light source, wherein the backlight does not comprise a light guide plate and further comprising a diffusive layer between the encapsulation layer and the pattern of light extractors and the plurality of patterned reflectors; and wherein the diffusive layer comprises a plurality of first portions comprising a first diffusive pattern, each first portion aligned with a corresponding light source, and a second portion surrounding each of the plurality of first portions, the second portion comprising a second diffusive pattern, the second diffusive pattern comprising a transmittance less than a transmittance of the first diffusive pattern.

* * * * *